United States Patent [19]

Kurtossy

[11] Patent Number: 4,981,050
[45] Date of Patent: Jan. 1, 1991

[54] CONTINUOUSLY VARIABLE POWER CONVERTER

[76] Inventor: Csaba G. Kurtossy, 4901 Orkney Ct., Fairfax, Va. 22032

[21] Appl. No.: 199,467

[22] Filed: May 27, 1988

Related U.S. Application Data

[63] Continuation-in-part of Ser. No. 78,482, Jul. 27, 1987, Pat. No. 4,813,298, Continuation-in-part of Ser. No. 941,900, Dec. 15, 1986, Pat. No. 4,815,335.

[51] Int. Cl.$^5$ ............................................. F16H 37/06
[52] U.S. Cl. .................................................... 475/198
[58] Field of Search ................................... 74/682, 681

[56] References Cited

U.S. PATENT DOCUMENTS

| | | | |
|---|---|---|---|
| 2,361,104 | 10/1944 | Jandasek | 74/682 |
| 2,924,122 | 2/1960 | Foster | 74/682 X |
| 2,973,669 | 3/1961 | Quigley | 74/682 X |
| 3,241,400 | 3/1966 | Martin | 74/682 X |

FOREIGN PATENT DOCUMENTS

| | | | |
|---|---|---|---|
| 607989 | 9/1948 | United Kingdom | 74/681 |
| 610089 | 10/1948 | United Kingdom | 74/682 |

Primary Examiner—Dirk Wright
Attorney, Agent, or Firm—George C. Kurtossy

[57] ABSTRACT

Disclosed is a transmission which may advantageously utilize planetary gear assemblies. Planetary gear assemblies are characterized by no less than three independently rotatable members, each of which has associated therewith separate kinetic and kinematic properties, that is force and velocity components. These force and velocity components associated with one another create a power stream. By appropriate variation of parameters within several planetary gear assemblies comprising a transmission, including at least one parameter that is continuously and controllably variable, the kinetic, kinematic, or both, properties of the several power streams are manipulated so that all but one are eliminated thereby leaving as the sole surviving power stream one that has at least one kinetic or kinematic property which is continuously variable to form the output power stream of the transmission.

16 Claims, 32 Drawing Sheets

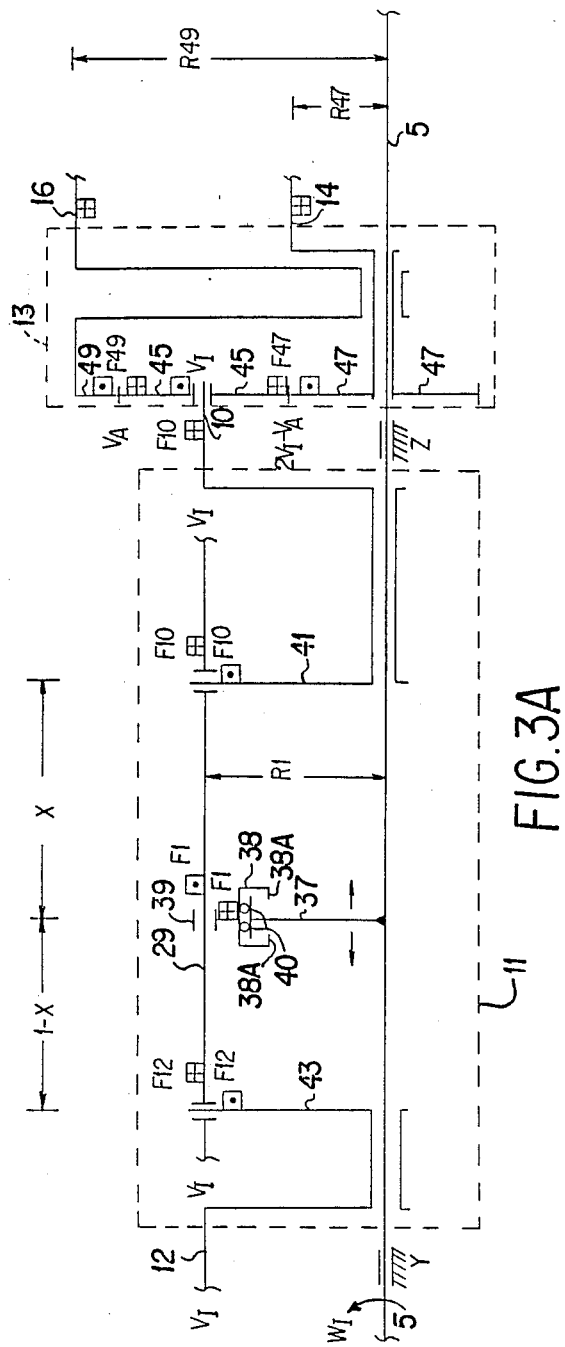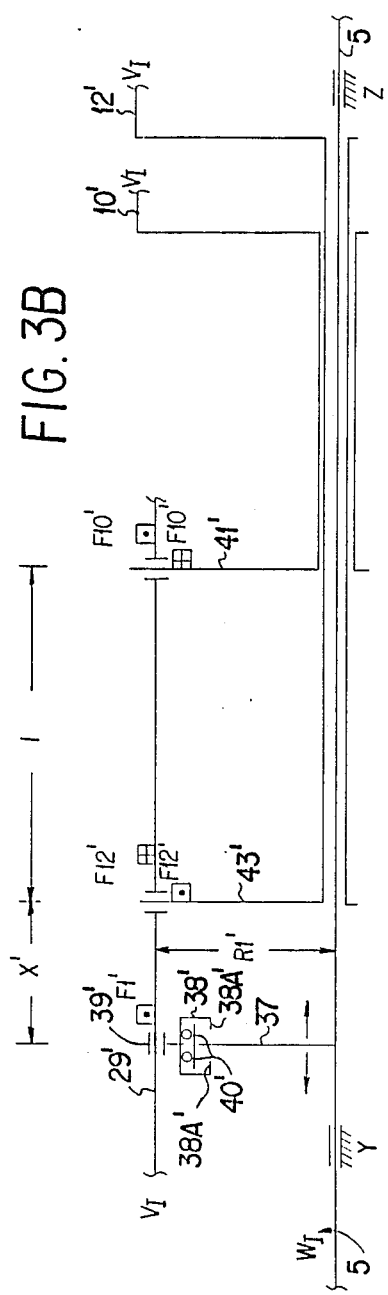
FIG.3A
FIG.3B

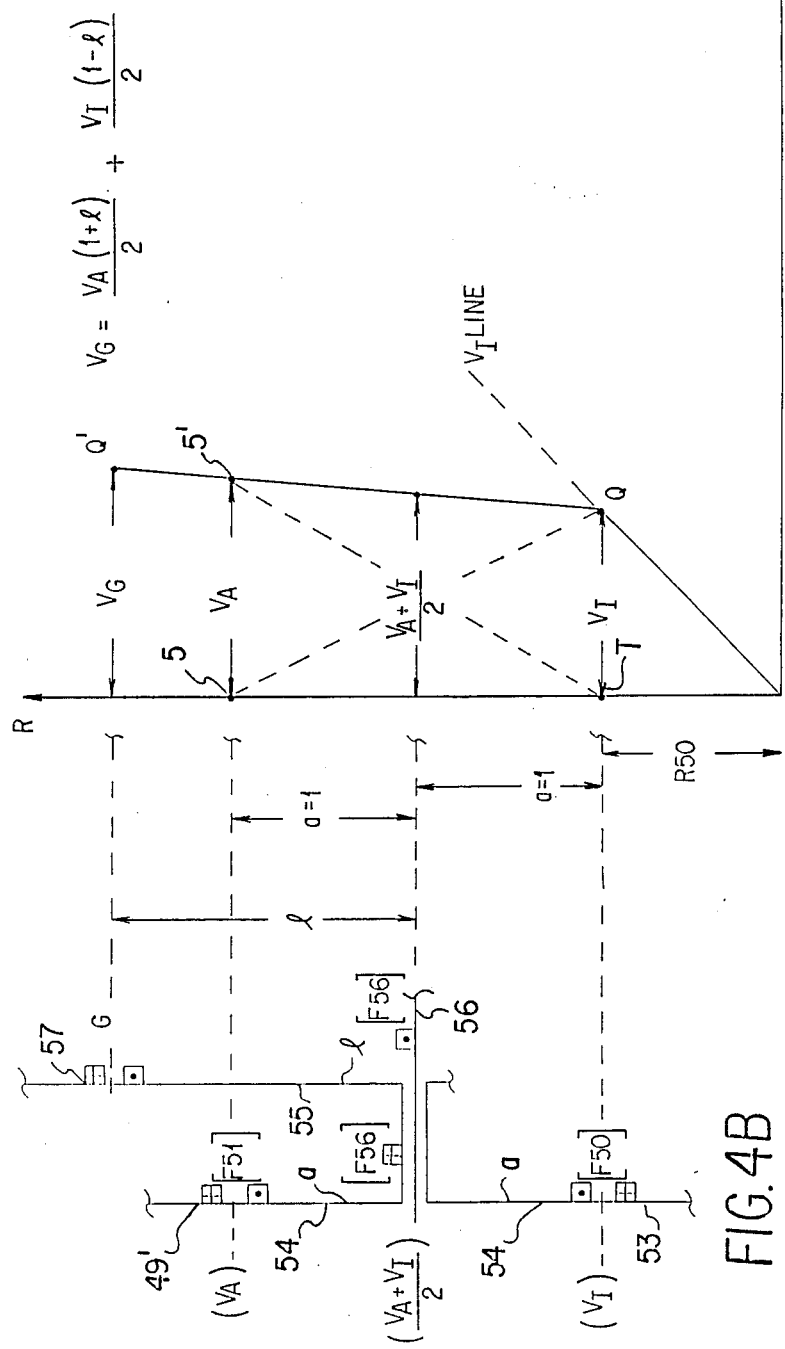

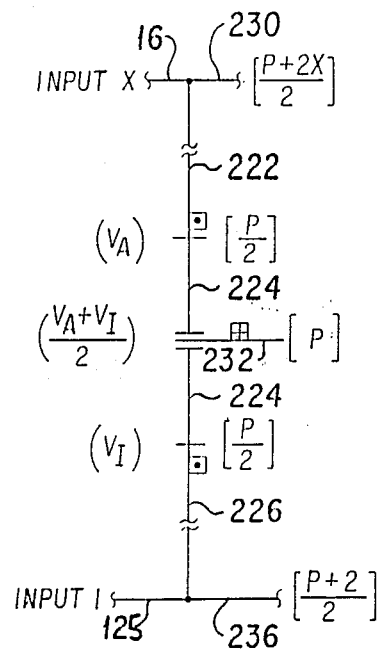
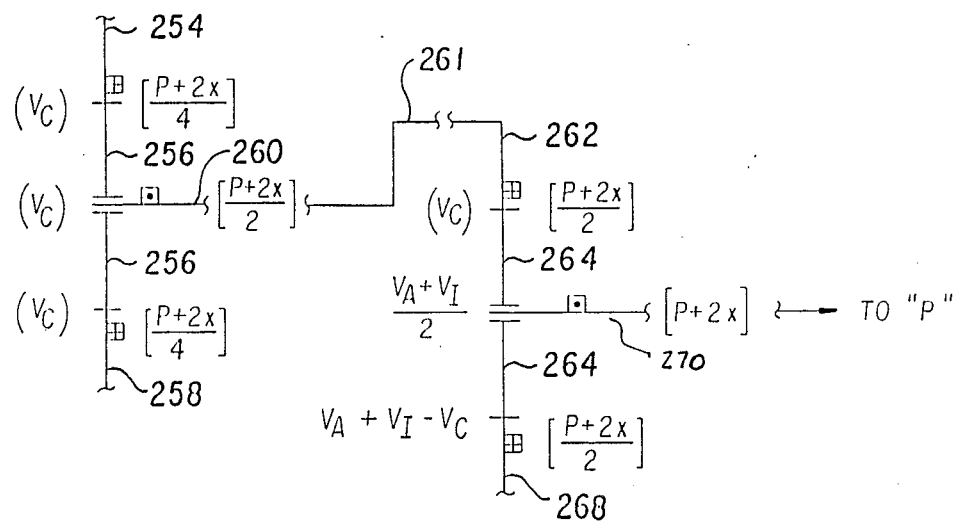
FIG. 8A   FIG. 8B   FIG. 8C
FIG. 8D

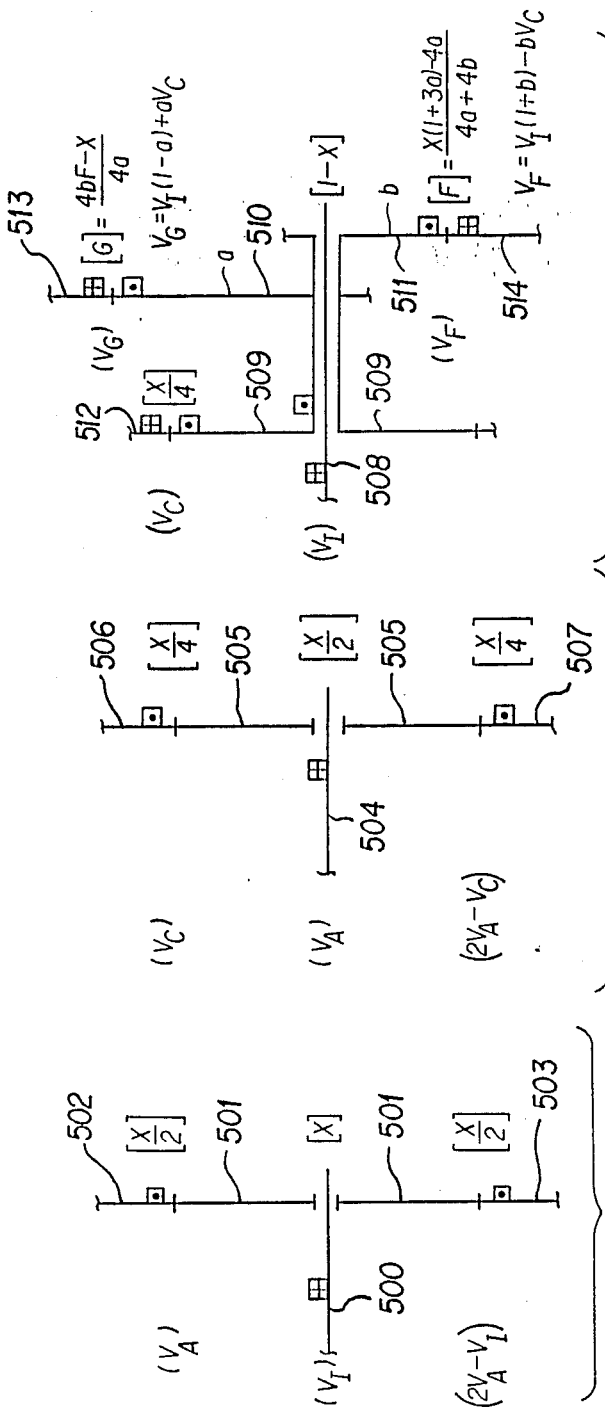

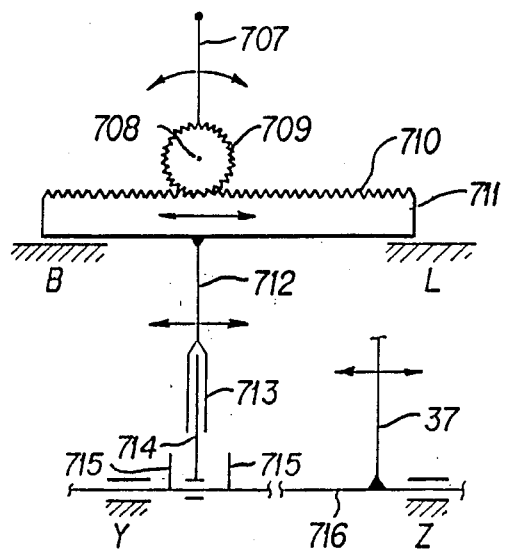
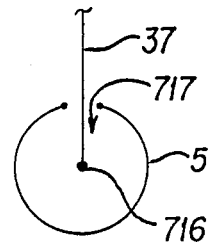
FIG. 13A
FIG. 13B
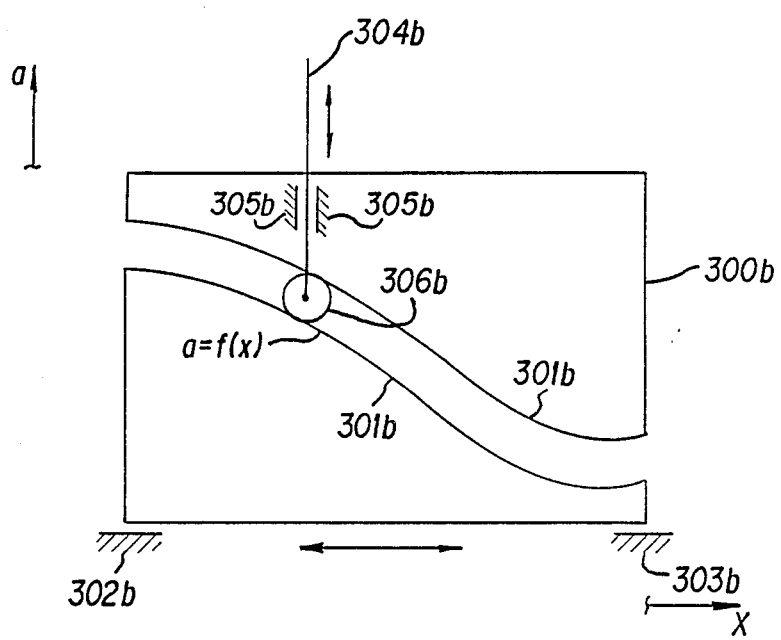
FIG. 12

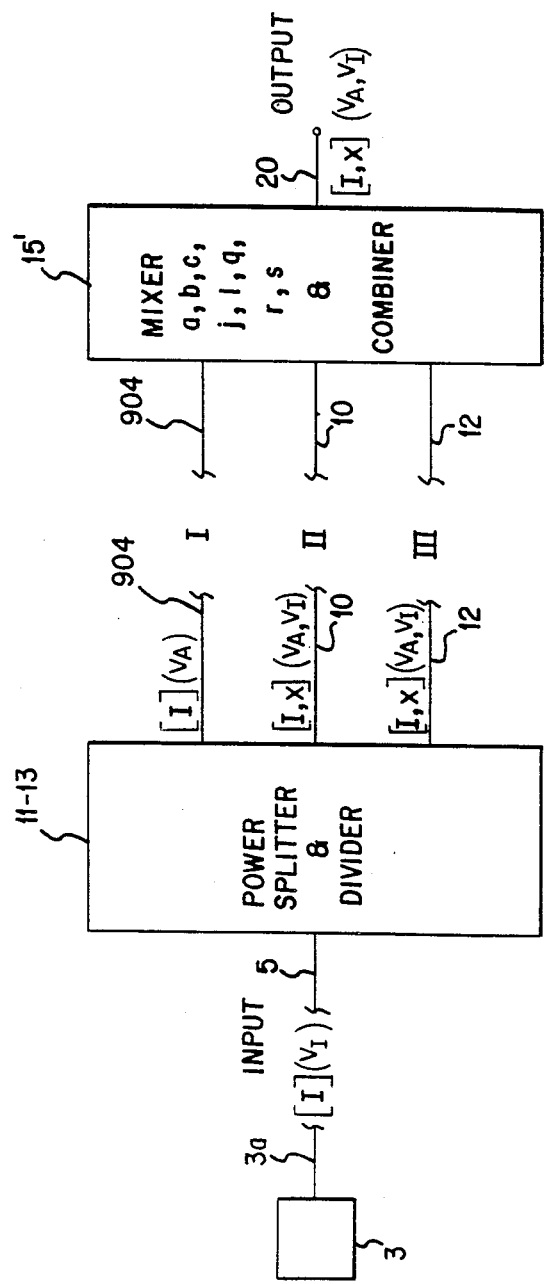

CONTINUOUSLY VARIABLE POWER CONVERTER

FIELD OF THE INVENTION

This application is a continuation in part of application Ser. No. 07/078,482, filed July 27, 1987, now U.S. Pat. No. 4,813,298 which itself is a continuation in part of application Ser. No. 06/941,900, filed Dec. 15, 1986, now U.S. Pat. No. 4,815,335.

This invention relates to apparatus for power conversion. More particularly, the invention relates to apparatus which is commonly, but somewhat mistakenly, known as a "transmission." As those skilled in the art will know, "transmissions" are devices interposed between a prime mover, such as an internal combustion engine, and a load which, for example, may be the driving wheels of an automobile. In general, mechanical power—as contrasted with, say, electrical power—is comprised of the mathematical product of two independent components, namely speed and force. More particularly, in the case of rotating machinery—which comprises the bulk of mechanical power generators—the two components are torque and angular velocity, the latter sometimes referred to as rotational speed. Especially in automotive applications, where the load conditions can vary over a wide range of torque-rotational speed combinations, these devices function not so much as transmitters of power, as they serve as converters of power in that they convert mechanical power, produced by the prime mover at one particular torque and angular velocity into another, different combination of torque and angular velocity suitable to the load. (The power input to the transmission is, of course, except for frictional losses, always equal to the output power thereof.) Nonetheless, the ensuing description will use the term "transmission" because of its wide usage, so long as the slight inaccuracy noted above is kept in mind.

BACKGROUND AND OBJECTS OF THE INVENTION

The prior art is replete with transmissions which are interposed in a typical power train between, for example, an internal combustion engine and the driving wheels of an automobile. A transmission is needed in such an application because the inherent operating characteristics of the engine and the load differ. The power necessary to move automobiles from a resting position has to be delivered in the form of a high (starting) torque and low (zero, or almost zero) angular velocity. This requirement is almost directly contrary to the operating characteristics of an internal combustion engine which is able to deliver such required amounts of torque only at angular velocities substantially in excess of zero. Thus a transmission is necessary between engine and load to alter the torque-angular velocity product, i.e. power, from one of moderate torque and moderate angular velocity as delivered by the internal combustion engine to a product of high torque and low angular velocity suitable for starting the vehicle. Once the vehicle accelerates, the torque-angular velocity product demanded by the load changes to one of decreased torque and increased angular velocity which, in turn, but for the existence of the transmission, would speed up the engine and force it into an operating region of higher speed where, from a durability standpoint it does not want to operate and, from a power standpoint—now that the load has been accelerated—it does not need to operate. Accordingly, a transmission is used to alter the torque-angular velocity product demanded by the starting phase to a new, different torque-angular velocity product suitable to both the engine and the (now moving) load.

Typically, one class of prior art transmissions achieves the required alteration by interconnecting the engine and the load through selectively engageable gear trains each of which has a different, but fixed, ratio. Thus, for this type of prior art transmission, known as a "manual" transmission, a human operator selects a different ratio of the transmission each time the previously selected relationship between the engine and the load becomes inappropriate. Furthermore, each time that such a relationship is altered, the power flow between the engine and the load must be interrupted so that the appropriate gear selection is not made under power. Thus, temporarily at least, the engine undergoes a change from full, or partial, load to a temporary state of little or no load until it again resumes a new operating condition once the new gear train has been selected. Such repeated cyclings thus force the engine into temporary states of inefficiency, and demand considerable experience and skill on the part of the human operator, especially in those conditions where, for example, the differing fixed ratios of a transmission amount to more than five, as is the case in truck transmissions. Moreover, the attempt to match engine and load characteristics through a series of fixed ratios is an approximation, at best, because each ratio selected is operative only in a very limited range of rotational speeds, or angular velocities.

Thus, it is a primary object of this invention to provide a new and improved transmission for use between a prime mover and a load.

It is another object of this invention to provide a transmission which achieves the necessary changes in power conversion between a prime mover and a load continuously, rather than as a series of discrete, fixed steps and without requiring interruption of the power train between the engine and the load.

The prior art has attempted to deal with the problems of manual transmissions noted above by a transmission commonly known as an automatic transmission. These devices are characterized by the inclusion of a hydraulic element, such as a fluid clutch or hydraulic torque converter, in an attempt to serve several functions, both to minimize the temporary, and total, disconnection of the engine from the load required by a manual transmission and, in the case of the hydraulic torque converter, to also function as a torque multiplication device prior to applying the engine power to a gear train contained within the automatic transmission. However, these hydraulic elements inserted into the power train between the engine and the load to minimize the disadvantages of another prior art device known as a clutch, and to thus simplify the operation of these types of devices from a human standpoint, suffer from the primary disadvantage that energy transfer between engine and load now occurs through the flow characteristics of a hydraulic fluid. This makes the power transmission less efficient because a portion of the energy transmitted is lost in the slippage characteristics of the hydraulic fluid. This has led, in the case of so-called automatic transmissions for automobile passenger car use, to the provision of a so-called "lock-up" torque converter, which eliminates the hydraulic elements—with their attendant disadvantages—from the power train and substitutes a direct mechanical connection between the engine and the load under certain operating conditions to increase fuel economy. Moreover, it is noteworthy that the types of transmissions employing hydraulic elements, and known partially as "automatic" for having eliminated the human-operable clutch from a transmission, still apply the power transmitted to a series of automatically selectable and selected gear trains. Typically, most transmissions of the "automatic" type employ a unique set of gears, known generally as planetary gears, selected portions of which are then brought into engagement—or disengagement—by the use of friction clutches or brake bands. While the engagement, or disengagement, of certain gear train members occurs, more or less, without human intervention, i.e., automatically, and thereby eases the task of operating the transmission for a human operator, this artifice still suffers from all of the deficiencies of a manual transmission, in that only a limited number of "fixed" gear ratios are provided. Moreover, the gains achieved in terms of human operability have been achieved at the cost of decreased efficiency, not only because of the provision of the hydraulic elements, but also because of the frictional losses involved when different gear train members of the automatic transmission are brought to a halt—by a clutch or the application of a brake band—to configure a new power path through, and hence different conversion ratio for, the transmission.

Accordingly, it is another primary object of this invention to provide a transmission which eliminates the need for hydraulic power transfer elements and motion decelerating devices such as friction clutches or brake bands.

It is still another object of this invention to provide a transmission in which all power is transmitted over and through mechanical devices such as gears, or the like.

It is still another object of this invention to provide a transmission the power conversion ratio of which is variable continuously and in infinitely variable incremental amounts.

In an attempt to provide the wide range of ratios required in a typical automotive application, without the bulk, complexity, cost, and operator inconvenience created by the provision of a large number of fixed ratios, the prior art has developed so-called CVTs (Continuously Variable Transmission) in which power is transmitted over belts and pulleys, the diameters of the latter of which are varied continuously over a given range to establish a continuously varying ratio between the driving and the driven pulley, thus effectively altering the transmission ratio of this type of device. While the required ratio changes thus occur continuously and variably, and thereby achieve a better match between the operating characteristics of an internal combustion engine and the demands of the load, the chief disadvantage of this type of transmission is the limited power, or torque, transmitting capability of the belt, as well as durability of the belts. This has limited application of these devices to low power requirements such as automotive passenger car applications in which engine size is below 2 liters of engine displacement. Power transmission over a belt and pulley introduces, particularly in higher power applications, frictional losses due to the slippage of the belt which is analogous to the slippage characteristics, and hence slippage losses, of the hydraulic elements provided in current automatic transmissions of the type described above.

Accordingly, it is still another object of this invention to provide a continuously variable transmission capable of transmitting powers and torques considerably in excess of the powers and torques transmittable over belts and pulleys.

Where continuous variability of the conversion ratio of a transmission is an absolute necessity, such as for example, in the operation of a highway paving roller moving at very slow speeds, the prior art has developed a continuously variable transmission known as a hydrostatic transmission. Generally, these types of transmissions employ hydraulic pumps which vary the pressure, and/or the amount of, oil supplied to hydraulic motors which are then connected to the load. However, the objective of continuous variability has been achieved in these transmissions at the cost of all the disadvantages of power transmission through a hydraulic fluid noted above and at the cost of bulky and expensive components required to deal with the high operating pressures of these devices.

Accordingly, it is still another object of this invention to provide a continuously variable transmission having a higher efficiency than the so-called hydrostatic transmission.

The preceding discussion of the prior art has concentrated primarily on a description of a transmission apart from its companion device, the so-called clutch. In the so-called "manual" transmissions previously described, the clutch functions primarily as a speed-equalization device to overcome the speed differences between a driving member and a driven member, which are greatest when the driven member is accelerated from a zero speed state. In addition, in this environment the clutch also functions to interrupt the power flow when a new gearset, with new speed ratios, is engaged for the purposes and in the manner previously discussed. It is noteworthy that in these types of transmissions, there is always a fixed ratio between the rotational speed of the driving member and the rotational speed of the driven member, as established by a gear ratio in operation at each particular time. In other words, the input speed to the transmission is directly related to the output speed of the transmission and the two speeds can be said to be kinematically dependent.

Those transmissions which employ a hydraulic coupling, or torque converter, in lieu of the friction clutches employed in a so-called "manual" transmission allow the input speed of the transmission and the output speed to be somewhat independent of one another because of the slippage in the fluid coupling. Still, even with the provision of a hydraulic coupling element, total independence of the input speed from the output speed of the transmission cannot be achieved, as the remainder of the transmission is still of the fixed ratio type and the slippage between the driving and the driven member of the fluid coupling can not be made too large to retain a nominal transmission efficiency.

Even the so-called CVTs discussed above need a clutch to overcome the large speed difference to be bridged under starting conditions which gap cannot be encompassed by the adjustment range of the variable diameter pulleys. Of all the prior art transmissions described above, only the hydrostatic transmissions are able to completely divorce the output speed from the input speed of the transmission, i.e., create a total kinematic independence between the speed of the prime mover and the speed of the load, long considered an ideal by those skilled in the art. The hydrostatic transmission achieves this goal, however, only at the cost and expense of the heat, and pumping, losses involved in the transmission of power through a hydraulic medium.

Accordingly, it is still another object of the invention to provide a transmission in which there is total kinematic independence between the input speed and the output speed thereof without power transfer through a hydraulic medium thereby also eliminating the need for a clutch inserted in the power train between engine and load.

The limitations in prior art transmissions noted above also have their effect on engine design in that they have forced engine designers to design internal combustion engines to operate over a wide range of rotational speeds and torque generating capability, although typically each internal combustion engine design provides only a very narrow range of rotational speeds at which its principal operating characteristics—torque generated and minimum specific fuel consumption—are each at their optimum level for maximum efficiency.

Accordingly, it is another object of the invention to provide a transmission which allows engine designers to design engines which can operate within narrower operating ranges, thereby contributing to higher efficiency and lower fuel consumption rates.

One of the significant operating consequences of prior art transmissions—except the hydrostatic types, with their stated disadvantages—is the inexorable linkage between their kinetic and kinematic parameters, i.e., between the forces (or torques) generated and the speed relationships between the input and output shafts of the transmission. This linkage allows torque transfer from an engine (the driving member) to a load (the driven member) only in the same direction as the direction of the rotational speed of the load, i.e. output torque and output speed have the same mathematical sense, and the conversion ratio of the transmission is said to be positive under such circumstances. Thus, for example, it has heretofore not been possible to use engine torque applied in a direction opposite to the direction of rotation of the output shaft of the transmission, i.e. create a negative conversion ratio, to thereby allow true dynamic braking.

It is therefore yet another object of this invention to provide a transmission with a conversion ratio which can range from minus "a" to plus "b" where "a" and "b" can be arbitrarily chosen values, thereby allowing the transmission to apply torque both with—and against—the direction of the rotation of the load.

SUMMARY OF THE INVENTION

According to the invention, an input power stream (consisting of both force and velocity components) to a transmission is separated into a first plurality of separate power streams, at least one of which contains at least one controllable parameter, controllable in response to any desired criterion (i.e. engine intake manifold vacuum) and in any desired fashion. Subsequent thereto, a power combiner, responsive to at least two kinetically and kinematically independent (as subsequently explained hereinbelow) power streams of said first plurality of power streams, creates a second plurality of power streams, each of said second plurality of power streams controllable in response to at least one additional parameter, whereby no less than all but one of said second plurality of power streams can be, and are, eliminated (by suitable choice of the additional parameter) so that, if any of said second plurality of power streams remains, it comprises (together with any remaining power stream of said first plurality of power streams) the output power stream of said transmission. If no power stream of said second plurality of power streams remains, then the remaining power stream of said first plurality of power streams constitutes the output power stream of the transmission. Whether the output power stream of said transmission comprises either a power stream solely from said first plurality of power streams, or a combination of power streams from both said first and second plurality of power streams, it contains at least one controllable parameter, controllable and variable in any desired fashion, to create a variable output power stream from the transmission. Both kinetic (i.e. relating to the forces existing within the transmission) and kinematic (i.e. relating to the various velocity relationships existing within the transmission) properties of the transmission are under control of, and can be manipulated by, the controllable parameter or parameters while the output speed is independent of the input speed thereof.

It is a feature of the invention that allows power distribution between at least two power destinations by allowing direct control over the kinetic properties of each power stream rather than relying solely on the kinematic properties of a power stream, such as the prior art has done by way of friction devices or viscous couplings, the latter being a unique form of a variable friction device.

Thus, for example, when the prior art has attempted to provide so-called limited slip differentials in a conventional automobile setting, or even viscous couplings in a four wheel drive environment, power distribution between these various power destinations occurs through the frictional control of kinematic properties, i.e. by gradually (or abruptly) coupling the two normally independently rotatable members of a planetary gear set to one another so that they rotate commonly, i.e. with the same velocity. This is done on the theory that at least both wheels in a two wheel drive environment will rotate and that there can be thus no "mechanical short circuit" of the power flow to only the one wheel that cannot provide any traction.

Accordingly, the invention herein disclosed proposes power division by unique power splitter means which can continuously and controllably vary the kinetic properties of any one power stream to thereby vary the power directed to several destinations in any desired manner without resorting to frictional characteristics to manipulate kinematic properties of the power streams. Such power splitter means are usable not only within the transmission according to the invention but may also be used advantageously in any environment where power allocation between a plurality of destinations is desirable, such as, for example, in any multi-wheel drive application, whether two wheel or four wheel, or any number of wheels.

In accordance with a sixth embodiment of the invention, a power stream such as might originate with a prime mover is subjected to both a variable power splitting and a power dividing process by which at least three new mechanical power streams are created, at least two of which are both kinetically and kinematically independent. That is to say, the mechanical input power stream from the prime mover is so treated that of the three new mechanical power streams, at least two have force components that are continuously variable in accordance with the variation of a controllable and continuously variable parameter, while the velocity components of at least two of the power streams are made to be kinematically independent of one another by creation of a velocity component in these three mechanical power streams which is totally independent of, i.e. unrelated to, the velocity component of the input power stream.

Thereafter, the three mechanical power streams thusly created are mixed or interleaved with one another so that each of the three mechanical power streams is made responsive to additional parameters of sufficient number so that all but one may be eliminated by the suitable selection of these additional parameters, whereby the sole remaining, i.e. surviving, mechanical power stream now has both kinetic and kinematic properties, i.e. force and velocity components, that are independent of, i.e. unrelated to, the force and velocity components of the input power stream. At least one of the components of the surviving power stream is under the control of, and can be manipulated by, the continuous and controllable variation of at least one parameter. This particular embodiment of the invention is particularly efficacious in its use of planetary gears and achieves the stated purposes with a total of no more than five planetary gears.

The foregoing and other objects, features and advantages of the invention will be apparent from the following more particular description of several preferred embodiments of the invention, as illustrated in the accompanying drawings.

BRIEF DESCRIPTION OF THE DRAWINGS

FIG. 3A a cross-sectional schematic of a power splitter utilized in the invention.

FIG. 3B is a cross-sectional schematic of another embodiment of a power splitter usable in the invention.

FIG. 4B is a simplified cross-sectional schematic of the gear assembly shown in FIG. 4A.

FIG. 4C is a graphic illustration of the speed relationships involved in the planetary gear assembly shown in FIG. 4B.

FIGS. 8A-8I are cross-sectional schematics of the various portions of a third embodiment of a power combiner according to the invention.

FIGS. 9D-9H are cross-sectional schematics of the various portions of a fifth embodiment of a power combiner according to the invention together with structure that is preliminary to the power combiner.

FIG. 12 shows a cam mechanism by which the mathematical graphs of FIGS. 11A and 11B can be mechanically realized.

FIGS. 13A and 13B show a mechanism by which a continuously variable parameter "x" can be mechanically realized.

FIG. 14A illustrates a general block diagram of the several functions performed in accordance with a sixth embodiment of the invention.

Figure 11A:
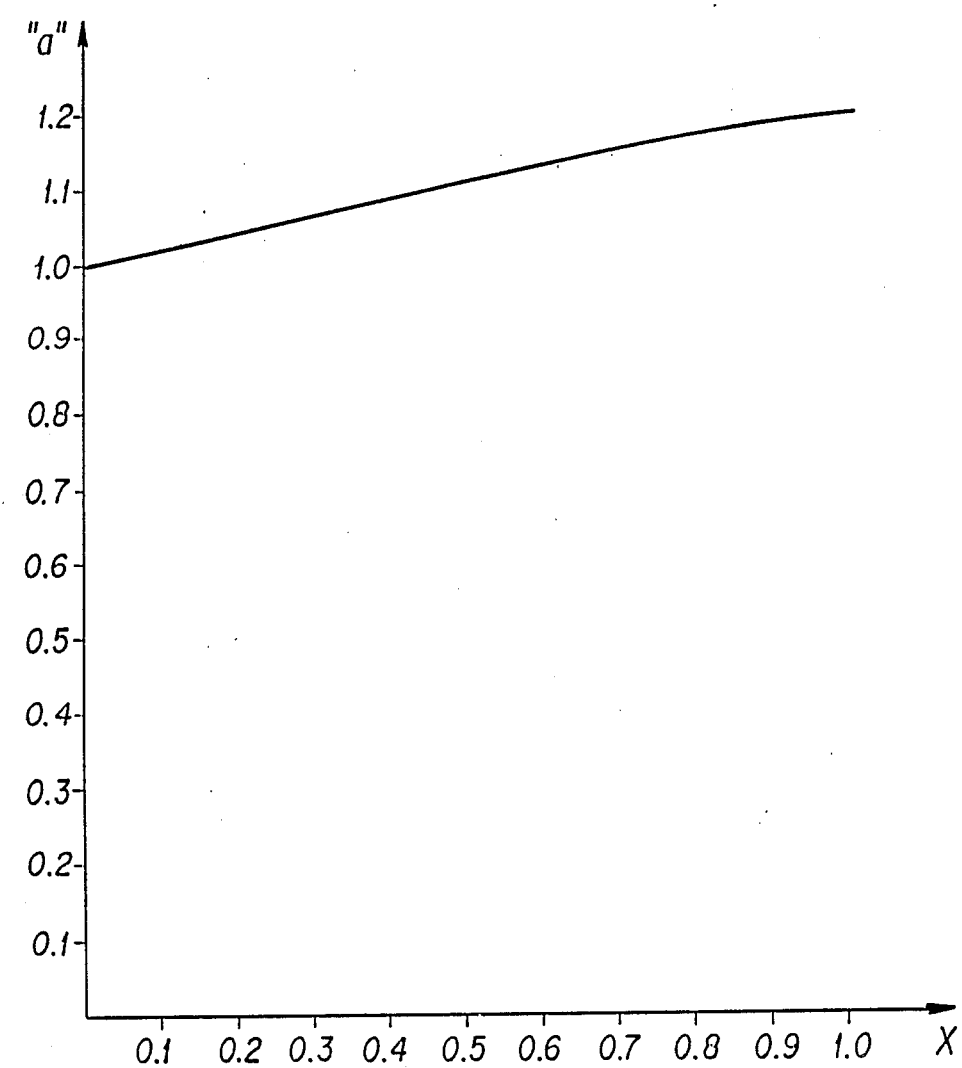
FIGS. 11A and 11B show mathematical graphs of computer generated solutions for variable parameters utilized in a variation of the fourth embodiment of a power combiner according to the invention.
Figure 11B:
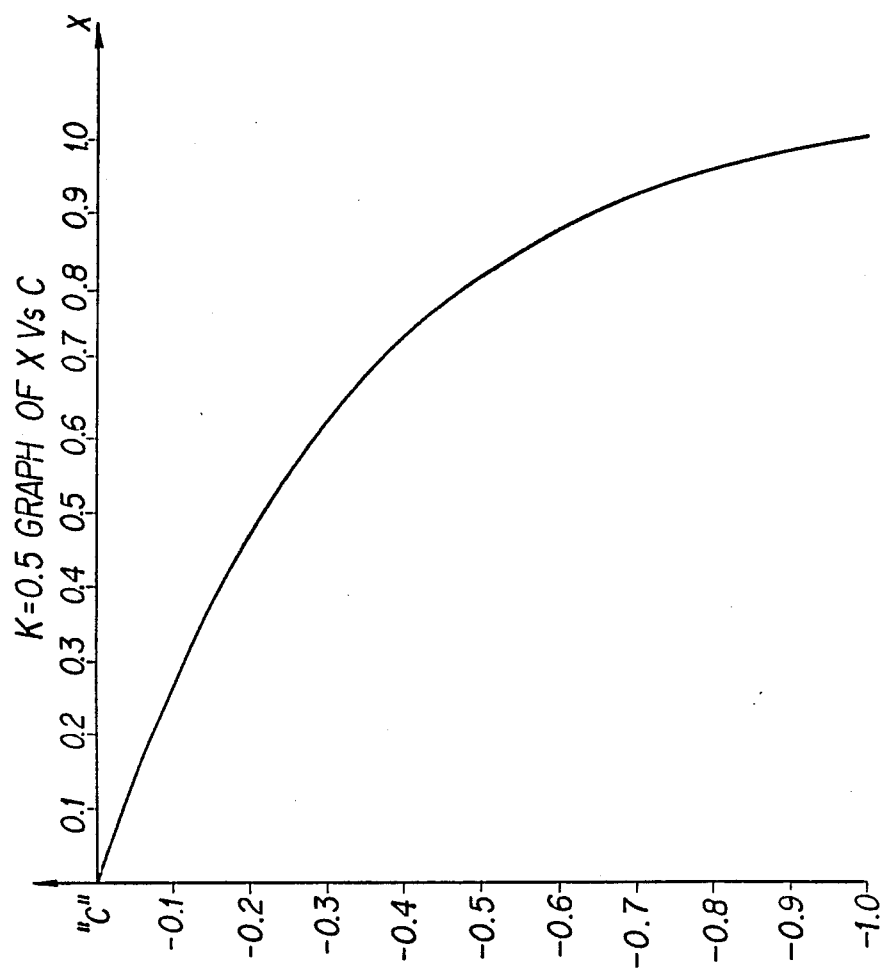

Appendix "A" shows computer generated numerical solutions for, among others, the variable parameters graphically shown in FIGS. 11A and 11B.

BACKGROUND/THEORY OF THE INVENTION

Before proceeding with a description of the overall system of a transmission according to the invention, a brief review of some fundamental concepts is appropriate to facilitate an understanding of the invention.

As previously noted, mechanical power is known to those skilled in the art as involving the product of two different factors, namely torque and rotational speed, the latter sometimes known as angular velocity. Torque is a mechanical quantity which is the product of a given force acting on a given radius, the latter sometimes known as a lever arm. Rotational speed (angular velocity) is simply the rate at which a rotating object revolves and the power produced is thus given by the following equation:

$Tw = P$ where w represents the angular velocity
T represents torque and
P represents power.

This equation can be rewritten as follows in accordance with the above definition of torque as $FRw = P$ where a given force F, acting on a lever arm of R replaces the prior term for T, torque.

As those skilled in the art will recognize, the portion of equation 2 identified as the product of Rw is equivalent to the absolute tangential velocity v existing at a given radius of an object which rotates at an angular velocity w. Thus, the power P transmitted by a rotating object can be rewritten as $$Fv = P$$

In the ensuing description of the invention, the power transmitted at any point in the structure of the invention will be evaluated as the product of two separate quantities, namely the force existing (at any radius) and the absolute tangential velocity (at the same radius). Any given power stream represented by the Fv product can be thus transmitted, and altered, by appropriately dealing with the separate components, namely the force, and the absolute tangential velocity, of a power stream. These concepts will be further explained in the ensuing description.

At this point it is appropriate to note that a power stream, as that term is used in the description of the invention, is to be distinguished from the term "power path", another term often used by those skilled in the art when transmissions are analyzed and described. Just as a river is different from a river bed, the term power stream focuses on the characteristics of the two components, namely force and velocity, which characterize a power stream; a power path simply denotes the course of power flow within a transmission. The difference between the two terms is most striking when a "power path" carries no power, i.e. the river bed is dry.

OVERALL SYSTEM STRUCTURE

Figure 1:
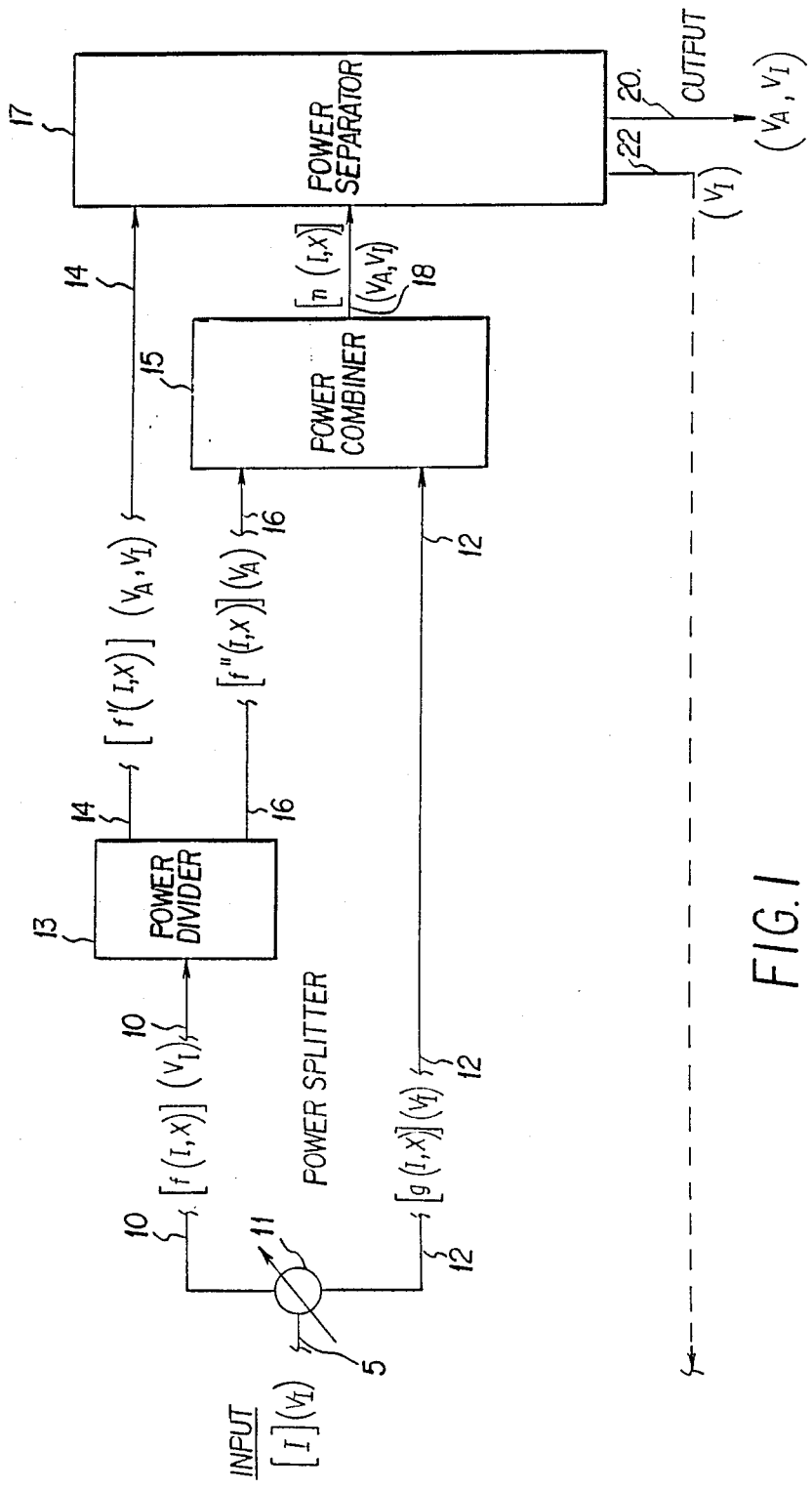
FIG. 1 is a schematic block diagram of the invention illustrating the various mechanical functions to achieve the objectives of the invention.

Turning now to FIG. 1, there is shown a block diagram of a transmission according to the invention. An input power stream comprised of a force component [I] of magnitude I, applied at an absolute tangential velocity ($v_I$) is shown as being applied to a power splitter 11 through a mechanical connection 5. In the ensuing description force components are indicated in brackets, and velocity components are indicated in parentheses, so that a clear distinction between these independently variable factors is kept clearly in mind.

Power splitter 11 takes the applied input power stream [I]($v_I$) and creates two new power streams on its output terminals 10 and 12 of [f(I,x)]($v_I$), and [g(I,x)]($v_I$), respectively. The expression within the brackets indicates the force component existing in the power streams generated on lines 10 and 12 and indicates that these force components now are a function of the magnitude of the input force [I] and a variable "x" in response to which the power splitter has split the incoming power stream, appearing on line 5, into two separate output power streams appearing on lines 10 and 12, with each output power stream now being controllable and variable in response to a variable parameter "x". It should be noted that the power splitter 11 does not alter the velocity component of the incoming power stream ($v_I$), but functions only on the force component of the input power stream.

One of the power streams developed by power splitter 11, the details of which will be further described below, is applied via a mechanical connection 10 to a power divider 13 which receives the power stream applied on line 10, [f(Ix)]($v_I$) and divides it into two new power streams appearing on lines 14 and 16, namely [f'(I,x)]($v_A,v_I$), and [f''(I,x)]($v_A$), respectively. It is to be noted that power divider 13 does not alter the force component of the respective power streams because [f'(I,x)] and [f''(I,x)] are merely fixed multiples of the force component [f(Ix)] appearing on the input terminal 10. However, power divider 13 has introduced a previously non-existent, new, velocity component $v_A$ into each power stream. As will be further described below, $v_A$ is an absolute tangential velocity which is kinematically independent of (i.e. totally unrelated to) the velocity component $v_I$ of the power stream applied to the input of power divider 13 on line 10.

The power stream produced by power divider 13 on terminal 16 is applied, together with the power stream developed by power splitter 11 on line 12, to a power combiner 15, the function of which will now be described.

Power combiner 15 receives on its input terminals 12 and 16 respectively, power streams of [g(Ix)]($v_I$) and [f''(I,x)]($v_A$). Several observations about these two power streams are in order. First, the respective force components of the two power streams, namely [f''(Ix)] and [g(Ix)] are both variable in response to a parameter "x" in accordance with which power splitter 11 has altered the force component of the power stream applied on terminal 5. Moreover, the functions are so chosen that the ratio of $$\frac{[f''(Ix)]}{[g(I,x)]}$$

is itself a function of the variable parameter "x" and, hence, not constant or fixed. In addition, the velocity components of the two respective power streams applied to the input of power combiner 15 on terminals 12 and 16, namely ($v_I$) and ($v_A$) respectively are kinematically unrelated, or independent of one another.

The function of power combiner 15 is to combine the two power streams applied to its respective input terminals 12 and 16 and to produce on its output terminal 18, a single power stream having a force component [n(I,x)] at a velocity component of ($v_A,v_I$), thereby indicating that the velocity component of the power stream appearing on terminal 18 is a function of both of the respective velocities of the input power streams, namely ($v_A$) and ($v_I$).

As those skilled in the art will recognize, the conservation of energy principle demands that, since no device can either create, or destroy, energy, the input power equals output power. Put in somewhat slightly different terms, summing the total power in, and out of, the power combiner 15 must produce a net result of zero. Accordingly, by the use of this power equation, the ratio of ($v_I$) to ($v_A$) is given by the following expression:

$$\frac{v_a}{v_I} = \frac{\pm g(I,x) \pm n(I,x)}{\pm f''(I,x) \pm n(I,x)}$$

It can thus be seen that the relationship between two kinematically independent velocities, $v_A$ and $v_I$ applied to power combiner 15, is given by the relationship described above as the result of a power equation. Instead, as in the prior art, of having an output velocity defined kinematically by the input velocity, here the relationship between the two input velocities to power combiner 15 is defined by the ratios of the force components of the respective power streams, which is a function of the variable parameter "x".

It should be noted that the relationship described above will hold true even if, as will be described in further detail herein, the power stream appearing on terminal 18 of power combiner 15 is zero, i.e. it does not exist. In that event, there is no power output from power combiner 15 and the output of power divider 13, appearing on terminal 14, is the sole remaining output of the transmission directed to drive a load.

While it is within the scope of the invention to either have, or not have, a power stream appearing on terminal 18 of power combiner 15, the ensuing description will continue on the assumption that it has been decided to have an output power stream appearing on terminal 18, with neither the force, nor the velocity component, thereof at zero. If that is the case, a power separator 17 may be necessary to accept the output of power combiner 15, on terminal 18, and one of the two outputs of power divider 13, appearing on terminal 14. Thereafter, power separator 17 "separates" or "filters" from the combined power streams applied to its inputs, a power stream component as shown appearing on line 22, with solely ($v_I$) as its velocity component. This power stream component can be directly connected to the input source, to be considered as part of the input, while the final output of the transmission, suitable for driving a load, thus appears on terminal 20x of power separator 17. As will be later described, whether a power separator 17 is in fact required depends in part on the nature of the output 18 from power combiner 15. Even if there is no power separator 17, the final output from the overall structure is in all cases, except as may be noted otherwise, on a terminal or line 20 or a terminal analogous thereto.

DETAILED DESCRIPTION OF THE BACKGROUND THEORY OF THE INVENTION

Since many of the components indicated in the block diagram of FIG. 1 can employ planetary gear assemblies to achieve their intended function, a brief review of the properties of planetary gear assemblies, as well as a comprehensive definition of the term for the purposes of this invention, now appears in order.

Figure 2A:
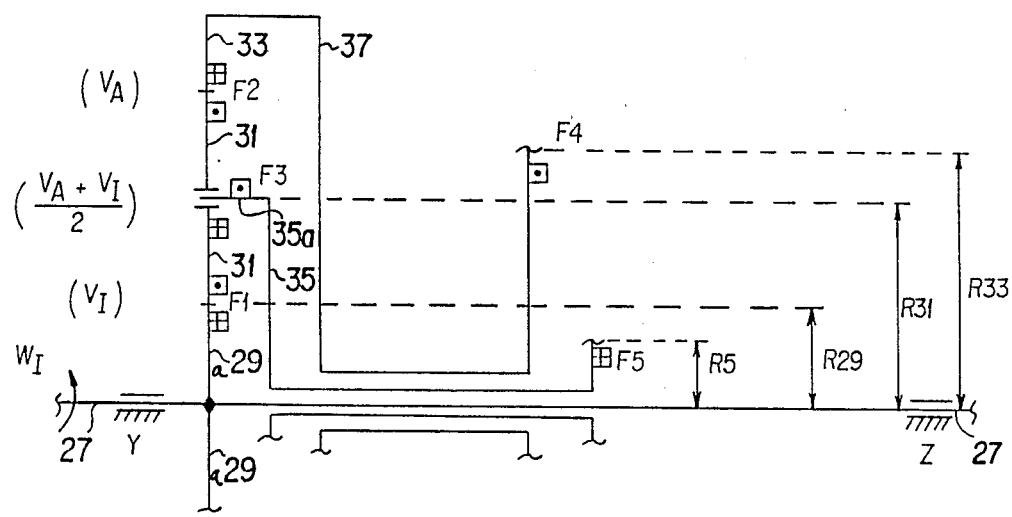
FIG. 2A is a schematic of a cross section of a common type of planetary gear assembly.

Turning to FIG. 2A, there is shown there a cross-sectional schematic diagram of an elementary planetary (sometimes also known as an epicyclic) gear assembly.

A shaft 27, suitably supported by bearings Y-Z rotates with an angular velocity $w_I$ and has affixed thereto a so-called sun gear, sun gear a29. A planetary gear 31 meshes with sun gear a29 and rotates both about the circumference of sun gear a29, and about its own carrier shaft 35a, the latter affixed to a carrier 35 which also rotates about shaft 27. Planetary gear 31 is operatively connected to a so-called ring gear 33 which is rotatably mounted, by carrier 37, on shaft 27. This, as so far described, is a typical planetary gear set.

Some consideration is now necessary to evaluate the direction of the forces acting on each of these elements previously described. As those skilled in the art well know, the kinetics, i.e. the analysis of the force components acting on rotating machinery can, for the purposes of this invention, be analyzed from the classical equations of statics.

With this background, at the mating, or meshing point between sun gear a29 and planetary gear 31, the direction of forces indicated as acting on each of the separate members is given by the signs enclosed within the square attached to the schematic of the planetary gear. Thus, a force directed into the plane of the schematic is indicated by a cross, the "tail" of an arrow, while on the meshing member the direction of the force is indicated by a dot enclosed within a square, thus indicating the "tip" of the arrow. For reasons as will be explained later, the remaining forces on planetary gear 31 are given respectively by the signs shown in FIG. 2A, so that the direction of the force on ring gear 33 is as indicated in FIG. 2A. It can be seen from FIG. 2A that the direction of the forces also follows the classical equations of statics, i.e., that a force acting in one direction on one body, acts with equal, and opposite direction on the connected body. As those skilled in the art will recognize, these principles are in accordance with the well-known principles of mechanics.

The forces arising on the respective carriers are as shown in FIG. 2A, namely a force F3 is imposed upon the carrier 35 in the direction as shown, and a force F2 is shown being imposed on ring gear 33 and carrier 37. Because these forces act at respective radial distances of R31 and R33 from shaft 27, they impose a torque around shaft 27 given by the product of [F2]R33 and [F3]R31. The nature of the rotating carriers 35 and 37, as those skilled in the art will recognize, will allow them to transfer their power at any arbitrary radial distance from shaft 27, e.g., R5 and R4, where, respectively forces F5 and F4 arise to keep carriers 35 and 37 in torque equilibrium about shaft 27. Thus, the product of [F2]R33=[F4]R4 and the product of [F3]R31=[F5]R5. As those skilled in the art will recognize, these equations again follow the elementary principles of mechanics.

Figure 2B:
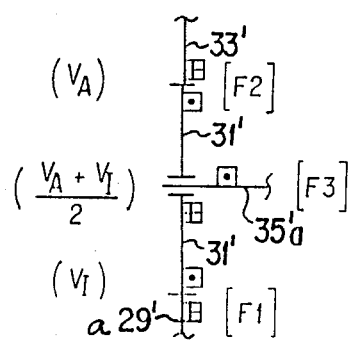
FIG. 2B is a simplified cross-sectional schematic of the gear assembly shown in FIG. 2A.

Turning to FIG. 2B, a simplified schematic diagram of the structure appearing in FIG. 3 is there shown. The simplification consists of drawing the respective sun gear, planetary gear, and ring gear, without reference to the particular radius (measured from shaft 27) at which each one of these elements acts. Under this simplification, the planetary gear can be considered as "sandwiched" between a sun gear (of any desirable radius) and a ring gear which would have a radius determined by the radii of both the sun gear and the planetary gear. The simplification introduced by FIG. 2B eliminates the need to illustrate a multiplicity of carriers (all considered as rotating about the main axis 27) and it is important to remember that all sun gears indicated in the ensuing description are also considered to be rotating about the main axis 27, regardless of whether that is actually shown in the subsequent schematic illustration. Essentially, the simplified schematic depiction allows the ensuing description to concentrate on the "micro" mechanics (as contrasted with the "macro" mechanics of the overall transmission) of the various individual planetary gear sets within the transmission according to the invention.

A force F1, shown as acting at the periphery of sun gear a29' acts on planetary gear 31' in an equal amount, and opposite direction, as indicated. The calculation of the forces F2 and F3, their directions already being shown in FIG. 2B, follows the principles of mechanics, namely, planetary gear 31' must be both in force, and torque, equilibrium. Thus, the force F1 acting at one extremity of planetary gear 31' creates a torque about carrier 35 which must be counterbalanced by the force F2 also acting about the carrier axis 35. If, as is usually the case, F1 and F2 act at equal distances from carrier 35, F1=F2 and F3, from the force equilibrium equation, is given by F1+F2. If, as will be later discussed, the distance at which the respective forces F1 and F2 from shaft 35 is different, F1 and F2 can be calculated by considering that their respective torques about carrier 35 must be equal. F3 is then the sum of F1 and F2. The force F2, indicated as acting on the extremity of planetary gear 31' is transferred to, and shown as acting on the opposite direction on ring gear 33'.

Shown in both FIGS. 2A and 2B are the respective absolute tangential velocities existing at each one of the mating points, i.e. where sun gear a29 (a29') meshes with planetary gear 31 (31') and where planetary gear 31 (31') meshes with ring gear 33 (33'). As will be well known to those skilled in the art, if the tip of sun gear a29 at its meshing point with planetary gear 31, moves with an absolute tangential velocity $v_I$, and, if the opposite end of planetary gear 31, where it meshes with ring gear 33 moves with an absolute tangential velocity $v_A$, the absolute tangential velocity of carrier 35 is given by the expression:

$$\frac{v_A + v_I}{2}$$

As those skilled in the art will recognize, and as will be described in further detail below, these absolute tangential velocities are determined by the angular velocities, and the radius at which these angular velocities are measured, i.e. the absolute tangential velocity at any radius from the main shaft 27 is given by the product of the angular velocity multiplied by its radius from shaft 27. Furthermore, since the absolute tangential velocities at each of the meshing points, i.e., where sun gear a29 meshes with planetary gear 31, and where planetary gear 31 meshes with ring gear 33, are identical, each of the respective carriers 35 and 37 moves also with the absolute tangential velocities as shown. Furthermore, the power transfer to, or from, each gear at its meshing point, is given by the product of the magnitude of the force times the absolute tangential velocity existing at that point, i.e., $[F](v)$.

For additional descriptions of the kinematics of typical planetary gear assemblies, reference may be had to pages 67–76 of a book called "Mechanization of Motion", by Lee Harrisberger, John Wiley & Sons, New York, Copyright 1961, all the pages of which, including the ones mentioned, are expressly incorporated herein by this reference. For additional descriptions of how power streams arise within a transmission and how they may be analyzed, reference may be had to two articles by Dipl.-Ing. H. Frhr. v. Thüngen, appearing at pages 730–734 of the June 17, 1939 issue of VDI-Zeitschrift (Germany), and pages 44–47 of the Feb. 2, 1952 issue of ATZ (Germany) both of which are expressly incorporated herein by this reference.

As the two articles by Thüngen state, power stream flows within a transmission are essentially considered as flowing from a point where force and velocity directions are the same to a point where force and velocity directions are not the same, i.e. unlike. Because the power streams considered in this invention involve both forces and velocities which may change, i.e. reverse themselves, the terms "input" power and "output" power are used in a conceptual, analytical sense with the full realization that, at any given moment, these terms may interchange and one become the other. The analysis described herein, however, is not limited by these considerations as it considers at all times the direction of the forces involved in these power streams.

Turning now to FIG. 3A, there is shown there a schematic cross-sectional diagram of one likely embodiment of a power splitter 11.

A shaft 5 is suitably supported in support bearings Y and Z and rotates at an angular velocity $w_I$. Rotating with shaft 5, but slidable thereon along the axis of shaft 5, in a key way (not shown) is a carrier 37 which supports a member 29 at a distance of R1 from shaft 5. Member 29 is supported by a sleeve 39, which is itself affixed to a sleeve 38 mounted rotatably about the axis of carrier 37 by means of bearings 40. The sleeve 38 has flanges 38a which prevent movement of the sleeve 38 and sleeve 39 along the axis of carrier 37, thereby effectively preventing member 29 from radial movement along its radius R1 from shaft 5. Member 29 is also supported at its two extremities by suitable pin-sleeve joints on carriers 41 and 43. The power delivered by rotating shaft 5 is resolved into a force F1 shown acting on the extremity of carrier 37 and an absolute tangential velocity of $v_I$ at a distance R1 from shaft 5. A force of the same magnitude F1, but acting in the opposite direction on member 29, creates forces F10 and F12 acting in the direction as indicated on member 29 which forces are transferred directly to carriers 41 and 43, acting in a direction opposite from the direction shown as acting on member 29. As will be obvious to those skilled in the art, if the distance between the fixed supports on member 29, i.e. the distance between: carriers 41 and 43, is fixed at an arbitrary distance of, say, 1, axial movement of carrier 37 along the axis of shaft 5 will produce forces F10 and F12 which will vary as a function of the distance "x". That is, if force F1 has a magnitude of 100, and its location of application to member 29 is varied by moving carrier 37 an arbitrary distance "x" from carrier 41, the magnitude of F10 will be proportional to the expression 100(1-x). The magnitude of the force F12 will be proportional to the expression 100x. These forces follow from considering that member 29 must be both in force, and torque, equilibrium in a plane that is perpendicular to the axis of carrier 37. It is clear, therefore, that by slidably moving carrier 37 along the axis of shaft 5, and varying its distance "x", both F10 and F12 are a function of the particular distance "x" of carrier 37 from carrier 41, and by moving carrier 37 in this fashion the forces F10 and F12 can be varied continuously in accordance with the parameter "x". Because member 29 moves with an absolute tangential velocity $v_I$, the respective power transmitted to carriers 41 and 43 is given by the product of $[F10](v_I)$ and $[F12](v_I)$. Carriers 41 and 43 can operatively connect to other members to transfer the power by carriers 10 and 12, each moving at an absolute tangential velocity of $v_I$. Thus, it is important to note that the input power to the power splitter shown on the dotted lines within the block 11 and indicated by the product of $[F1](v_I)$, is transferred via carriers 41 and 43 to two other carriers 10 and 12, respectively, in a proportion varying with the distance "x" of carrier 37 from carrier 41. A variable power division has thus been achieved. The proportionality of the forces F10 and F12 to variations in the parameter "x" will obtain even if the absolute tangential velocity $v_I$ is itself a function of time, i.e., there is acceleration involved. The equilibrium equations are simply supplemented by the addition of a force vector due to the acceleration and mass of member 29.

A brief review of the type of joints which support member 29 at a fixed distance R from shaft 5, namely sleeve 39 and the pin-type joints on carriers 41 and 43 reveals that none of them is capable of absorbing torque about their own respective axes. This allows the power division above described to take place and yet still retain the location of member 29, both radially from shaft 5 and also along its own axis.

Before continuing with a description of the schematic cross-section diagram shown in FIG. 3A, another different type of power splitter 11 is shown in FIG. 3B in which parts analogous to FIG. 3A are shown by identically numbered members but in prime notation. The only difference between the structure shown in FIG. 3B and the structure shown within the dotted lines 11 in FIG. 3A is that the two forces F10' and F12', rather than as described in connection with the description of FIG. 3A, have magnitudes proportional to 100x and 100(1+x). This result obtains because the axially sliding carrier 37' is moved a variable distance "x" from carrier 43' and the force distribution on member 29', subject to the same equilibrium conditions described with respect to the structure shown in FIG. 3A, yields the results described. Note further, that while F10 and F12 have identical signs in FIG. 3A, F10' and F12' in FIG. 3B have opposite signs. Furthermore, they each vary as different functions of "x" i.e. (1+x) and (1−x). While the ensuing description of several preferred embodiments of the invention will proceed on the assumption that a power splitter 11 of the type shown in FIG. 3A is being used, by principles to be discussed below, it is equally possible to utilize a power splitter 11 shown in FIG. 3B. Moreover, it is possible to use both types of splitters as illustrated in FIGS. 3A and 3B in one assembly (each moving independently), so that the single variable "x" is replaced by two independent variables, say "x" and "y", each of which can be varied independently to create forces on member 29 (29') which are the superposed additions of the forces shown as acting separately on members 29 and 29'. For simplicity, however, the ensuing description will assume that only one splitter, as it is illustrated in FIG. 3A, is used in the various embodiments of the invention.

Returning now to FIG. 3A, there is shown there in dotted block 13 a power divider according to the invention. The output from power splitter 11, appearing on the carrier shaft 10 is applied as the carrier input to a planetary gear 45 which has meshing therewith a ring gear 49 and a sun gear 47, both mounted rotatably about shaft 5. The force F10 applied at the carrier hub to the planetary gear 45 is resolved, in accordance with the rules previously discussed, into F47 and F49 acting at the extremities of planetary gear 45. In FIG. 3A the dimensions of planetary gear 45 are symmetrical about its hub 10, F47 and F49 are both equal, and they are exactly $$\frac{F10}{2}$$

Because of the equilibrium constraints mentioned before, the direction of the forces on planetary gear 45 at its extremities are as shown in FIG. 3A, which means that the directional forces acting, respectively, on sun gear 47 and ring gear 49 are equal and opposite to the direction of the forces acting on planetary gear 45. Since the respective sun and ring gear 47 and 49 are rotatably mounted around shaft 5, their respective carriers 14 and 16 provide the output from power splitter 13, and since they are drawn at the respective radii R47 and R49, their magnitude there is exactly equal to the forces F47 and F49 acting on the identical radii.

Turning now to the kinematics of the planetary gear set shown within the dotted block 13, it will be noted that the absolute tangential velocity at the meshing point between planetary gear 45 and ring gear 49 has been arbitrarily assumed to be $v_A$, a velocity which is kinematically totally independent of $v_I$. Assuming that ring gear 49 moves with an absolute tangential velocity of $v_A$ the absolute tangential velocity at the meshing point between planetary gear 45 and sun gear 47 is, in accordance with the rules previously described, $2v_I$-$v_A$. The respective power transfer from the planetary gear 45 to sun gear 47, and the ring gear 49, is given by the product of the respective forces F47 and F49, multiplied by the respective absolute tangential velocities existing at the power transfer point, namely $2v_I$-$v_A$, and $v_A$, respectively. It should be noted that the power stream applied to the power divider 13, at a velocity $v_I$ has now been divided into two power streams, one appearing on carrier 14, the other appearing on carrier 16, with kinematically unrelated velocities, i.e. angular velocities. It should also be noted that at the subsequent power transfer point where the respective carrier 14 and 16 apply their power to subsequent gear assemblies, the signs of the forces, as shown in FIG. 3A, will be such that the respective carriers 14 and 16 will be in torque equilibrium about shaft 5.

Figure 3C:
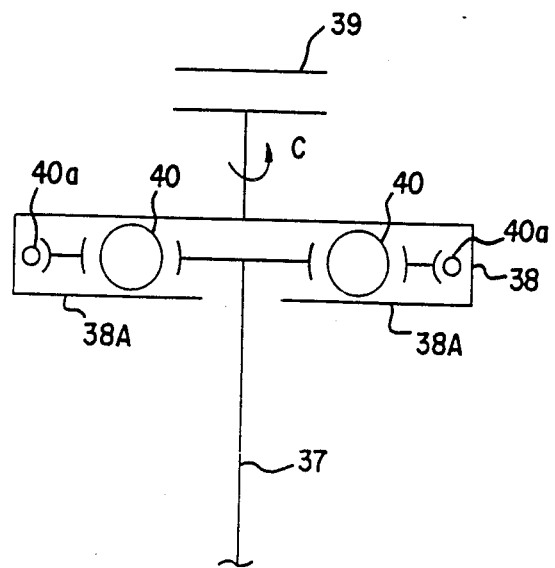
FIG. 3C is a cross-sectional schematic showing further detail of certain elements shown in FIGS. 3A and 3B.

FIG. 3C shows the arrangement of bearing 40 in a slightly different fashion from that shown in FIGS. 3A and 3B so that it is clear that sleeve 38 (and hence sleeve 39) is mounted so that rotational freedom to revolve about the axis of carrier 37 is thereby provided to sleeves 38 and 39 without allowing movement of sleeves 38 and 39 along the axis of carrier 37.

Figure 4A:
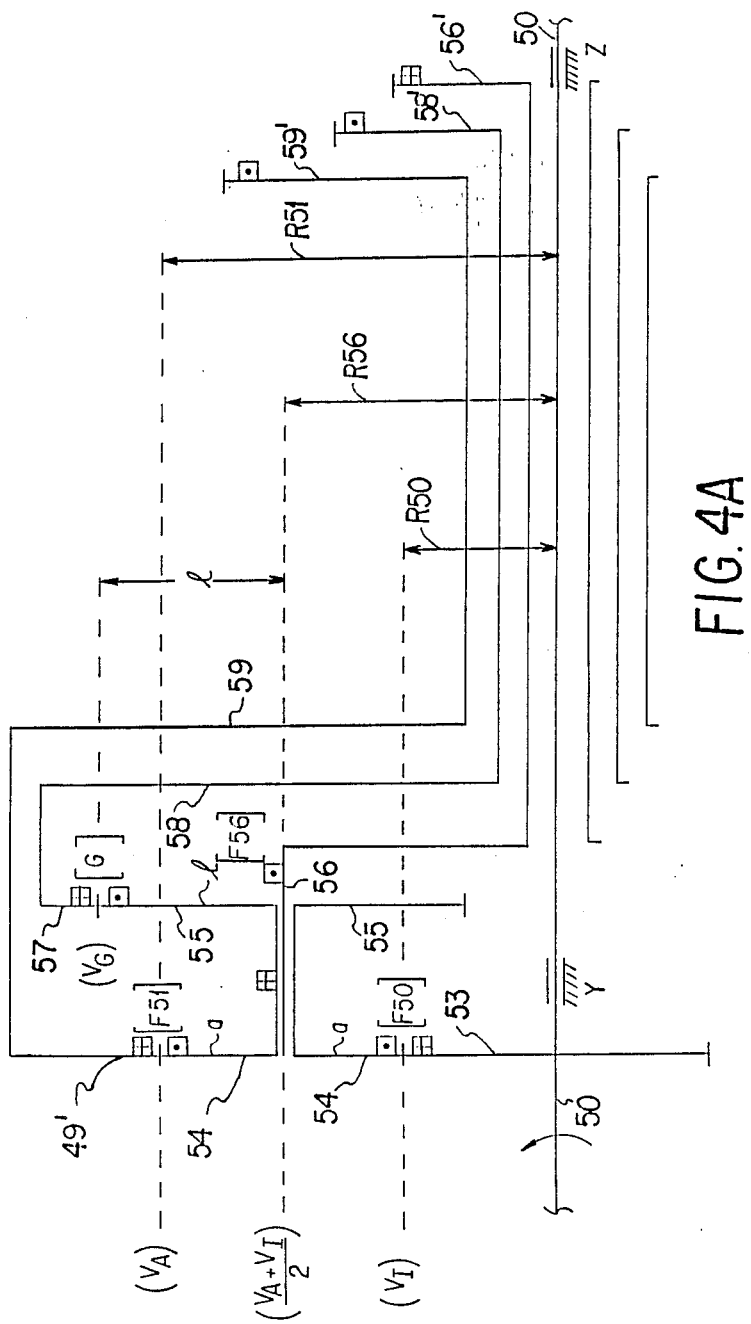
FIG. 4A is a cross-sectional schematic of a typical planetary gear assembly usable in the invention.

Turning now to FIGS. 4A through 4C, the kinetics, i.e. the force distributions, and the kinematics, i.e. the velocity parameters, of the typical planetary gear set previously described, will now be discussed.

Turning to FIG. 4A there is shown a shaft 50, rotatably supported in bearings Y and Z. Affixed to shaft 50 is a sun gear 53 having a radius R50 and it meshes with a dual planetary gear 54, 55. Dual planetary gear 54, 55 is rotatably supported on carrier 56, which in turn is rotatably mounted around shaft 50. The dual planetary gear 54, 55 is also supported by a ring gear 49' and a ring gear 57, meshing with the respective arms of dual planetary gear 54, 55 which have respective dimensions "a" and "1", as shown in FIG. 4A. The equilibrium equations, which determine the nature and magnitude of the forces acting on dual planetary gear 54, 55 are as follows:

for torque equilibrium, the equation is as follows:
[F51]a + [G]1 = [F50]a for force equilibrium, the equation is as follows:
F51 + F50 + G = F56, where F56 is the force acting on carrier 56 of dual planetary gear 54, 55.

If any two of the several forces applied to dual planetary gear 54, 55 is known, the other two forces can be calculated in accordance with the equations given above. Likewise, because of the previously-described rules, the forces acting on the respective ring gears 49 and 57, and the sun gear 53 and carrier 56, each have directions as shown, and they are equal and opposite to the direction of the forces shown as acting on the dual planetary gear 54, 55, all in accordance with rules well known to those skilled in the art. Following the same rules, the magnitude and direction of the forces acting on the carriers 49', 56' and 57' are indicated by the force directions shown in FIG. 4A, and their magnitudes will be determined by the radius at which they are asked to transfer the power, so that the respective carriers 56', 58, and 59 are in torque equilibrium about the axis of shaft 50.

Turning now to FIG. 4B and FIG. 4C, the kinematic relationships between the absolute tangential velocities acting on the dual planetary gear 54, 55 will be described.

FIG. 4B shows a dual planetary gear 54, 55 having the dimensions as indicated, and FIG. 4C, to the right thereof, is a so-called Kutzbach graphical diagram from which the absolute tangential velocities at each point of dual planetary gear 54, 55 can be determined. For a more detailed description of how the Kutzbach diagram allows the graphical calculation of the absolute tangential velocities, reference may be had to pages 85-93 of a book entitled "Epicyclic Drive Trains - Analysis, Synthesis, and Applications", by Herbert W. Müller, Wayne State University Press, Detroit, Copyright 1982, all the pages of which, including the ones mentioned are by this reference expressly incorporated herein. As described in the above-identified reference, and as is well known to those skilled in the art, utilizing the above-mentioned Kutzbach diagram, the respective absolute tangential velocities at each of the meshing, and supporting, points of dual planetary gear 54, 55 is given in terms of $v_I$ and $v_A$. The three absolute tangential velocities existing at the meshing and supporting points of dual planetary gear 54, 55 are given in accordance with the graphical representation shown in FIG. 4C. The magnitude of the absolute tangential velocities existing at each of these points is graphically indicated in FIG. 4C, and, as those skilled in the art will recognize, only simple geometry is required to derive an expression for $v_G$, the magnitude of the absolute tangential velocities existing at the meshing point between dual planetary gear 54, 55 and ring gear 57. This expression for $v_G$ is clearly a function of the distance "l" which can be arbitrarily chosen. Furthermore, the kinematic independence of $v_A$ from $v_I$ can be visualized by imagining the line Q-Q' as being pivoted about the point Q (to vary $v_A$ without varying $v_I$). As line Q-Q' pivots about Q to indicate a varying $v_A$, all other points (including the meshing and supporting points of dual planetary gear 54, 55) will have their absolute tangential velocity vary as indicated in the diagram of FIG. 4C.

The kinematic independence of $v_A$ from $v_I$ above described is dramatically illustrated by the well known behavior of an automobile stuck in the snow. The power from the transmission is delivered to each rear wheel through the action of a differential, one form of a planetary gear set as will be described, and it is quite often true that all the power is delivered to only one rear wheel, namely the spinning wheel, while the other rear wheel does not move at all.

The truism revealed by an inspection of the Kutzbach diagram also suggests an analytical, non-graphical method for determining the absolute tangential velocities of a planetary gear assembly if the absolute tangential velocities at any two of the several meshing, or supporting points of the planetary gear are known. Since the absolute tangential velocities will vary (as the Kutzbach diagram indicates) in a straight line fashion from one point of the planetary gear to another along the radius thereof, the absolute tangential velocity of any one point is simply the superposed addition of the several velocity components (i.e. $v_A$ and $v_I$) making up the combined absolute tangential velocity of any of the other two points of the planetary gear, considering the distance between them. Thus, in FIG. 4B, point F51 moves with an absolute tangential velocity of $v_A$, while point F50 moves with an absolute tangential velocity of $v_I$. The absolute tangential velocity at point G is determined by considering the (independently) determined sum of both $v_A$ and $v_I$ at point G.

Thus, considering only the $v_A$ component (for the moment), since point F51 moves with an absolute tangential velocity of $v_A$ and point F50 moves with an absolute tangential velocity of $0v_A$, point G moves with an absolute tangential velocity, the $v_A$ component of which is given by the straight line relationship $$\frac{v_A(1 + l)}{2}$$

i.e. a function of the distance "l". If "l" = 1, $v_G = v_A$ and with increasing "l", increases in a straight line manner from its intercept point F56, where $v_A$ component is $v_A/2$. The velocity $v_I$ goes from $v_I$ to zero along the dotted line Q-S, while $v_A$ does the same from S' to T.

In a similar fashion, the $v_I$ component is determined in the same manner. The absolute tangential velocity of point G is given by the superposed addition of the two separate $v_A$ and $v_I$ components, namely:

$$v_G = \frac{v_A(1 + l)}{2} + \frac{v_I(1 - l)}{2}$$

The above described analysis also serves as background for the observation (made later) that when two bodies, rotating independently about at least one common axis, have at any one point of each of them absolute tangential velocities that are fixed multiples of one another they can be combined into one power stream. This follows from the above statement by realizing that when such a situation obtains, there is one point on the straight line velocity diagram which moves with an absolute tangential velocity of zero. Thus, even if such two independently rotating bodies have force components which are not in a fixed (i.e. unchanging) relationship to one another, the varying force ratio can be accommodated by the one point in a planetary gear system the absolute tangential velocity of which is zero. The remaining force (resulting from the two equilibrium equations previously discussed) then is allowed to exist at any other point of the planetary gear for subsequent transfer to another destination within the power train.

Figure 5:
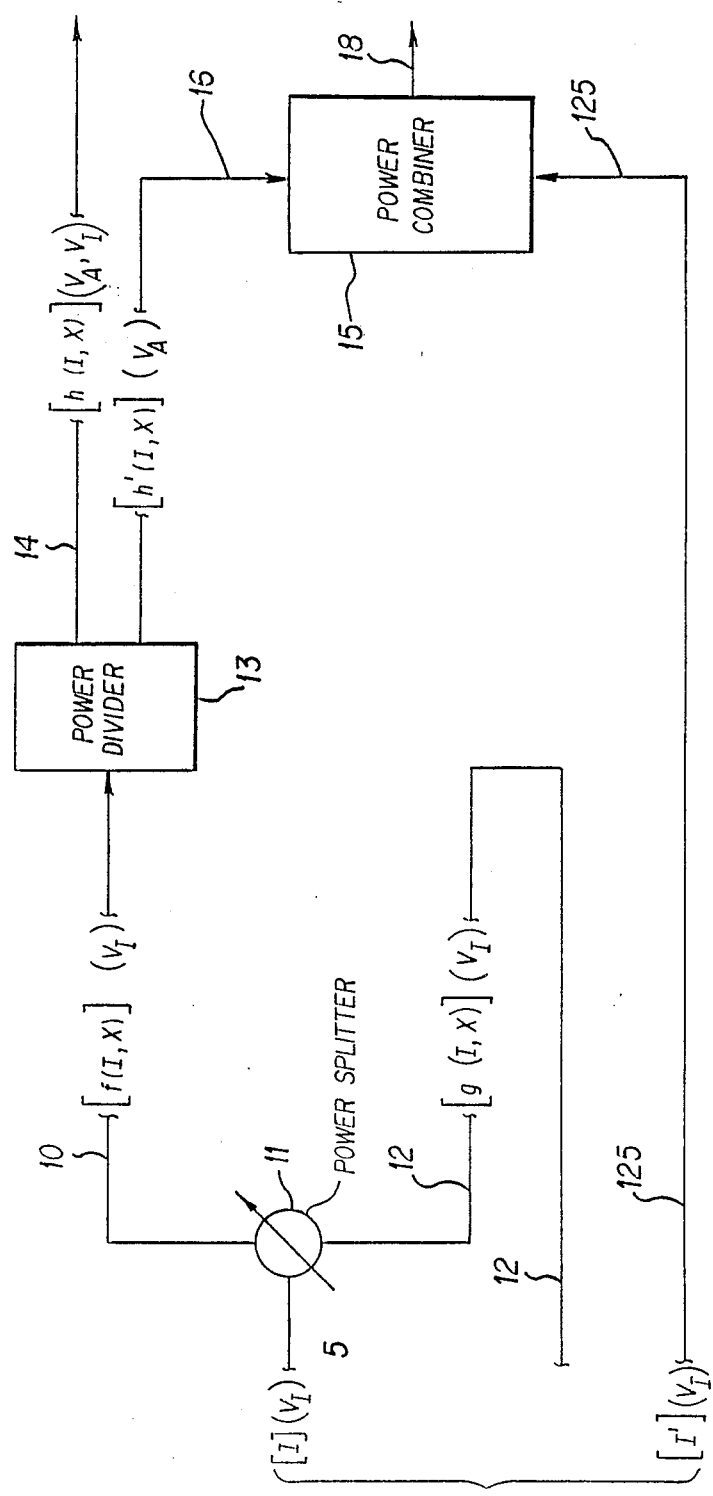
FIG. 5 is a modified schematic block diagram of the invention illustrating the various mechanical functions to achieve the objectives of the invention, modified to yield power streams of the type used to illustrate and describe the operation of the various embodiments of a power combiner according to the invention.

Turning now to FIG. 5, there is shown there a functional block diagram of structure similar to that shown in FIG. 1 with modifications on the basis of which the ensuing description of several preferred embodiments of a power combiner according to the invention will be based.

As will be further explained below, and in order to facilitate an understanding of the invention, it is desirable to arrange the previously-described elements, described in connection with FIG. 1, as shown in FIG. 5, so that the power streams applied to power combiner 15, via mechanical connections 16 and 125, are given in terms of both force and velocity variables which are isolated and which therefore can be more easily traced throughout each of the successive stages of the several embodiments of a power combiner according to the invention. Briefly, a mechanical power stream consisting of a force $[I](v_I)$ is applied via a mechanical connection 5 to a power splitter 11, as previously described. Power splitter 10 develops forces which are different functions of any desired variable "x" on the mechanical connection elements 10 and 12, the latter of which is considered as an additional input source while the mechanical power existing in mechanical connection 10 is applied to power divider 13 which in turn, produces two outputs on mechanical terminals 14 and 16, each of which has the different force and velocity components as shown in FIG. 5. Briefly, the mechanical power applied to power combiner 15 on mechanical connection 16 has as its sole velocity component $v_A$ and has a force component which is solely a function of "x" while the other input applied to power combiner 15, via mechanical connection 125, has a sole velocity component of $v_I$, and a constant magnitude of $[I']$. For purposes of understanding the various embodiments described, it may be assumed that all power streams which have $v_I$ as their sole velocity component are, in fact, supplied by a prime mover. While $v_I$ can be assumed to vary as the requirements of either the prime mover, or the load dictate, it may be thought of as a constant velocity, i.e. unchanging. Likewise, the velocity $v_A$ of the other power stream applied to power combiner 15 via the mechanical connection 16 may be thought of as a totally variable velocity which, as described previously in connection with the power divider 13, is kinematically independent of the (assumed constant) velocity $v_I$.

Furthermore, it should be noted that the nature of the forces of the respective power streams applied to power combiner 15 are such that the power stream applied to power combiner 15 on mechanical connection 125 is of an assumed constant magnitude, i.e. $I'$, whereas the force component of the power stream applied to power combiner 15 via the mechanical connection 16 is, as previously described, a function of an arbitrarily chosen variable parameter "x". Thus, to summarize, the two power streams applied to power combiner 15 are, in the case of mechanical connection 125 a constant power stream, having both constant magnitude and constant velocity, while the second power stream applied to power combiner 15 on terminal 16 has both a force component varying as some function of a desired variable parameter, and a velocity which is kinematically independent of the velocity of the other input stream. Power combiner 15, in a fashion to be described below, will combine these two separate power streams and provide a single output power stream on its mechanical terminal 18 in which the force component is given as some function as "x", thus $[N(I,x)]$ and the velocity component of which is given as some combination function of $(v_I, v_A)$.

Before proceeding with a description of several embodiments of a power combiner according to the invention, it is appropriate to briefly discuss the meaning, as used in this description, of the term "planetary" or "epicyclic" gear. As discussed in connection with FIGS. 3 and 4, planetary gears are essentially gear trains characterized by a minimum of three separate members, each of which is in an independently revolving relationship with respect to the other two, i.e. a sun gear, a planetary gear and a ring gear. It makes no difference to the principles of this invention for the planetary gear set to assume any of the forms shown on pages 27-30 of the above-described book by Herbert W. Müller, i.e. whether the "planetary gear" is known by its more common term of "differential gear set", "bevel differential gear", or similar variations thereof. All of the gear sets shown in the above described reference are essentially three member devices which have a definite relationship of motion upon another, as previously described. It should also be noted that the invention embraces the use of alternative devices which are the equivalents of planetary gears such as are disclosed in U.S. Pat. No. 4,044,633 which shows epicyclically moving sprocket wheels in a setting in which power is transferred over chains rather than gear teeth. For further illustrations of additional types of epicyclic, planetary gear sets suitable for use in the invention, reference may be had to "Modern Transmission Systems", by Arthur W. Judge, Robert Bentley, Inc., Cambridge, Mass. (2d Edition, Copyright 1969), especially pages 77-95 thereof, and pages 94-96 and 206-207 of "Automatic Transmission", by Walter W. Larew, Chilton Book Company, Radnor, Pa. (copyright 1966), all the pages of which, including the ones specifically mentioned herein, are expressly incorporated herein by this reference. As both Judge and Larew point out, examples of epicyclic, or planetary gear sets also include gear sets sometimes more commonly referred to as "spur" or "differential" gear sets.

Furthermore, from the preceding discussion, it is apparent as those skilled in the art well know, that it is possible to combine two power streams, each power stream having its own respective force and velocity component when either (a) the velocities of the two power streams are fixed (i.e. unvarying) multiples of one another (i.e. the velocities are kinematically dependent) or (b) when the force components of the two power streams are fixed multiples (i.e. they are kinetically dependent) of one another.

This is so because, if the several force components have a fixed ratio with respect to one another, the power streams can be combined so that the forces are in torque equilibrium about the (fixed) radii of a planetary gear. Likewise, if the several velocities of two power streams have a fixed ratio with respect to one another, that fixed ratio can be accommodated by suitably selecting the (fixed) radii of the several carriers of the power streams. When neither condition exists, i.e. the velocities and the forces are both varying (i.e. not fixed) multiples of one another (i.e. there are both kinetic and kinematic independence) the combination of two power streams into one becomes a different proposition, heretofore not addressed by the prior art. This is precisely what this invention, in part, achieves.

DETAILED DESCRIPTION

Turning now to FIGS. 6A-6G, there is shown there the various successive stages of a power combiner 15 according to the invention. In this embodiment of a power combiner 15, various planetary gear train parameters are used to manipulate both kinetic (i.e. force) and kinematic (i.e. velocity) properties of the several power streams produced so that all but one of the thusly created power streams are eliminated; this results in one (combined) power stream resulting from the combination of two input power streams which are neither kinetically nor kinematically related.

Figure 6A:
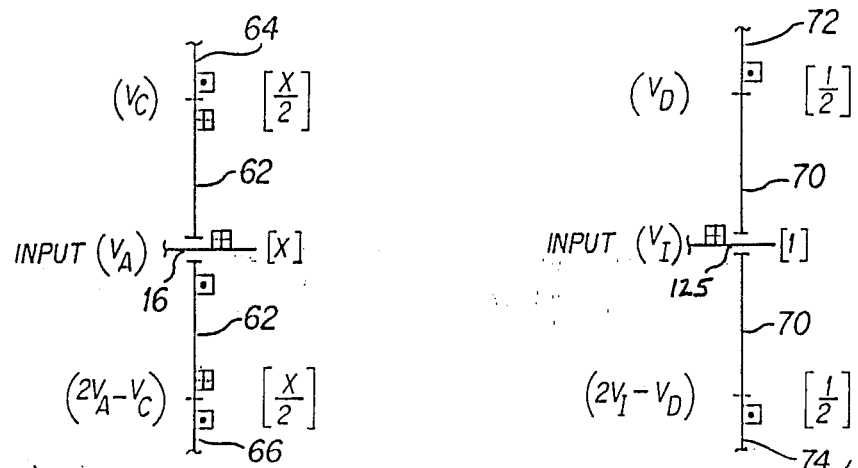
FIGS. 6A-6G are cross-sectional schematics of the various portions of a first embodiment of a power combiner according to the invention.

Turning now to FIG. 6A, there are disclosed two sun gears 62 and 70, each of which, respectively, receives an input power stream on planetary gear carrier shafts 16 and 125, thereby indicating the terminals 16 and 125 (FIG. 5) from whence these power streams originate. Planetary gear 62 meshes both with a ring gear 64 and a sun gear 66, while planetary gear 70 meshes with a ring gear 72 and a sun gear 74. In abbreviated notation, the force directions acting on the planetary gear carrier shafts 16 and 125, and on ring gears 64, 72 and sun gears 66 and 74 are as shown in FIG. 6A, while the force magnitudes are indicated in FIG. 6A in the bracketed notation previously introduced.

The absolute tangential velocity of planetary gear shaft carrier 16 is ($v_A$) while the absolute tangential velocity of planetary gear shaft carrier 125 is ($v_I$). At the meshing point between planetary gear 62 and ring gear 64, the absolute tangential velocity is, for the time being, denoted by a temporarily unknown velocity, namely ($v_C$). According to the principles previously discussed, the absolute tangential velocity at the meshing point between planetary gear 62 and sun gear 66 is therefore given by the quantity ($2v_A$-$v_C$).

The absolute tangential velocity where planetary gear 70 meshes with ring gear 72 is also denoted by a temporarily unknown velocity, namely ($v_D$). This makes the absolute tangential velocity at the meshing point between planetary gear 70 and sun gear 74 ($2v_I$-$v_D$).

The net effect of the structure shown in FIG. 6A is to have dispersed the two input power streams appearing on planetary gear carrier shafts 16 and 125 into a plurality of power streams, namely those appearing on ring gears 64 and 72, and sun gears 66 and 74. Furthermore, each of these power streams is to be coupled to carriers (in accordance with the previously described simplified notation, not shown) all rotating about a common main axis (likewise not shown in accordance with the previously described simplified notation). It should also be noted that planetary gears 62 and 70 are symmetrically dimensioned about their respective planetary gear carrier shafts 16 and 125 so that the forces appearing at the respective ring gears 64 and 72, as well as the forces appearing at the respective sun gears 66 and 74, are simply integral halves of the forces appearing on planetary gear carrier shafts 16 and 125.

Figure 6B:
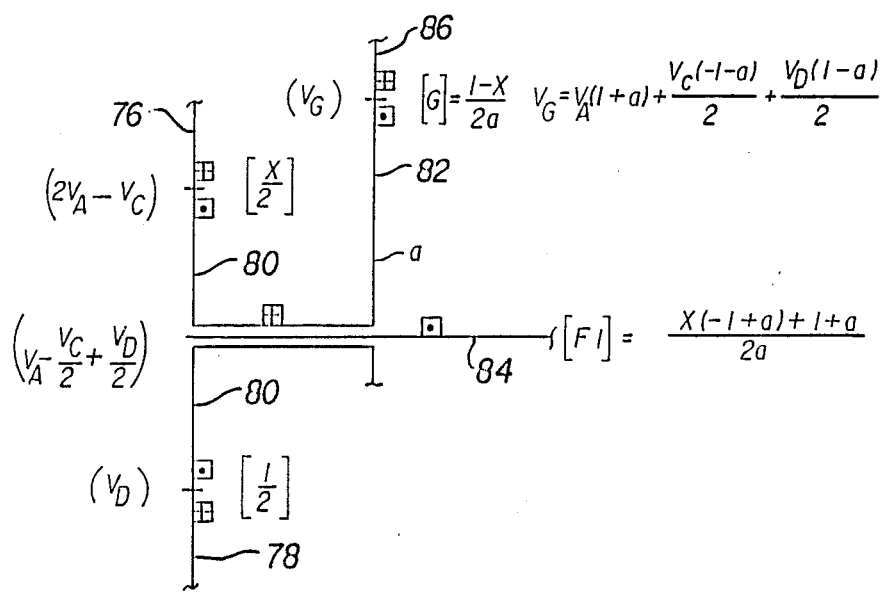

Turning now to FIG. 6B, there is shown there a further stage of a power combiner 15 according to the invention. By a carrier (not shown) the power provided by sun gear 66 is provided to a ring gear 76, while the power from ring gear 72 is provided via a carrier (not shown) to sun gear 78. Ring gears 76 and 78 both mesh with a dual planetary gear 80, 82, the latter of which also meshes with a ring gear 86. The dimension of planetary gear 82, which rotates about planetary gear carrier shaft 84 is given by, for the moment, an arbitrary distance, "a". As a result of the fact that dimension "a" can be freely chosen at any specific value (to be later decided upon) the magnitude of the force [G] appearing at the meshing point between dual planetary gear 80, 82 and ring gear 86, as shown in FIG. 6B is a function of the dimension "a". Likewise, the absolute tangential velocity ($v_G$) is also, like [G], influenced by, and a function of, the freely choosable dimension "a". By the identical principles previously described, the force [F1] appearing on planetary gear carrier shaft 84 is as shown in FIG. 6B, and is also a function of both of the input forces (from ring gear 76 and sun gear 78) and the freely choosable dimension "a".

The net effect, and purpose of, the dual planetary gear 80, 82 shown in FIG. 6B is to have taken two of the power streams generated by the structure shown in FIG. 6A and have combined them into two new power streams, appearing on ring gear 86 and planetary gear carrier shaft 84, with a new parameter, i.e. "a" introduced as a means of varying, or manipulating, these two power streams. The structure of FIG. 6C has the identical purpose.

Figure 6C:
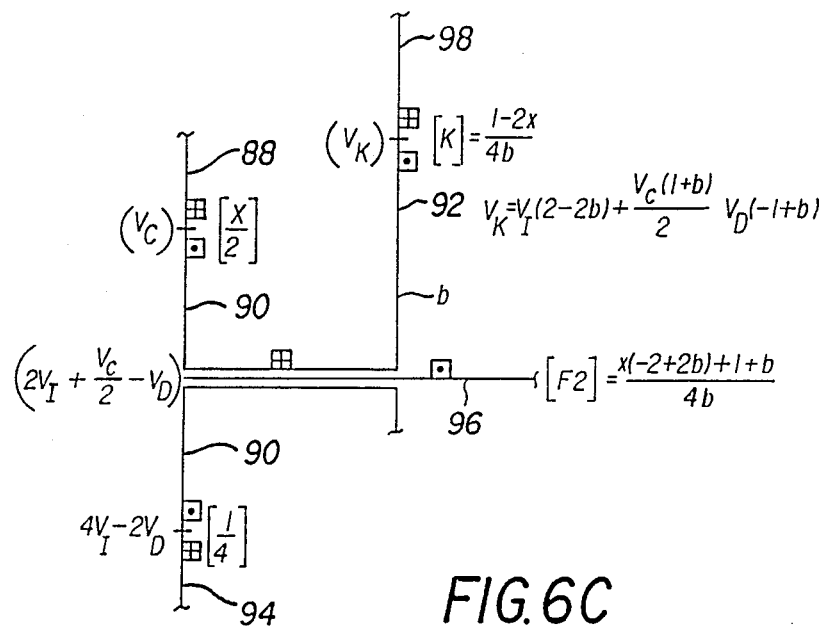

Turning now to FIG. 6C, the power stream appearing on ring gear 64 (FIG. 6A) is transferred via a carrier (not shown) to a ring gear 88, while the power stream appearing on sun gear 74 is transferred via a carrier (not shown), but at twice the velocity, to a sun gear 94. Ring gear 88 and sun gear 94 mesh with a dual planetary gear 90, 92, the latter of which also meshes with a ring gear 98. The dimension of planetary gear 92 is given by a dimension "b" which may be freely chosen, and arbitrarily selected. As a result, two new power streams now appear on ring gear 98 and planetary gear carrier shaft 96, the respective force and velocity components of which are as shown in FIG. 6C and which, in accordance with the previous discussion with respect to FIG. 6B, are now a function of, and controllable by, an appropriate choice for the dimension "b".

In summary, therefore, the net effect of the structures shown in FIGS. 6B and 6C is to have created four discrete power streams, on ring gear 86 and planetary gear carrier shaft 84 (FIG. 6B) and ring gear 98 and planetary gear carrier shaft 96 (FIG. 6C) which now are dependent upon, and can be varied by, suitable choice of the variably selectable dimensions "a" and "b".

Figure 6D:
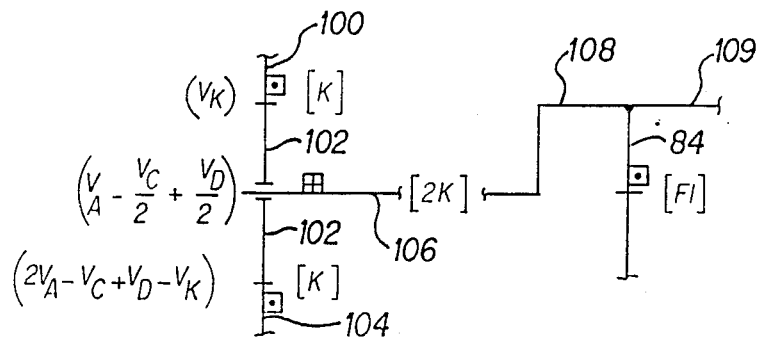

Turning now to FIG. 6D, by a carrier (not shown), the power from ring gear 98 is transferred to a ring gear 100. Ring gear 100 meshes with a planetary gear 102, the planetary gear carrier shaft 106 of which moves at the same absolute tangential velocity as the planetary gear carrier shaft 84 of dual planetary gear 80, 82 (see FIG. 6B). This has the effect of allowing the simple additive combination of the force [2K] appearing on planetary gear carrier shaft 106 with the force [F1] appearing on planetary gear carrier shaft 84. This algebraic combination is effected by the power from planetary gear carrier shaft 106 being applied to a carrier 108 moving at the same absolute tangential velocity as planetary gear carrier shaft 84, and the thus resultant combined force is provided to a carrier 109.

Figure 6E:
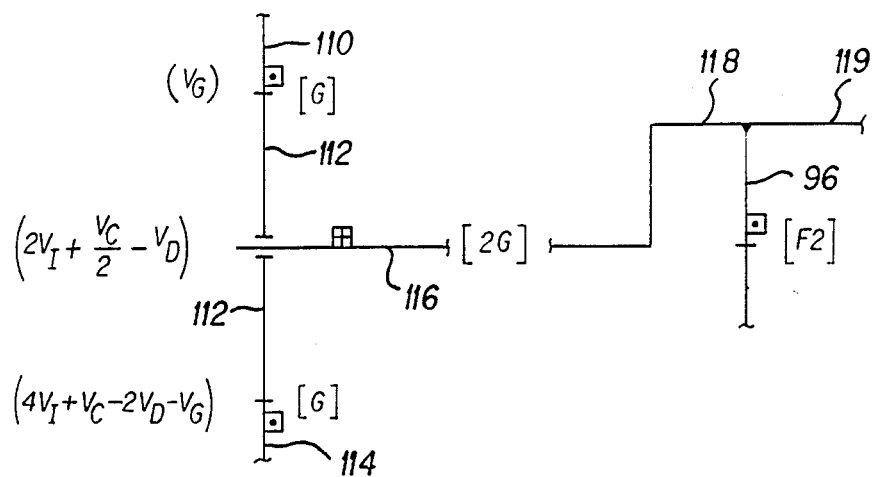

Turning now to FIG. 6E, the power from ring gear 86 is transferred via a carrier (not shown) to a ring gear 110. Ring gear 110 meshes with a planetary gear 112, the planetary gear carrier shaft 116 of which moves with the same absolute tangential velocity as planetary gear carrier shaft 96 (FIG. 6C) of dual planetary gear 90, 92. In the like manner as described with reference to FIG. 6D, this results in an algebraic combination on carrier 119 of the forces respectively appearing on planetary gear carrier shaft 116 and 96.

Figure 6F:
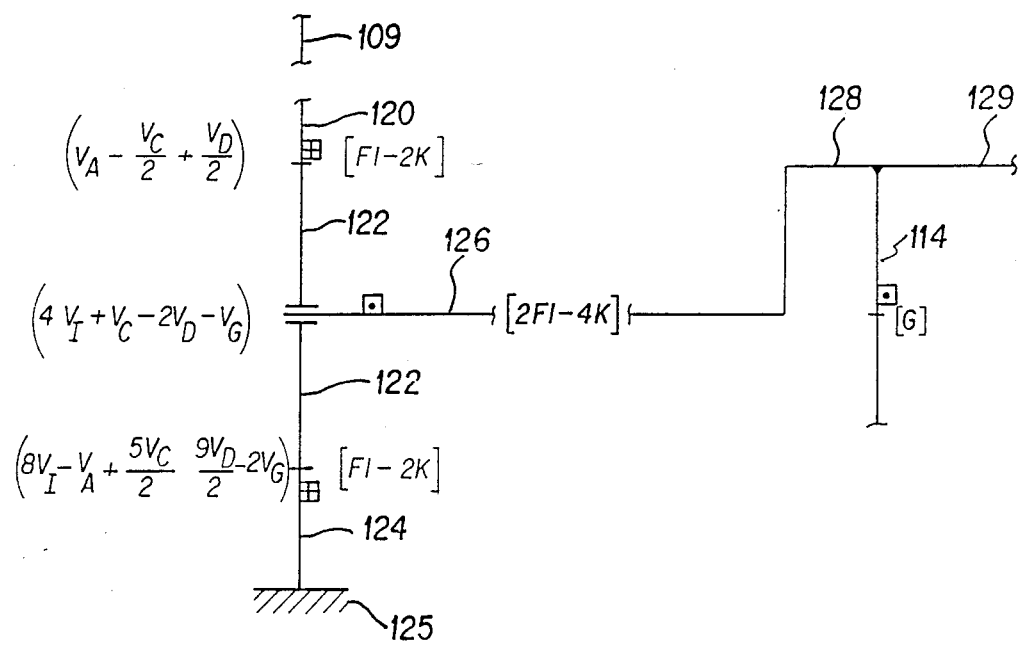

Turning now to FIG. 6F, the power transferred by carrier 109 (FIG. 6D) is transferred via a carrier (not shown) to ring gear 120. Ring gear 120 meshes with a planetary gear 122, the absolute tangential velocity of the carrier 126 of which is chosen to be the same as the absolute tangential velocity of the sun gear 114, previously described in FIG. 6E. This has the effect of creating by way of carriers 128 and 129, a power stream thereon the force component of which is given as the algebraic sum as follows:

$$2F1 - 4K + G.$$

Turning now to FIG. 6E, the power stream from carrier 119 is applied via a carrier (not shown) to a ring gear 130. Ring gear 130 meshes with a planetary gear 132 the absolute tangential velocity of the carrier shaft 136 of which moves with the same absolute tangential velocity as sun gear 104 so that, by way of carrier 138 and 139, a power stream is created the force component of which is given by the following expression:

$$2F - 4G + K.$$

In each of the FIGS. 6D–6G the absolute tangential velocities at the meshing points between the various members of the planetary gear sets there shown, are as indicated in FIGS. 6D–6G and the determination thereof follows the rules previously described. The net effect of the structure shown in FIGS. 6D–6G is to have created a plurality of "interleaved" power streams, each of which has both force, and velocity, components that are a function of the previously-described dimensions "a" and "b", in connection with FIGS. 6B and 6C. Of the four separate power streams indicated in FIGS. 6F and 6G, three of them can be eliminated by suitable selection of the parameters "a" and "b" as follows:

The power stream appearing on carrier 129 can effectively be eliminated by assuring that its force component, $2F1 - 4K + G$ is zero. The equation for that circumstance to obtain is given below (Setting the net force component of a power stream having several constituent forces to zero amounts to saying that the member is in force equilibrium without the need to have further forces acting thereon -- as for example, by connection to another load):

$$2F - 4K + G = 0$$

Likewise, the two power streams appearing on sun gear 124 (FIG. 6F) and sun gear 134 (FIG. 6G) can be eliminated by setting the absolute tangential velocity thereof to zero. This results in the following two equations:

$$8v_I - v_A + \frac{5v_C}{2} - \frac{9v_D}{2} - 2v_G = 0$$

$$-2v_I + 4v_A - \frac{5v_C}{2} + 3v_D - 2v_K = 0$$

By rather straightforward algebraic procedures, the solution for these equations yields the following values:

$$a = -\tfrac{3}{4}$$
$$b = -\tfrac{1}{2}$$

$$v_C = \frac{256v_A - 32v_I}{234}$$

$$v_D = \frac{4v_A + 32V_I}{26}$$

Figure 6G:
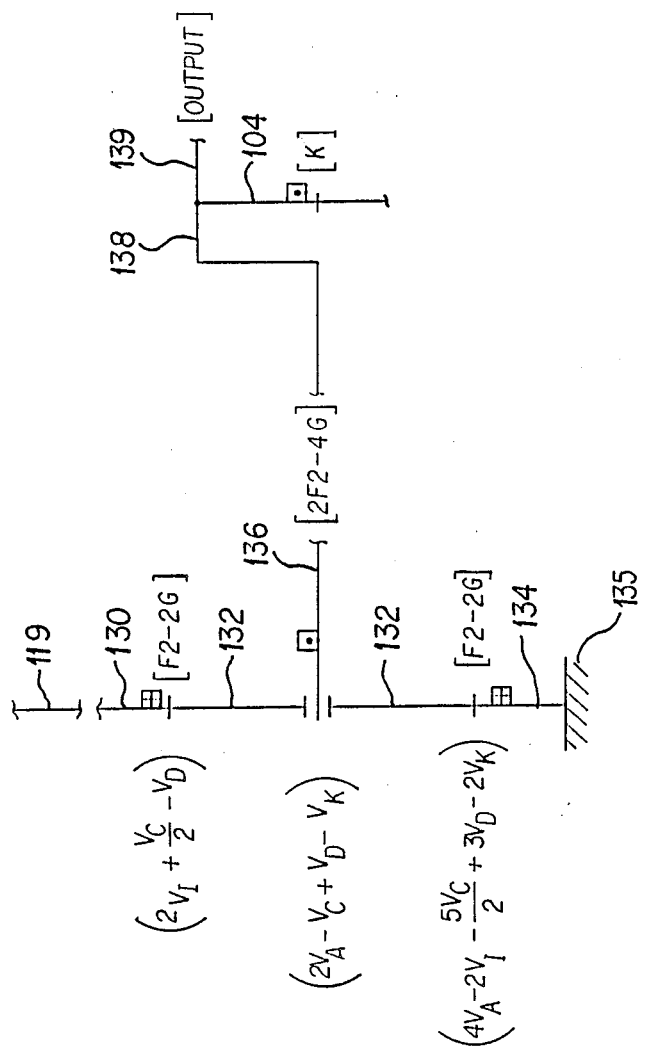

Having thus disposed of the no less than all but one of the power streams appearing in FIGS. 6F and 6G, the sole remaining power stream constituting the output power stream from this embodiment of a power combiner 15 according to the invention appears on carrier 139. This power stream has a net force component of:

$$2F2 - 4G + K$$

with an absolute tangential velocity of $$2v_A - v_C + v_D - v_K$$

To summarize, the two input power streams shown on planetary gear carrier shafts 16 and 12 (FIG. 6A), which force streams have both kinetic and kinematic parameters that are wholly independent of one another, have been combined into a single resultant power stream, appearing on carrier 139 (FIG. 6G) to thus achieve the purposes and function of a power combiner 15 according to the invention. Carrier 139 is analogous to terminal 18 of the power combiner 15 shown in FIG. 1.

It is to be noted that this result has been achieved in the structure shown in FIGS. 6A–6G by the mechanism of the creation of the plurality of power streams, each variable in response to the selection of a fixed dimension "a" and "b". No other parameters need to be varied to achieve the desired functions of a power combiner 15 in accordance with the invention. Once the dimensions "a" and "b" have been selected in accordance with the determinations of the equations above described, the power stream shown as appearing on carrier 139 moves with an absolute tangential velocity, and has a net force component, as previously described. This force component is a combination of the variable [x] force component of one of the input streams appearing on planetary gear carrier shaft 16 (FIG. 6A) and the (assumed) constant force component [1] appearing on planetary gear carrier shaft 125 (FIG. 6A) as follows:

$$2F2 - 4G + K$$

Turning now to FIGS. 7A–7G, there is shown the schematic cross-sectional diagrams of successive stages of a power combiner 15 according to the invention which successive stages are added to the stages disclosed in FIGS. 6A–6C, but so arranged that there is no power output component from the power combiner 15 according to the invention. In summary, FIGS. 7A–7G disclose the introduction of additional, freely choosable, parameters "c", "j", and "s" in order to allow sufficient variables to exist from which all power streams created within the power combiner 15 can each be set to zero by appropriate variations of both kinetic and kinematic parameters.

Figure 7A:
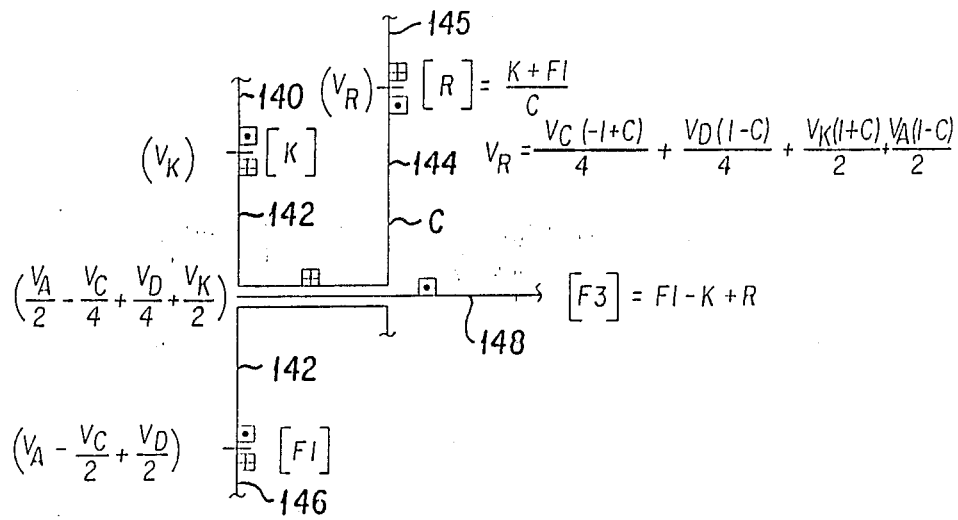
FIGS. 7A-7G are cross-sectional schematics of the various portions of a second embodiment of a power combiner according to the invention.

Turning now to FIG. 7A, there is shown a structure which proceeds from prior power streams created by the structures shown in FIG. 6B and 6C. By way of a carrier (not shown) the power stream from ring gear 98 is applied to a ring gear 140, and the power stream from planetary gear carrier shaft 84 (FIG. 6B) is applied by a carrier (not shown) to a sun gear 146. Ring gear 140 and sun gear 146 mesh with a dual planetary gear 142, 144, the latter of which also meshes with a ring gear 145. Dual planetary gear 142, 144 rotates about a planetary gear carrier shaft 148 the absolute tangential velocity of which is as shown in FIGS. 7A, all in accordance with the rules previously described. Dual planetary gear 142, 144 also meshes with a ring gear 145 and the dimension of planetary gear 144 is designated by the freely choosable dimension "c". In accordance with the rules previously discussed, the respective force and absolute tangential velocity components of the two force streams appearing on ring gear 145 and planetary gear carrier shaft 148 are as shown in FIG. 7A and follow the rules previously described.

Figure 7B:
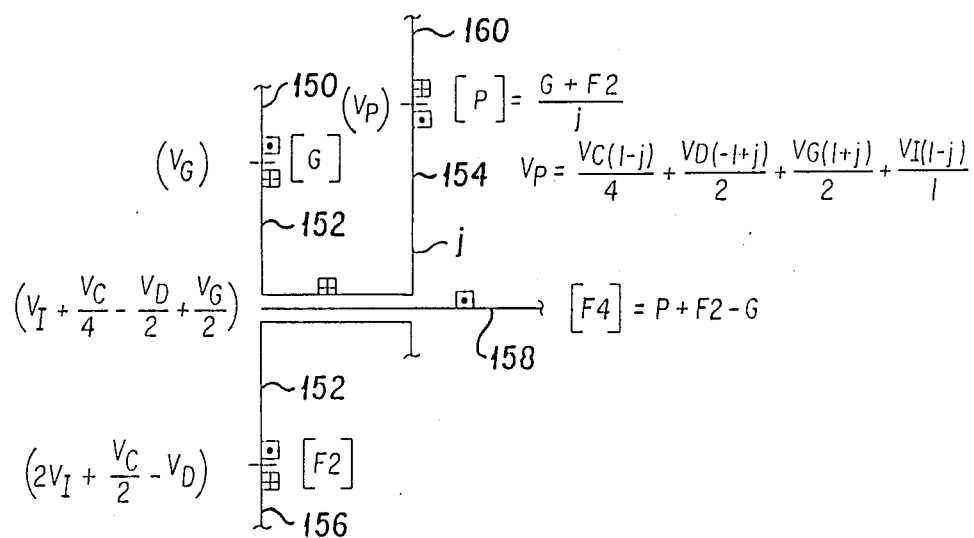

Turning now to FIG. 7B, this structure also utilizes power streams previously generated by the structures shown in FIGS. 6B and 6C. By way of a carrier not shown, the power stream from ring gear 86 (FIG. 6B) is applied to a ring gear 150 and the power stream from planetary gear carrier shaft 96 (FIG. 6C) is applied to ring gear 156, as shown in FIG. 7B. Ring gear 150 and sun gear 156 mesh with a dual planetary gear 152, 154, the dimension of the latter of which can be freely chosen by suitably selecting the dimension "j". Dual planetary gear 152, 154 rotates about a planetary gear carrier shaft 158 and meshes with a ring gear 160. Again, in accordance with the rules previously described, the forces, and the absolute tangential velocities, of the power stream appearing on planetary gear carrier shaft 158 and ring gear 160 are a function of a freely choosable and selectable dimension "j".

Figure 7C:
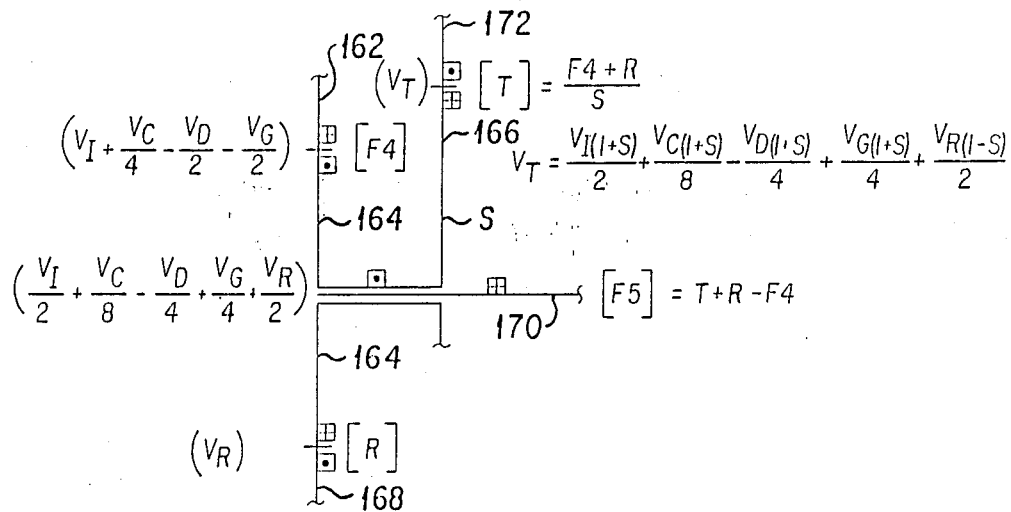

Turning now to FIG. 7C, there is disclosed a subsequent stage of a power combiner 15 according to the invention. This stage utilizes power streams created in the stages disclosed in FIGS. 7A and 7B. By a carrier (not shown) the power stream appearing on planetary gear carrier shaft 158 (FIG. 7B) is applied to a ring gear 162, and the power stream appearing on ring gear 145 (see FIG. 7A) is applied to a sun gear 168. Ring gear 162 and sun gear 168 mesh with a dual planetary gear 164, 166, the dimension "s" of the latter of which is freely choosable and selectable, again in a fashion similar to that previously described for other dual planetary gears. Dual planetary gear 164,166 rotates about a planetary gear carrier shaft 170 and meshes with a ring gear 172. The respective force and absolute tangential velocity components of the power stream appearing on planetary gear carrier shaft 170 and ring gear 172 are given as a function of the freely choosable parameter "s", and are as shown in FIG. 7C all in accordance with the rules previously described.

To summarize, the structure thus far disclosed in FIGS. 7A-7C has taken power streams previously generated by the structure shown in FIGS. 6A-6C and modified them to now contain additional parameters which can be freely chosen, namely "c", "j", and "s".

The remaining structure shown in FIGS. 7D-7G is analogous to the structure shown in FIGS. 6D-6E in that they function to interleave the power streams created in FIGS. 7B-7C so as to create a plurality of power streams, each of which is a function of all the various parameters introduced by the structure, namely "a", "b", "c", "j", and "s".

Figure 7D:
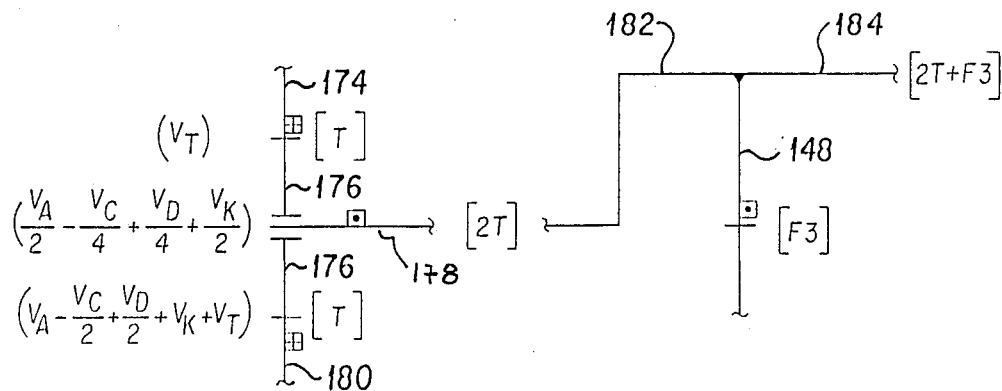

Turning now to FIG. 7D, by a carrier not shown, the power stream appearing on ring gear 172 (FIG. 7C) is applied to a ring gear 174. Ring gear 174 meshes with a planetary gear 176, the absolute tangential velocity of the carrier 178 of which moves with the same absolute tangential velocity as planetary gear carrier shaft 148 (FIG. 7A). This has the result of creating a power stream on carrier 184 the force component of which is the algebraic sum of the force appearing on planetary gear carrier shaft 178 and planetary gear carrier shaft 148 (see FIG. 7A), combined by way of carriers 182 and 184. The force and absolute tangential velocity components of the structure shown in FIG. 7D are all determined in accordance with rules previously described.

Figure 7E:
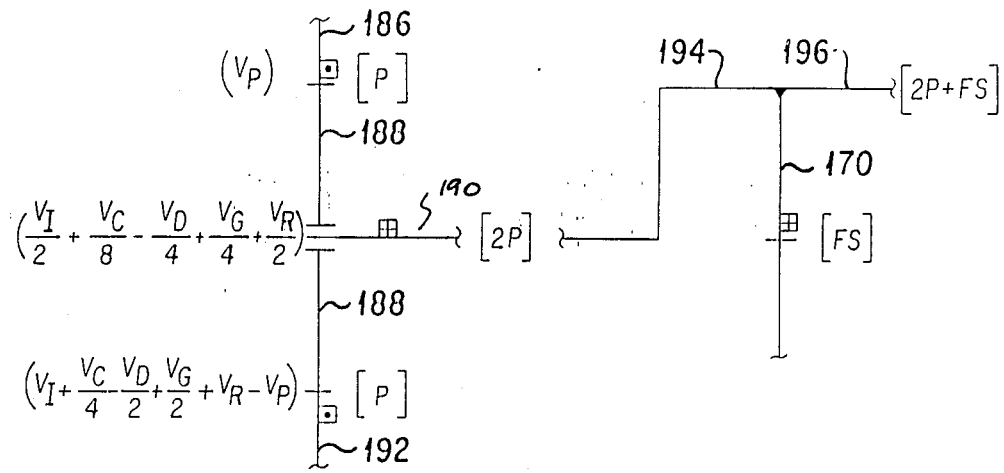

Turning now to FIG. 7E, the power stream from ring gear 160 (FIG. 7B) is applied via a carrier (not shown) to a ring gear 186. Ring gear 186 meshes with a planetary gear 188, the absolute tangential velocity of the carrier 190 of which is chosen to be the same as the absolute tangential velocity of planetary gear carrier shaft 170 (FIG. 7C). This has the effect of algebraically combining the forces appearing on planetary gear carrier shafts 190 and 170, by way of carriers 194 and 196, to be the algebraic sum of the respective components thereof. Also, again in accordance with rules previously described, the absolute tangential velocities of the meshing points of planetary gear 188 with both ring gear 186 and sun gear 192 are as shown in FIG. 7E and follow the rules previously described.

Figure 7F:
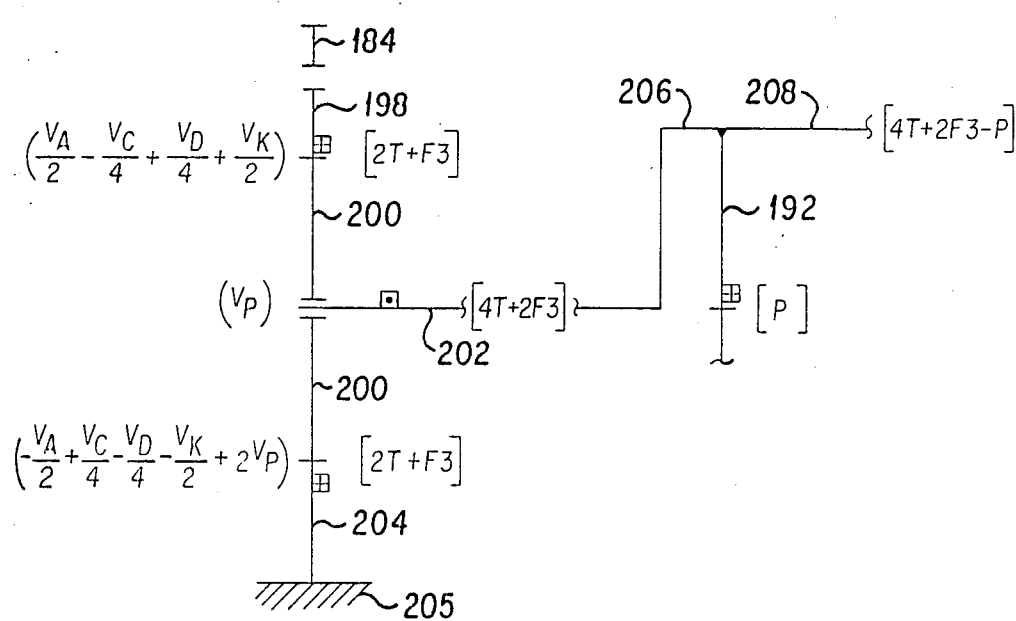

Turning now to FIG. 7F, by a carrier (not shown) the power stream from carrier 184 is applied to a ring gear 198. Ring gear 198 meshes with a planetary gear 200, the absolute tangential velocity of the carrier 202 of which is selected to be the same as the absolute tangential velocity of sun gear 192 (FIG. 7E). By connecting the carriers 206 and 208 together with 202 and 192, a power stream is created on carrier 208 the force component of which is the algebraic sum of the separate forces appearing on planetary gear shaft 202 and sun gear 192, all as shown in FIG. 7F. Likewise, the absolute tangential velocity of sun gear 204, which is terminated by a fixed support 205, thereby indicating it fixed at zero, is as shown in FIG. 7F.

Figure 7G:
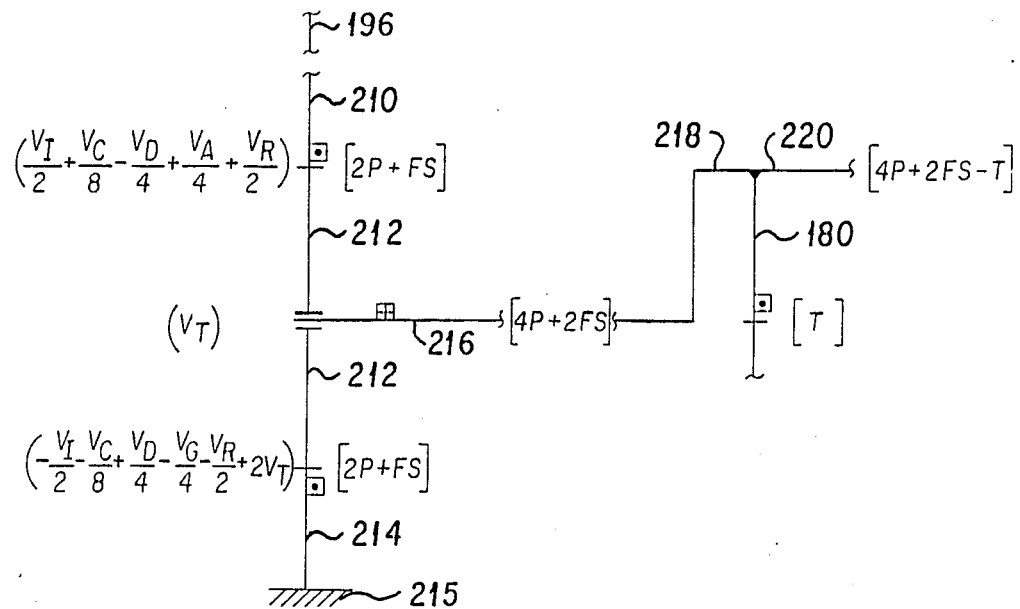

Turning now to FIG. 7G, the power stream appearing on carrier 196 (FIG. 7E) is applied by way of a carrier (not shown) to a ring gear 210. Ring gear 210 meshes with a planetary gear 212, the absolute tangential velocity of the carrier 216 of which is chosen to be the same as the absolute tangential velocity of the sun gear 180 (FIG. 7D). This has the effect of combining, in a fashion as previously described, (by way of carriers 218 and 220 which link planetary gear carrier shaft 216 with sun gear 180) a power stream on carrier 220, the force component of which is given by the algebraic sum of the separate forces appearing on planetary gear shaft carrier 216 and sun gear 180, all as shown in FIG. 7G. Planetary gear 212 also meshes with a sun gear 214, the absolute tangential velocity of which has been fixed at zero by connection thereof to a fixed support 215. The absolute tangential velocity of the meshing point between planetary gear 212 and sun gear 214 is given by the expression shown in FIG. 7G and again the determination follows the rules previously described.

To summarize, FIGS. 7F and 7G show four power streams, namely the power streams appearing on carriers 208 and 220, and the power streams appearing on sun gears 204 and 214. Since the absolute tangential velocity of the respective sun gears 204 and 214 are effectively set at zero, these power streams have been eliminated from further consideration.

Likewise, the power streams appearing on carriers 208 and 220 can be eliminated by setting their net force component to zero which yields the following equations:

$4T+2-F3-P=0$ and $4P+2F5-T=0$.

Solving these equations in terms of the various parameters "a", "b", "c", "j" and "s" is a straightforward, though somewhat complex, algebraic exercise. In order to simplify the calculations, one of the variables, say "s", can be arbitrarily fixed at a reasonable number, say ½, and this produces the following values for a=−3, b=¾, c=−0.33 and j=5/24.

Once these values for a, b, c, j, and s have been determined, the equations resulting from fixing the absolute tangential velocities of sun gears 204 and 214 to zero, which are as follows:

$$-\frac{v_A}{2}+\frac{v_C}{4}-\frac{v_D}{4}-\frac{v_k}{2}+2v_P=0$$

$$-\frac{v_I}{2}-\frac{v_c}{8}+\frac{v_D}{4}-\frac{v_G}{4}-\frac{v_R}{2}+2v_T=0$$

will define the values of $v_C$ and $v_D$ as separate functions of both $v_A$ and $v_I$.

Because the final stages of a power combiner 15 according to the invention shown in FIGS. 7A-7G are all with a zero output, i.e. because in some instances the power streams have zero force components, and in some instances have zero velocity components, it has been possible to create a power combiner 15 from which there is no output. This means effectively, by referring to FIG. 1, that the power stream appearing on terminal, i.e. carrier, 14 constitutes the output power stream of a transmission according to the invention. Such a power stream will be a power stream which has a force component which is a function of both the variable parameter "x" and any constant sum, and a velocity component $v_A$ which is kinematically totally independent from the velocity component $v_I$ of the input power stream to the transmission. This is precisely what constitutes a variable power converter according to the invention.

Turning now to FIGS. 8A-8I, there is shown there a third embodiment of a power combiner 15 according to the invention. Unlike the two previous embodiments of a power combiner 15 disclosed in FIGS. 6 and 7, this embodiment of a power combiner proposes to use not only exclusively kinematic, or exclusively kinetic, manipulation of the power streams as previously disclosed in FIGS. 6 and 7, but also a hybrid technique, involving both kinematic and kinetic manipulation, through the use of internally generated "feedback" or "regenerative" loops to eliminate power streams.

Turning now to FIG. 8A, there is shown a planetary gear 224 rotating about a planetary gear carrier shaft 232. The force component of the power stream appearing on planetary gear shaft carrier 232 is of a magnitude "P", thereby indicating that it derives from an internal feedback loop created within the power combiner. Planetary gear 224 meshes with both a ring gear 222 and a sun gear 226, the respective absolute tangential velocities of which are chosen to be identical to the absolute tangential velocities of the two inputs appearing on carriers 16 and 125, as previously described. By carriers (not shown) the power from ring gear 222 is combined with the power on input carrier 16 to yield a combined force on carrier 230 which is the sum of the force of the input power stream and the force on ring gear 222. In a similar fashion, by a carrier (not shown) the power from ring gear 226 is combined with the power on carrier 125 into a carrier 236 to yield a force component as shown in FIG. 8A, all in accordance with the rules previously described.

Turning now to FIG. 8B, the power stream from carrier 230 is transferred via a carrier (not shown) to the planetary gear shaft carrier 238 around which revolves a planetary gear 240. Planetary gear 240 meshes with a ring gear 244 and a sun gear 242. The absolute tangential velocities and forces existing at the meshing points of planetary gear 240 with ring gear 244 and sun gear 242 are as shown in FIG. 8B.

Turning to FIG. 8C, the power appearing on carrier 236 (FIG. 8A) is applied to planetary gear carrier shaft 246 around which revolves a planetary gear 248. Planetary gear 248 meshes with a sun gear 250 and a ring gear 252. The absolute tangential velocities, and forces, at the meshing points between planetary gear 248 and sun gear 250 and ring gear 252 are as shown in FIG. 8C, and a brief review of FIGS. 8B and 8C indicates that the input power stream to the two respective planetary gears 240, 248 constituting the separate input power streams to a power combiner 15, have been broken up into four separate power streams, namely the two power streams appearing on sun gears 242, 250 and the two power streams on ring gears 244, 252.

As with the previous embodiments shown in FIG. 6A-6E, the absolute tangential velocity at the meshing point of planetary gear 240 with ring gear 244 is given by the notation vC while the absolute tangential velocity at the meshing point between planetary gear 248 and ring gear 252 is given by the expression $v_D$. As previously explained in connection with the embodiment shown in FIGS. 6A-6E, $v_C$ and $v_D$ are temporarily unknown velocities, subject to determination as will be described hereinbelow.

Turning now to FIG. 8D, the power stream appearing on ring gear 244 (FIG. 8B) is transferred via a carrier (not shown) to a ring gear 254. Ring gear 254 meshes with a planetary gear 256 rotating about a planetary gear carrier shaft 260. Planetary gear 256 also meshes with a sun gear 258. By a carrier 261, the power stream appearing on planetary carrier gear shaft 260 is transferred to a ring gear 262 which meshes with a planetary gear 264, the absolute tangential velocity of the carrier 270 of which is chosen to be the same as absolute tangential velocity of planetary gear shaft carrier 232 (FIG. 8A), the carrier shaft which is adapted to receive the feedback force "P".

Planetary gear 264 also meshes with a sun gear 268 and, by virtue of the fact that the planetary gear carrier shaft 270 is connected to planetary gear carrier shaft 232 (FIG. 8A), thereby fixing its absolute tangential velocity, the tangential velocities of sun gears 258 and 268 is likewise fixed as shown in FIG. 8D.

By the rules previously discussed, the force components at the various meshing points of planetary gear 256 and 264 are as shown in FIG. 8D.

Figure 8E:
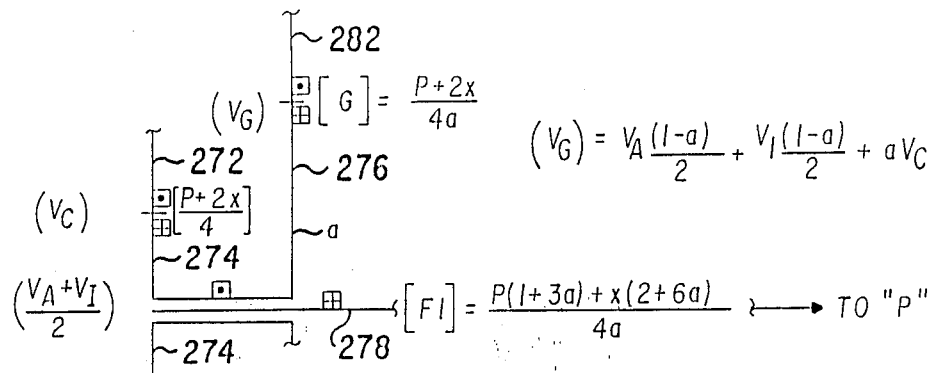

Turning now to FIG. 8E, by way of a carrier (not shown) the power stream appearing on sun gear 258 (FIG. 8D) is applied to a ring gear 272 which meshes with a dual planetary gear 274, 276, rotating about a planetary gear shaft carrier 278. Dual planetary gear 274, 276 also meshes with a sun gear 280 and with a ring gear 282. The dimension 276 of dual planetary gear 274, 276 is a freely choosable dimension "a". Since sun gear 280 has applied to it by way of a carrier (not shown) the power appearing on sun gear 268 (FIG. 8D), the nature of the forces G and F1 arising respectively at the meshing point of dual planetary gear 274, 276 with ring gear 282, and the planetary gear carrier shaft 278, is given by the expressions as shown in FIG. 8E. From these expressions, it is noted that both G and F1 are functions of the two forces appearing from ring gear 272 and sun gear 280, as well as the freely choosable dimension "a". Furthermore, it should also be noted that the absolute tangential velocity of planetary gear carrier shaft 278 is identical to the absolute tangential velocity of planetary gear carrier shaft 232 (FIG. 8A) so that F1 also becomes another component to the feedback force "P".

Figure 8F:
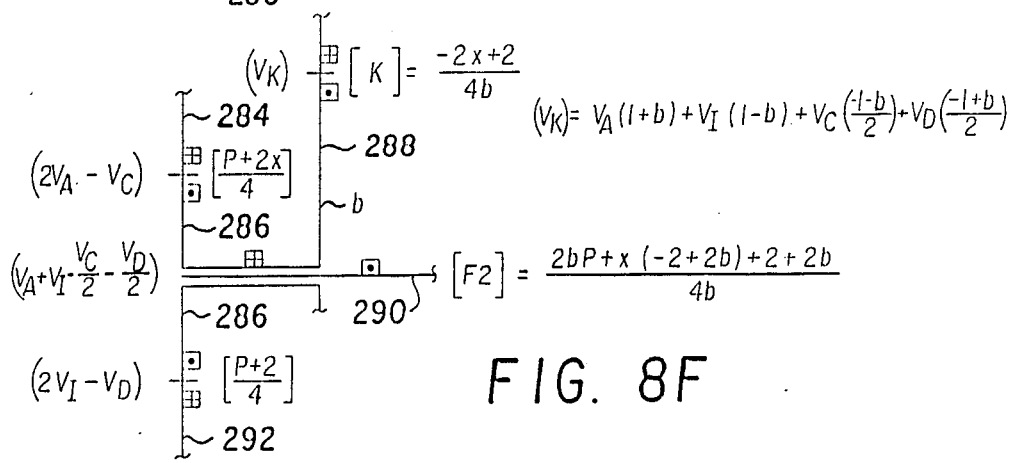

Turning now to FIG. 8F, there is disclosed a dual planetary gear 286, 288 which receives as its respective inputs the power streams from sun gears 242 and 250 (FIGS. 8B and 8C) by way of ring gear 284 and sun gear 292, respectively. Dual planetary gear 286, 288 revolves around a planetary gear carrier shaft 290 and also meshes with a ring gear 294. The dimension "b" of dual planetary gear 286, 288 is freely choosable and by suitable variation of dimension "b" it can be seen that the force K, arising at the meshing point of dual planetary gear 286, 288 with ring gear 294 is a function of the freely choosable dimension "b". Likewise, the force F2, arising on planetary gear carrier shaft 290—by the previously discussed rules of equilibrium for dual planetary gear 286, 288—is as shown in FIG. 8F, also a function of "b". Also, by the rules as previously described, the absolute tangential velocities at each of the meshing and supporting points of dual planetary gear 286, 288 are as shown in FIG. 8F.

Figure 8G:
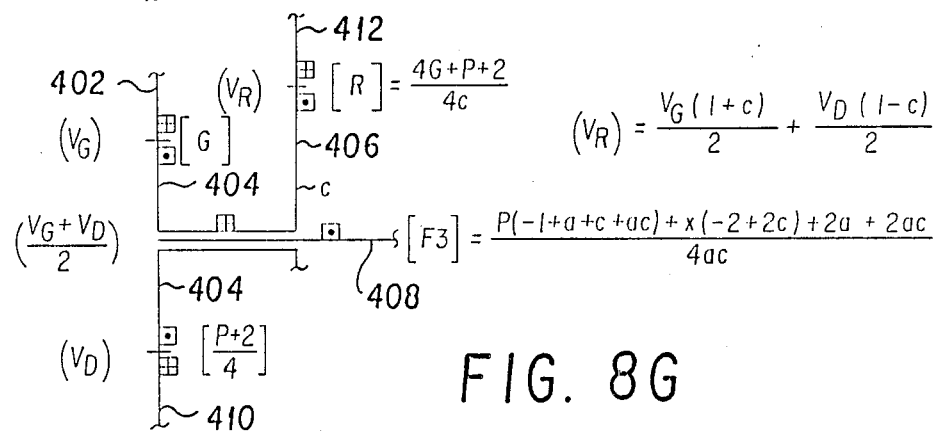

Turning now to FIG. 8G, there is shown there a dual planetary gear 404, 406 revolving about a planetary gear carrier shaft 408. Dual planetary gear 404, 406 meshes with a ring gear 402 which derives its power by way of a carrier (not shown) from ring gear 282 (FIG. 8E). Sun gear 410, which also meshes with dual planetary gear 404, 406 derives its power by way of a carrier (not shown) from ring gear 252 (FIG. 8C). Dual planetary gear 404, 406 also meshes with a ring gear 412 and the respective force, and absolute tangential velocity components at each of the supporting and meshing points of dual planetary gear 404, 406 are as shown in FIG. 8G, and are all a function of the variable dimension "c" of planetary gear 406 of dual planetary gear 404, 406. Again, in a fashion as previously described, the dimension "c" is freely choosable.

Figure 8H:
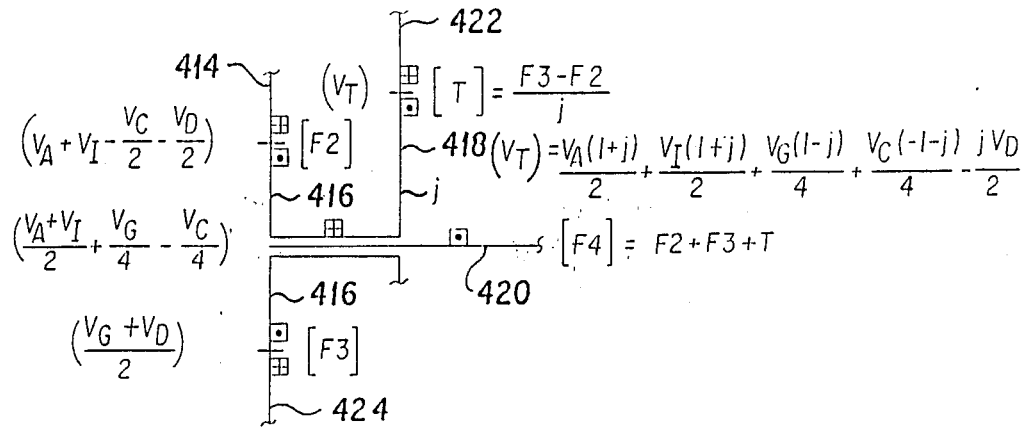

Turning now to FIG. 8H, there is shown a dual planetary gear 416, 418, which meshes with a ring gear 414 and a sun gear 424. Ring gear 414 derives its power from planetary gear carrier shaft 290 (FIG. 8F) by way of a carrier (not shown). Likewise, sun gear 424 derives its power from planetary gear carrier shaft 408 (FIG. 8G) by way of a carrier (not shown). Dual planetary gear 416, 418 revolves about a planetary gear carrier shaft 420 and also meshes with ring gear 422. It is noted that the planetary gear 418 of dual planetary gear 416, 418 has an arbitrarily choosable dimension "j" and it can be seen that the forces, and absolute tangential velocities, at the supporting and meshing points of dual planetary gear 416 and 418 are each a function of the two forces provided by ring gear 414 and sun gear 424 and the arbitrarily choosable dimension "j", all in accordance with the equilibrium principles previously described.

Further reference to FIG. 8H shows that the absolute tangential velocity of the planetary gear carrier shaft 420 is chosen such that it is some fixed multiple (i.e. "k") of the absolute tangential velocity of planetary gear carrier shaft 232 (FIG. 8A) so that the force F4 would also be added to the feedback force "P" appearing on planetary gear carrier shaft 232 (FIG. 8A). This creates the following equivalence and equation:

$$\frac{v_A + v_I}{2} + \frac{v_G}{4} - \frac{v_C}{4} = \frac{k(v_A + v_I)}{2} \qquad (1)$$

Figure 8I:
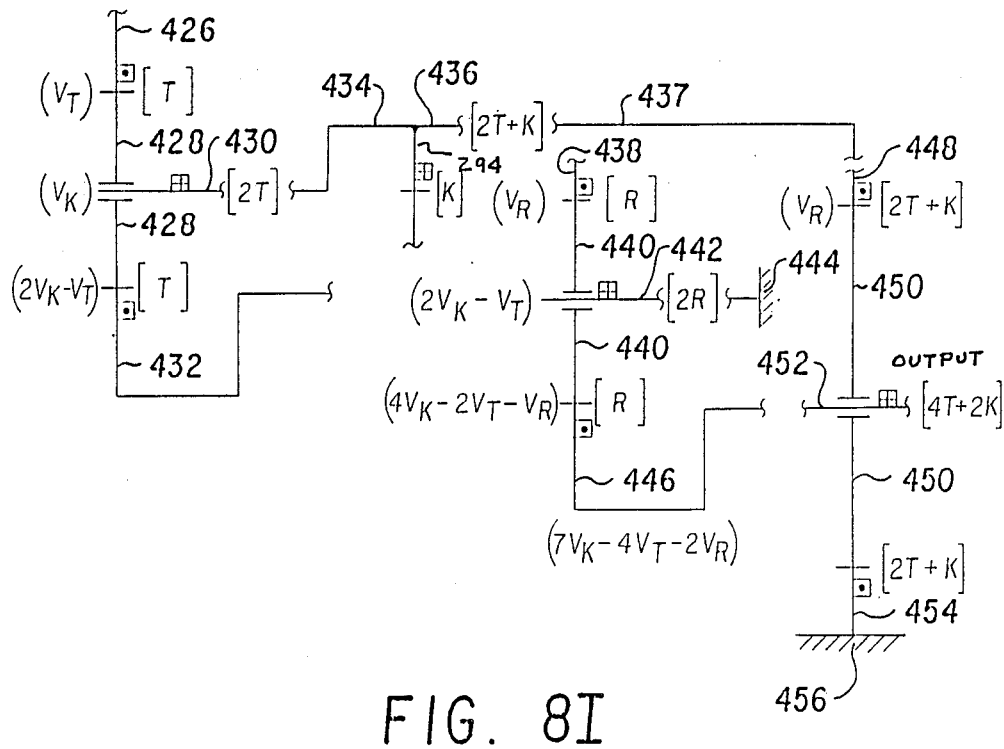

The three power streams appearing respectively on ring gear 294 (FIG. 8H), ring gear 412 (FIG. 8G), and ring gear 422 (FIG. 8H) are taken and interleaved in the structure shown in FIG. 8I so that appropriate kinematic manipulation can take place to leave only one of them as the surviving power stream to serve as the output of a power combiner 15 according to this particular embodiment.

Turning now to FIG. 8I, the power from ring gear 422 (FIG. 8H) is applied by way of a carrier (not shown) to a ring gear 426. Ring gear 426 meshes with a planetary gear 428, the absolute tangential velocity of the carrier 430 of which is chosen to be identical to the absolute tangential velocity of ring gear 294 (FIG. 8F) so that the combined force on carrier 436, resulting from a combination of carriers 434 and 294, is given by the algebraic sum thereof, 2T+K.

Further, the power from ring gear 412 (FIG. 8G) is applied to a ring gear 438 by way of a carrier (not shown). Ring gear 438 meshes with a planetary gear 440 which revolves about a planetary gear carrier shaft 442, and also meshes with a sun gear 446. The absolute tangential velocity of planetary gear carrier shaft 442 is chosen to be identical to the absolute tangential velocity of sun gear 432 so that the forces appearing on sun gear 432 and planetary gear carrier shaft 442 can be algebraically added to produce the following net force:

T−2R.

Furthermore, the absolute tangential velocity of planetary gear carrier shaft 442, given by the expression $2v_K - v_T$ which is set to zero by connecting planetary gear carrier shaft 442 to a fixed support 444. This creates the following equivalence and equation:

$$2v_K - v_T = 0 \qquad (2)$$

This has the effect of eliminating the power stream appearing on carrier 442 combined with the power stream appearing from sun gear 432.

By way of a carrier 437, the combined power stream appearing on carrier 436 is applied to a ring gear 448 which meshes with a planetary gear 450. Planetary gear 450 revolves about a planetary gear carrier shaft 452 and also meshes With a sun gear 454. The absolute tangential velocity of planetary gear carrier shaft 452 is chosen to be identical to the absolute tangential velocity of sun gear 446 so that the two power streams appearing respectively thereon can be combined into one resultant power stream having a force magnitude of 4T+2K−R, moving at an absolute tangential velocity of $4v_K - 2v_T - v_R$. The absolute tangential velocity of sun gear 454 is set to zero by fixing it to a fixed support 456 so that the following equation is created:

$$7v_K - 4v_T - 2v_R = 0 \tag{3}$$

Simultaneous solution of equations (1), (2), and (3) will yield values for a, b, c, j and k in terms of whichever of the parameters are chosen to be "free", i.e. undesignated. With these solutions, the value of "P" can also be determined by realizing that:

$$P = P + 2x - \frac{P(1 + 3a) + x(2 + 6a)}{4a} + k(F2 + F3 + T)$$

which means that "P" is given by the sum of the three force components existing respectively on carriers 270 (FIG. 8D), 278 (FIG. 8E), and 420 (FIG. 8F).

FIG. 8I thus reflects the consolidation of all the remaining power streams, with all prior unallocated power streams having been fed back to the feedback connection of planetary gear carrier shaft 232 (FIG. 8A). This leaves only one output power stream on carrier 452 as the output power stream, all other ones having been eliminated by a variety of techniques. Therefore, the objectives for a power combiner 15 have been achieved in that two kinetically and kinematically independent input power streams have been consolidated into one power stream. That is, the two input power streams appearing on carriers 125 and 16 of FIG. 8A have been consolidated into one power stream appearing on carrier 452 of FIG. 8I. It is to be noted that the force component of the power stream appearing on carrier 452, namely 4T+2K−R is a function of the variable parameter "x" by which the power stream appearing on carrier 16 (FIG. 8A) is varied, all as previously described. Carrier 452 thus constitutes the output of a power combiner 15 (FIG. 1) and is analogous to terminal 18 of power combiner 15 shown in FIG. 1.

Figure 9A:
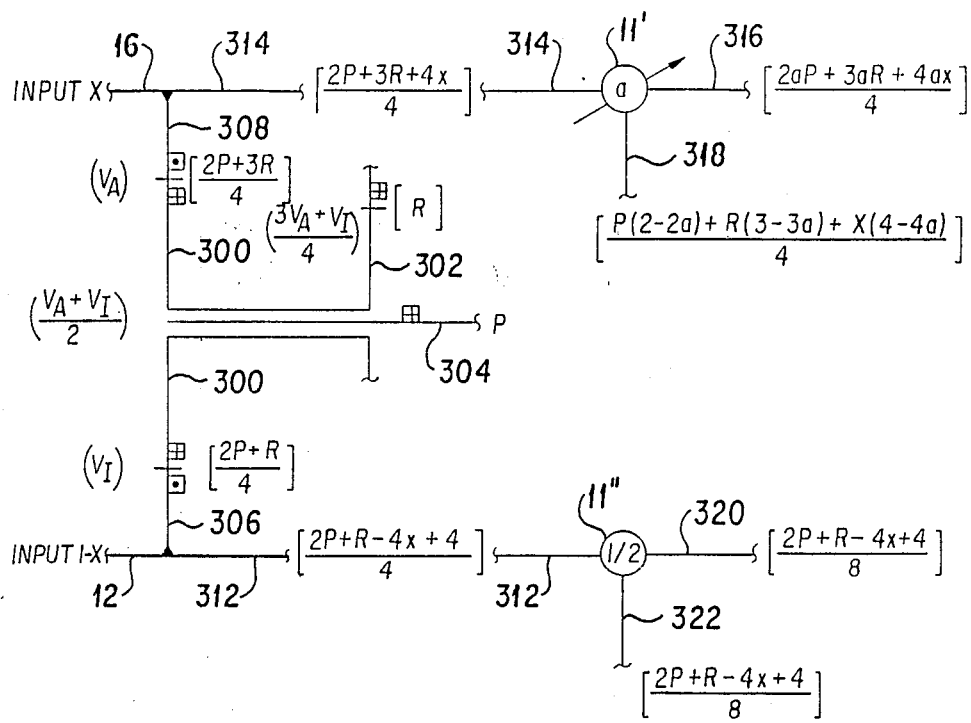
FIGS. 9A-9C are cross-sectional schematics of the various portions of a fourth embodiment of a power combiner according to the invention.
Figure 9B:
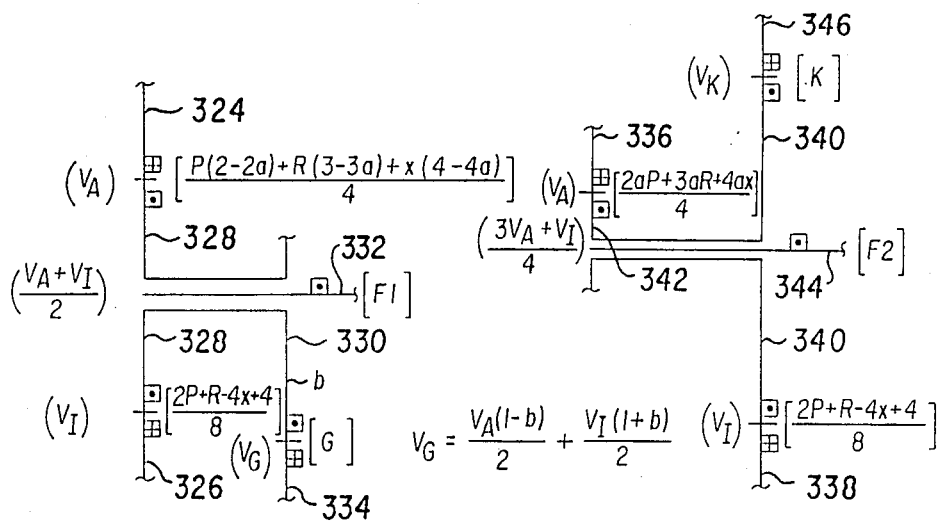
Figure 9C:
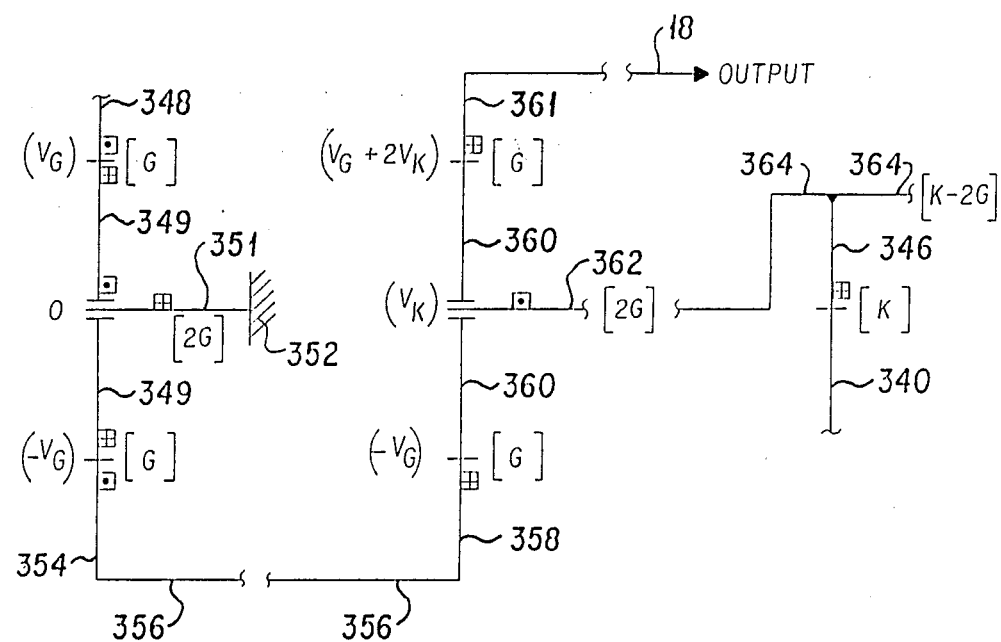

Turning now to FIGS. 9A-9C, there is shown a fourth embodiment of a power combiner 15 according to the invention. Unlike any of the prior embodiments, this embodiment utilizes several internally generated "feedback" loops, namely two, and utilizes no more than one additional parameter (in addition to the primary independent parameter "x") to provide a single output power stream from two kinetically and kinematically independent input power streams.

Returning now to FIG. 9A, there is shown a dual planetary gear 300, 302 which is supported by a planetary gear carrier shaft 304. Planetary gear 300, 302 meshes with sun gear 306 and ring gears 308 and 310. Dual planetary gear 300, 302 functions as a device to distribute two internally generated "feedback" power streams (as will be subsequently described), having force components of "P" and "R" to the two absolute tangential velocities of the two input power streams supplied via carriers 12 and 16. To this end, ring gear 308 has the identical absolute tangential velocity as the input power stream having a force component "x" and sun gear 306 has the identical absolute tangential velocity of the second input power stream, appearing on carrier 12 and having a force magnitude of 1-x. It is to be noted that this description of this embodiment proceeds on the assumption that the input power to power combiner 15 (see FIG. 1) comes directly from splitter 11, and not from terminal 125 (FIG. 5) (i.e. the prime mover). For this reason, the magnitude of the force component appearing on carrier 12 is identified as 1-x, rather than 1.

The resultant forces appearing on carrier 312 and 314 are as shown in FIG. 9A and they are the algebraic summation of forces appearing at the meshing points of dual planetary gear 300, 302 where it meshes with sun gear 306 and ring gear 308. The power stream appearing on carrier 312 is applied to a splitter 11" which is of the type previously described in connection with FIG. 3A, except that splitter 11" is fixed, i.e. not variable, to provide a force output on carrier 320 and 322 which have force components exactly one half of the force components applied to the input of splitter 11" on carrier 312, all as shown in FIG. 9A. The power stream on carrier 314 supplied to a second splitter 11', which is a variable splitter functioning to split the power stream applied into two power streams, appearing on carriers 316 and 318, the force components of which are variable in accordance with a parameter "a", all as shown in FIG. 9A.

By a suitable carrier (not shown) the power stream appearing on carrier 318 is applied to a ring gear 324 and the power stream appearing on carrier 322 is applied by a carrier (not shown) to a sun gear 326. Ring gear 324 and sun gear 326 mesh with a dual planetary gear 328, 330. Dual planetary gear 328, 330 revolves around a planetary gear shaft 332 and also meshes with a second sun gear 334.

It should be noted that dual planetary gears 328, 330 have a variable lever arm "b" which can be suitably chosen in accordance with criteria to be described below. The variable lever arm "b" is not absolutely nece power streams, appearing on carriers 316 and 318, the force components of which are variable in accordance with a parameter "a", all as shown in FIG. 9A.

By a suitable carrier (not shown) the power stream appearing on carrier 318 is applied to a ring gear 324 and the power stream appearing on carrier 322 is applied by a carrier (not shown) to a sun gear 326. Ring gear 324 and sun gear 326 mesh with a dual planetary gear 328, 330. Dual planetary gear 328, 330 revolves around a planetary gear shaft 332 and also meshes with a second sun gear 334.

It should be noted that dual planetary gears 328, 330 have a variable lever arm "b" which can be suitably chosen in accordance with criteria to be described below. The variable lever arm "b" is not absolutely necessary for the power combiner disclosed in FIGS. 9A-9C, but it adds a degree of design flexibility to minimize the number of planetary gear elements in a transmission according to the invention, as will be later described. In accordance with the equilibrium equations previously discussed in the description of the other embodiments of the invention, the forces Fl and G appearing on planetary gear carrier shaft 332 and sun gear 334 respectively are given by the following expressions:

$$G = \frac{P(4 - 8a) + R(10 - 12a) + x(24 - 16a) - 8}{8b}$$

$$F1 = \frac{P(4 - 8a + 6b - 4ab) + R(10 - 12a + 7b - 6ab) + x(24 - 16a + 4b - 8ab) - 8 + 4b}{8b}$$

It is to be noted that both of the forces F1 and G are given in terms of the forces applied to dual planetary gear 328, 330 at the meshing points where dual planetary gear 328, 330 meshes with ring gear 324 and sun gear 326, and the variable lever arm "b". Likewise, in accordance with the rules previously described in the description of other embodiments according to the invention, the absolute tangential velocity $v_G$ is determined by the absolute tangential velocity at which dual planetary gear 328, 330 meshes with ring gear 324 and sun gear 326, namely $v_A$ and $v_I$, respectively. The expression $v_G$ is as shown in FIG. 9B and it is a function of $v_A$, $v_I$, and the variable lever arm "b".

Also shown in FIG. 9B is a second dual planetary gear 340, 342 which is supported by planetary gear carrier shaft 344. Dual planetary gear 340, 342 also meshes with a ring gear 336 and a sun gear 338 which, respectively, apply to dual planetary gear 340, 342 the power streams generated on carriers 316, 320 (FIG. 9A) by suitable carriers (not shown). Dual planetary gear 340, 342 also meshes with a ring gear 346 and the absolute tangential velocity at each meshing and support point of dual planetary gear 340, 342 is as shown in FIG. 9B. Furthermore, the direction of the force acting on dual planetary gear 340, 342 is as shown in FIG. 9B and the expression for F2 and K is given by the following:

$$K = \frac{P(6 - 4a) + R(3 - 6a) + x(-12 - 8a) + 12}{24}$$

$$F2 = \frac{P(12 + 8a) + R(6 + 12a) + x(-24 + 16a) + 24}{24}$$

It is to be noted that both F2 and K are given in terms of the forces applied to dual planetary gear 340, 342 by ring gear 336 and sun gear 338, all as shown in FIG. 9B. A review of FIG. 9B shows that the absolute tangential velocity of the planetary gear carrier shaft 332 is identical to the absolute tangential velocity of planetary gear carrier shaft 304 (FIG. 9A) and the absolute tangential velocity of planetary gear carrier shaft 344 is identical to the absolute tangential velocity of ring gear 310 (FIG. 9A) so that the force components F1 and F2 appearing on planetary gear carrier shafts 332 and 344 respectively, provide the required "feedback" forces P and R shown as being applied to dual planetary gear 300, 302 (FIG. 9A) by suitable carriers not shown). The resulting equations are as follows:

$$P = F1 \quad (1)$$

and $$R = F2 \quad (2)$$

Having thus disposed of the power streams appearing on planetary gear carrier shafts 332 and 344, only two power streams remain within the power combiner, namely the power stream of sun gear 334 and the power stream on ring gear 346. These are dealt with by the structure shown in a cross-sectional schematic in FIG. 9C.

Turning now to FIG. 9C, by a suitable carrier (not shown) the power stream developed on sun gear 334 (FIG. 9B) is applied to a ring gear 348 which meshes with a planetary gear 349. Planetary gear 349 is supported by planetary gear carrier shaft 351 and also meshes with a sun gear 354. The absolute tangential velocity of planetary gear carrier shaft 351 is set at zero by fixing planetary gear carrier shaft 351 to a fixed support 352. This has the effect of making the absolute tangential velocity at the meshing point between planetary gear 349 and sun gear 354 the exact negative of the absolute tangential velocity at the meshing point between planetary gear 349 and ring gear 348. The direction, and magnitude, of the forces acting on the various meshing, and supporting, points of planetary gear 349 are as shown in FIG. 9C.

By a carrier 356 the power stream developed on sun gear 354 is transmitted, and applied to, another sun gear 358 which meshes with a planetary gear 360. Planetary gear 360 is supported by a planetary gear shaft 362 and meshes with a ring gear 361. The absolute tangential velocity of planetary gear carrier shaft 362 is chosen to be identical to the absolute tangential velocity of ring gear 346, (FIG. 9B) so that the resultant force on carrier 364, which combines the power streams from planetary gear carrier shaft 362 and ring gear 346, is given by the following expression:

$$K - 2G.$$

The power stream appearing on carrier 364 can be set to zero by setting the force component thereof to zero which yields the following equation:

$$K - 2G = 0. \quad (3)$$

As a result of the above three equations (1), (2) and (3), ring gear 361 thus carries the only remaining power stream which has been neither eliminated nor used for other purposes (i.e. feedback) and it therefore constitutes the output power stream of the power combiner according to this embodiment of the invention.

The expression for the single parameter "a" is determined by a simultaneous solution of the three equations mentioned in connection with this particular embodiment, namely (1), (2), and (3) described above and the values are as follows:

$$a = \tfrac{3}{4}$$

or $$a = 3/2$$

The solution of $a = 3/2$ is discarded as unsuitable.

Thus it can be seen that the parameter "a" is independent of the primary variable "x" and therefore can be fixed at a permanent value. It is therefore not necessary for the solution of the three equations mentioned above that "b" have any particular value.

It should also be noted that when a splitter parameter, such as "a" described above, takes on a fixed value, the splitter functions essentially as a planetary gear assembly, with a fixed ratio of the various forces acting thereon.

However, "b" can be suitably utilized to define and match the absolute tangential velocity of ring gear 361 so that it becomes an fixed multiple of the absolute tangential velocity of the power stream appearing on carrier 14 (FIG. 1) thereby allowing the combination of the power stream appearing on carrier 18 directly with the power stream appearing on carrier 14, and thus eliminating the need for a power separator 17 as shown in FIG. 1.

Such a matching might proceed as follows:

(a) first, the absolute tangential velocity of the point where planetary gear 340 meshes with ring gear 346, $v_K$ (and assuming that the dimension 340 is exactly three times the dimension of 342) would be:

$$\frac{5v_A - v_I}{3}$$

(b) the absolute tangential velocity of ring gear 361, where it meshes with planetary gear 360, namely $v_G + 2v_K$ is given by the expression $$\frac{v_A(23 - 3b) + v_I(-5 + 3b)}{6}$$

(c) the ratio of $v_A$ divided by $v_I$ of $V_G + 2v_K$ is made to equal the ratio of $v_A$ to $v_I$ of the power stream appearing on carrier 14 (FIG. 1).

From the above three steps, the equation to solve for "b" is as follows:

$$\frac{23 - 3b}{-5 + 3b} = -\tfrac{1}{4}$$

and the solution for "b" is $$b = \frac{41}{3}$$

If the value for "b" thus arrived at is deemed suitable nothing more is required except to match the absolute tangential velocity of carrier 18 to that of carrier 14 and such a match would be achieved by combining the two tangential velocities through a planetary gear, one point of which would always be fixed at zero velocity. That is, if two independent bodies rotate with an angular velocity so that at respectively different points of each of them, the absolute tangential velocities are fixed multiples of one another, these two points can be connected to a planetary gear and, at a certain distance therefrom, the absolute tangential velocity will always be zero. This "0" point can be used as a support around which either a planetary gear carrier shaft, or a ring gear, can be connected so that the two previously uncombined power streams are now combined into one, all as previously described.

If the value for "b" is deemed not a suitable value, a power separator 17, as shown in FIG. 1, may be necessary, as will be further described below.

With reference now to FIGS. 9D-9H, there is disclosed a fifth embodiment of a power combiner 15 according to the invention in which the dual planetary gears described in previous embodiments are replaced by so-called triple planetary gears, in order to improve the number of parameters that can be handled by a planetary gear, thereby minimizing the total number of planetary gears necessary for an embodiment of a transmission according to the invention. Furthermore, the description of the fifth embodiment of a power combiner 15 according to the invention, disclosed in FIGS. 9D-9H proceeds on an assumption that the power streams developed by the power splitter 11 - power divider 13 combination are those that would exist in the structure disclosed in FIG. 1, rather than the structure disclosed in FIG. 5.

With reference to FIG. 9D, one of the power streams developed by power splitter 11 (FIG. 1), namely the one appearing on terminal 10 (FIG. 1), is applied, via a carrier, not shown, to the planetary gear carrier shaft 500 which meshes with a planetary gear 501. Planetary gear 501 meshes with a ring gear 502 and a sun gear 503 and this structure essentially represents the structure previously disclosed of power divider 13. If the force applied to planetary gear carrier shaft 500 has a magnitude of [x], the forces at the respective meshing points of planetary gear 501, where it meshes with ring gear 502 and sun gear 503, are [x/2], respectively, and all as shown in FIG. 9D. Furthermore, if the absolute tangential velocity at the meshing point between planetary gear 501 and ring gear 502 is given as $v_A$ the absolute tangential velocity at the meshing point where planetary gear 501 meshes with sun gear 503 is given as $$2v_A - v_I$$

all in accordance with the rule previously described. Furthermore, as in the description of the preceding embodiments, $v_A$ is an absolute tangential velocity which is kinematically independent of the absolute tangential velocity $v_I$ of planetary gear carrier shaft 500.

With reference now to FIG. 9E, there is disclosed a part of the first stage of a power combiner 15 of the invention, with planetary gear carrier shaft 504 being analogous to terminal 16 of the power combiner 15 (FIG. 1) of the invention. The power stream appearing on ring gear 502 is applied via a carrier (not shown) to a planetary gear carrier shaft 504, moving with an absolute tangential velocity of $v_A$. Planetary gear carrier shaft 504 supports a planetary gear 505 which meshes both with a ring gear 506 and a sun gear 507. Again, in accordance with rules as previously described, the force magnitudes, and directions, are indicated as acting on ring gear 506 and sun gear 507 as shown in FIG. 9E. Further, it is noted that the absolute tangential velocity of the meshing point where planetary gear 505 meshes with ring gear 506 is designated as $v_C$, a temporarily undesignated absolute tangential velocity to be determined in a fashion as will be subsequently described herein. Furthermore, the absolute tangential velocity of the meshing point between planetary gear 505 and sun gear 507 is given by the expression $$2v_A - v_C$$

With reference now to FIG. 9F, a planetary gear carrier shaft 508 (analogous to terminal 12 of power combiner 15 shown in FIG. 1) has power applied thereto by way of a carrier (not shown) from terminal 12 of power splitter 11 (see FIG. 1). Planetary gear carrier shaft 508 supports a triple planetary gear 509, 510, 511, with the planetary gear 510 having a variable dimension "a" and planetary gear 511 having a variable dimension "b", all as shown in FIG. 9F. The triple planetary gear 509, 510, 511 also meshes with two ring gears, ring gears 512 and 513, and a sun gear 514. The power applied to triple planetary gear 509, 510 and 511, by way of ring gear 512, comes directly from the ring gear 506 (FIG. 9E) by way of a carrier (not shown). It is noted that the force magnitudes, and directions, acting on the triple planetary gear 509, 510, 511 are as shown in FIG. 9F, and it is to be noted that the force [G] and [F] are given in terms of the input forces $$\left[\frac{x}{4}\right]$$

and [1 - X] and the freely choosable dimensions "a" and "b" of triple planetary gear 509, 510, and 511. Furthermore, the expression for the absolute tangential velocities at which triple planetary gear 509, 510 and 511 mesh respectively with ring gear 513 and sun gear 514 are each also a function of the input velocities $v_I$, $v_C$ and the freely choosable dimensions "a" and "b", all in a fashion and in accordance with the rules previously described.

At this point it should be noted that, while previous embodiments of a power combiner utilizing dual planetary gears were able only to exhibit one variable, such as "a", for a dual planetary gear, the triple planetary gear 509, 510, 511 disclosed in FIG. 9F, displays the capability of handling two variable parameters "a" and "b" per triple planetary gear. Thus, the number of variable parameters available per planetary gear is significantly increased and fewer planetary gears are needed to provide a power combiner 15 with the necessary parameters required to allow the necessary power stream elimination process required of the power combiner. Furthermore, no more than three power streams, namely the ones appearing on sun gear 507, ring gear 513 and sun gear 514, have been created for subsequent disposition within power combiner 15.

Figure 9G:
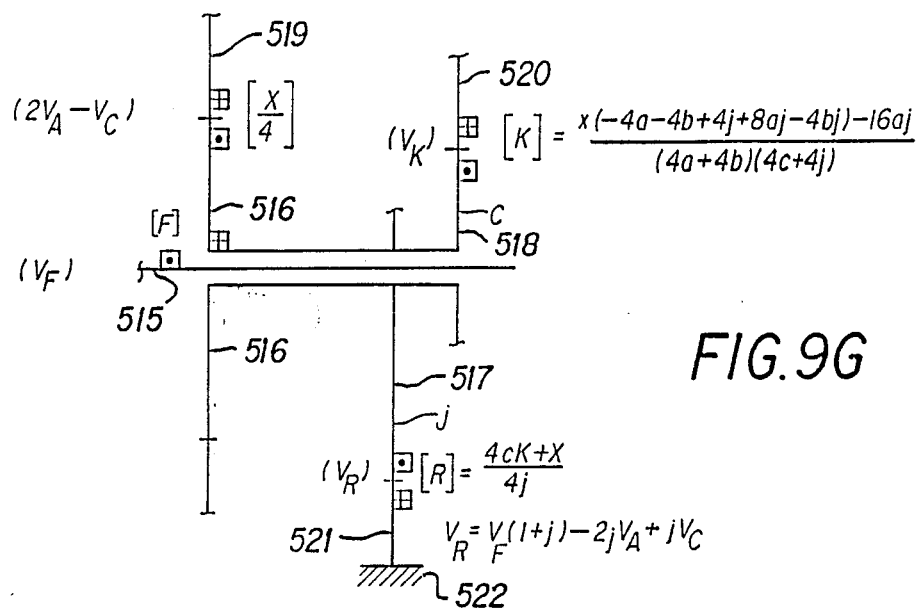

With reference now to FIG. 9G, the power stream emanating from sun gear 514 (FIG. 9F) is applied, via a carrier (not shown) to the planetary gear carrier shaft 515. Planetary gear carrier shaft 515 supports a second, triple planetary gear 516, 517, 518. Triple planetary gear 516, 517, 518 also meshes with a ring gear 519, a ring gear 520, and a sun gear 521. Ring gear 519 applies power to triple planetary gear 516, 517, 518 which power stream emanates from sun gear 507 (FIG. 9E) and the two forces [K] and [R] existing at the respective meshing points of triple planetary gear 516, 517, 518 with ring gear 520 and sun gear 521 are given by the expressions shown in FIG. 9G. These expressions are again, in accordance with rules as previously described, given by the necessary force and torque equilibrium equations for triple planetary gear 516, 517, 518 and are a function of the force [x/4] and the force [F]. Furthermore, both [K] and [R] are also functions of the variable dimensions "c" and "j", these dimensions being freely choosable for the dimensions of planetary gear 518 and planetary gear 517, comprising the triple planetary gear 516, 517, 518. Note that in this description, as well as in all other descriptions, the dimension of planetary gear 516, as is clearly apparent from the expressions for the various forces, has been assumed to have a unit magnitude of "1".

The absolute tangential velocity of the various meshing points of triple planetary gear 516, 517, 518 are given by the expressions shown in FIG. 9G and, in accordance with rules as previously described, are a function of the input velocities $v_F$, $2v_A - v_C$, and the freely choosable dimensions "c" and "j".

Furthermore, the absolute tangential velocity of sun gear 521, where it meshes with triple planetary gear 516, 517, 518 is fixed at zero by affixing said sun gear to a fixed support 522, such fixed support 522 forming a part of the transmission housing which does not rotate. This creates the following equation:

$$v_R = 0 = v_F(1+j) - 31 \cdot 2jv_A + jv_C$$

from which $v_C$ as a function of $v_A$ and $v_I$ can be determined as will be explained hereinbelow.

It should be noted that at this point of the structure in a power combiner 15 according to this particular embodiment of the invention, only two power streams, namely the one appearing on ring gear 520 and the power stream appearing on ring gear 513 (see FIG. 9F) remain as a result of the power stream appearing on sun gear 521 having been set to zero in a fashion as described above. These two power streams are combined into a single surviving power stream by the structure shown in FIG. 9H.

Figure 9H:
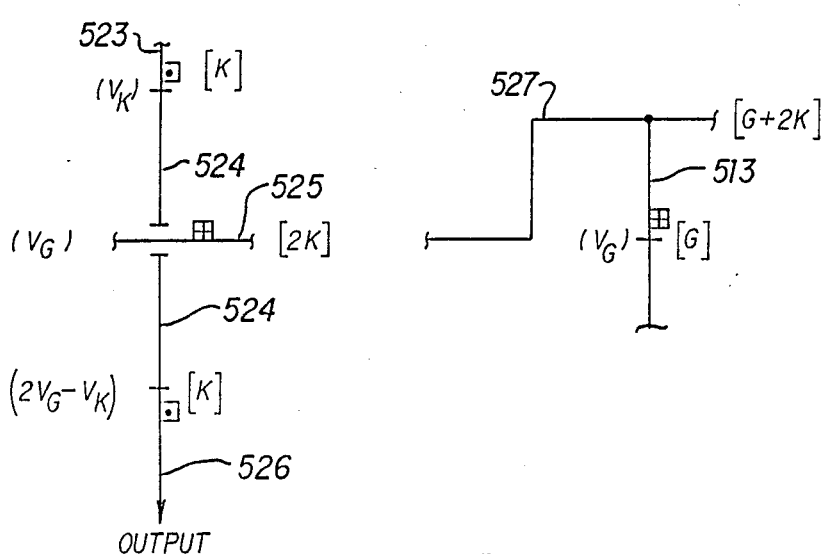

With reference now to FIG. 9H, the ring gear 523 applies power from the ring gear 520 (FIG. 9G) by way of a carrier (not shown). Ring gear 523 meshes with a planetary gear 524 which is supported by a planetary gear carrier shaft 525, the absolute tangential velocity of which has been selected to be the same as the absolute tangential velocity of ring gear 513 so that the planetary gear carrier shaft 525 and the ring gear 513 can be combined into one power stream by way of carrier 527. Planetary gear 524 also meshes with a sun gear 526.

The force components appearing at the various meshing and supporting points of planetary gear 524 are given by the legend shown on FIG. 9H and it is noted that in order to allow the power stream appearing on sun gear 526 to be the sole surviving power stream, that the force component appearing on carrier 527 namely [2K+G] must be set to zero.

The setting to zero of the force component of the power stream appearing on carrier 527 thus requires that the magnitude $G + 2K = 0$.

Substituting for both G and 2K the respective expressions developed, we obtain the following equation:

$$\frac{x(-4a + 12ab) - 16ab}{4a(4a + 4b)} + \frac{x(-8a - 8b + 8j + 16aj - 8bj) - 32aj}{(4a + 4b)(4c + 4j)} = 0$$

The solution for this equation, first by solving for "j" and thereafter for "c" yields the following expression for "c":

$$"c" = \frac{2a^2 + 3ab + b^2}{-a - b + ab + b^2}$$

Thus, it can be seen that by suitable selection of the parameters "a" and "b" the values for "c" and "j" are given in terms thereof. Also, the choice of the parameters "a" and "b" will determine the precise relationship between $v_C$, $v_A$, and $v_I$ resulting from the above equation $v_R = 0$.

It should be noted that "a" and "b" are freely choosable in any desired fashion and that both the resultant output force [K] and the absolute tangential velocity of the output, appearing on sun gear 526, namely $2v_G - v_K$, are also functions of the variables "a" and "b", all in a fashion as previously described with reference to the other embodiments of a power combiner 15 according to the invention. The output on sun gear 526 is thus analogous to terminal 18 (FIG. 1) in this version of a power combiner 15.

If it is desired to completely isolate the prime mover from the output appearing on sun gear 526, the absolute tangential velocity, namely $2v_G - v_K$, is so manipulated by suitable choice of the parameters "a" and "b" that $2v_G - v_K$ is a fixed multiple of the absolute tangential velocity of the output stream 14 from power divider 13

(see FIG. 1) to thereby combine, by velocity matching, the two remaining power streams of the transmission into one power stream designed to be applied to the load, all in accordance with the rules previously described. In such event, a power separator 17 is not necessary.

On the other hand, if it is not desired to isolate the prime mover from the load, the variables "a" and "b" may be utilized for other purposes as deemed suitable by other dimensioning requirements of the transmission, and in such a case, a power separator 17 would be further required, in a fashion as subsequently described, to create a single output stream from the transmission suitable for driving a load.

Figure 9I:
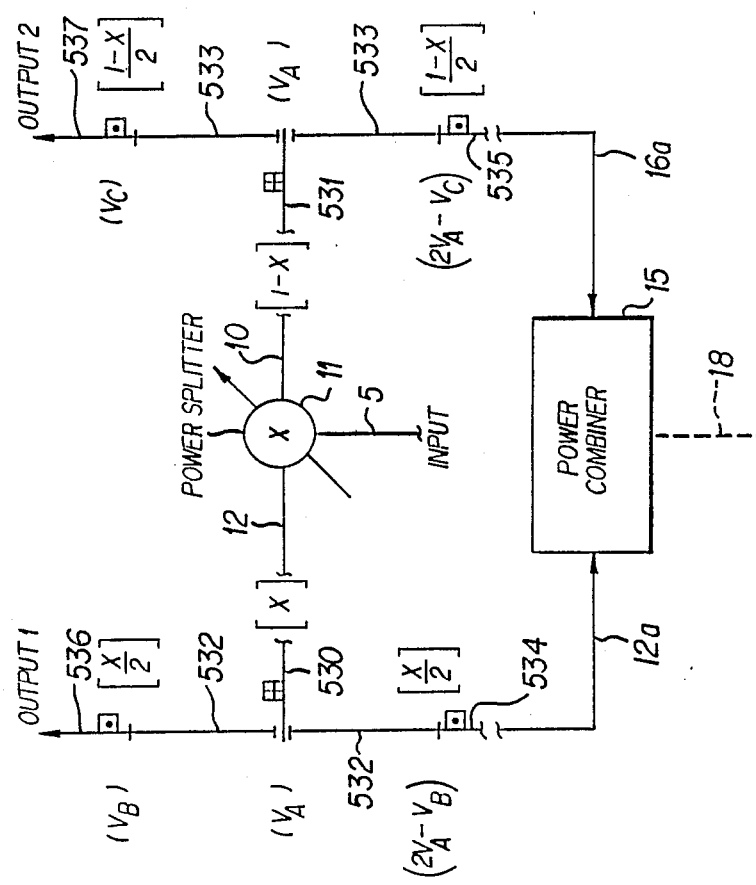
FIG. 9I is a cross-sectional schematic of how a power splitter and power combiner according to the invention may be utilized to create a structure whose function is similar to that of a non-slip differential typically used in a multi-wheel drive, for example, of an automobile.

With reference now to FIG. 9I, there is disclosed there a cross-sectional schematic of structure which may be utilized to create a controllable power division between, say, the two independently driven rear wheels of an automobile by structure embodying the invention. As previously noted, it is often an all too common experience for vehicles equipped with normal differentials to be faced with the embarrassing situation of being stuck in the snow and either, or both wheels, spinning uncontrollably. This is primarily due to the kinematic independence of the speeds of the two wheels driven through a common differential, all as previously described. In prior art devices, these problems have been solved by eliminating the kinematic independence through friction devices such as limited slip differentials which "lock" the independently rotatable members together so that they will rotate with the same speed. This does not truly allocate power selectively between the two driven wheels; it merely assures that both wheels get the same amount of power on the theory that at least one of the wheels can utilize such power.

The structure disclosed in FIG. 9I is designed to alleviate that problem by allowing not only kinematic independence, but also allowing control over the power stream directed to each wheel by suitably controlling the force component of, and hence the total power directed to, the power stream directed to each rear wheel individually.

Pursuant thereto, a power splitter 11, as previously described, is adapted to take a power stream appearing on its terminal 5 and apply it to its two terminals 10 and 12 in a fashion as previously described. Thus, for example, the force component of the power stream appearing on terminal 10 is given by $[1-x]$ and the force component of the power stream appearing on line 12 is given by $[x]$. By respective carriers (not shown) the two power streams are applied to respective planetary gear carrier shafts 530 and 531, each of them meshing with respective planetary gears 532 and 533. Planetary gear 532 meshes with a ring gear 536 and planetary gear 533 meshes with a ring gear 537. Planetary gears 532 and 533 also mesh respectively with sun gears 534 and 535.

In accordance with the previously described behavior of planetary gears, the absolute tangential velocity where planetary gear 532 meshes with ring gear 536 and where planetary gear 533 meshes with ring gear 537 are given respectively by $v_B$ and $v_C$. These absolute tangential velocities $v_B$ and $v_C$ are both kinematically independent of the absolute tangential velocity $v_A$ of the planetary gear carrier shafts 530 and 531. Thus, the power stream appearing on ring gear 536, which has a force magnitude $$\left[\frac{x}{2}\right]$$

can be varied and may form, for example, the output power stream to drive one of the rear wheels of an automobile through a suitable gearing arrangement, such as a bevel gear (not shown). The output power stream appearing on ring gear 537, and having force magnitude $$\left[\frac{1-x}{2}\right]$$

may be used in a similar fashion to drive the other rear wheel of an automobile, thereby creating the possibility that the power splitter 11 (all as previously described hereinabove) may be utilized to control the power stream flow to each of the two rear wheels, for example, of an automobile to thereby minimize the uncontrollable spinning previously referred to. As "x" is varied from zero to one, the power allocation between the two rear wheels can be likewise changed from one to zero so that a truly compatible power allocation can be made between them. Moreover, by suitably varying "x" in response to, say motion control sensors now in use in the well known so-called anti-lock braking systems, a truly adaptive power division between the two rear wheels (adaptive to varying traction conditions) may be achieved.

It is noted that the power streams appearing on respective sun gears 534 and 535 comprise two power streams, both the force components of which and the velocity components of which are both kinetically and kinematically independent.

These two power streams may be advantageously combined in a power combiner 15 which is responsive to these two power streams applied thereto by respective carriers 12A and 16A. If it is desired that the power combiner 15 not have any output (i.e. there is no further need of another power stream to be applied to another destination), then power combiner 15 can advantageously take the form of the embodiment described with respect to FIGS. 7A-7G which disclose a power combiner 15 according to the invention which has no output power stream.

Alternatively, the power combiner 15 may take the form of any of the other embodiments previously described so that on its output terminal 18 it creates a power stream available for subsequent uses, for example, a structure that would be identical to the structure shown in FIG. 9I, to controllably vary the power division between, for example, the front wheels of a four-wheel drive vehicle.

Figure 10:
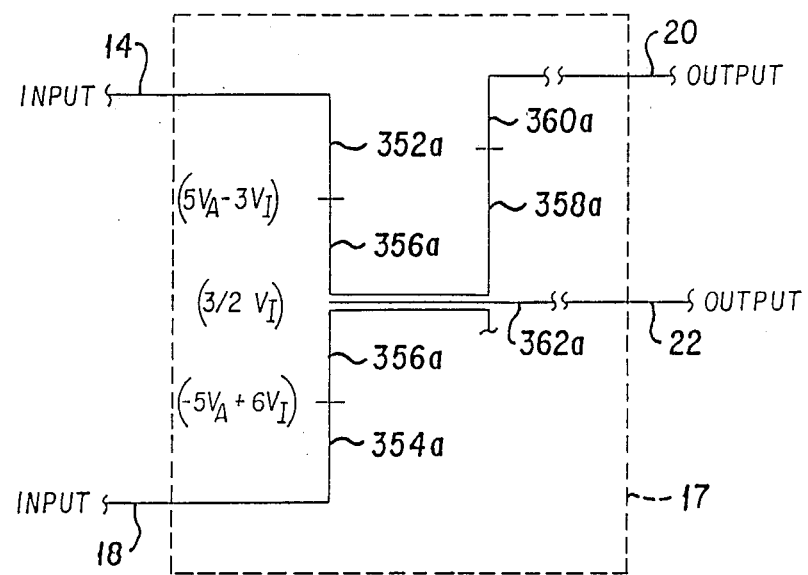
FIG. 10 is a cross-sectional schematic of a power separator which may be utilized in the invention.

Turning now to FIG. 10, there is shown there a typical cross-sectional schematic of a power separator 17 according to the invention. The power separator 17 is necessary, or desirable, when the nature of the power stream appearing on terminal 18 of power combiner 15 is such that it cannot be combined directly with the power stream appearing on terminal 14 of power divider 13, in a fashion as previously described with respect to some embodiments of power combiner 15. Also as previously noted, the power separator 17 may be independently desirable when it is desired to couple the prime mover to the final load. A carrier 14 applies its power stream to a ring gear 352a and the carrier 18 applies its power stream to a sun gear 354a, both of which mesh with a dual planetary gear 356a, 358a. The absolute tangential velocity at the respective meshing points of dual planetary gear 356a, 358a with ring gear 352a and sun gear 354a are so chosen (by suitably varying the radius of the respective carriers 14 and 18 from a main shaft) that they are, in their $v_A$ component, exact negatives of one another. This has the effect of making the absolute tangential velocity of the planetary gear carrier shaft 362a solely a function of $v_I$, thereby allowing the direct connection of the power stream appearing on planetary gear shaft 362a to the prime mover by way of a carrier 22. Thus the power stream on ring gear 360a is the output of the power separator, and hence, the transmission. It should be noted that the absolute tangential velocity of ring gear 360a can be chosen at any desired combination of $v_A$ and $v_I$ by suitably selecting the dimension 358a of dual planetary gear 356a, 358a.

While the cross-sectional schematic shown in FIG. 10 has been illustrated using a typical assumed combination of $v_A$ and $v_I$ for the absolute tangential velocity of both inputs 14 and 16, any other combination of $v_A$ and $v_I$ can be accommodated in a similar manner. Furthermore, it should be noted that no force magnitudes, nor directions, have been illustrated in FIG. 10 since forces, as such, really are not material to the operation of power separation; however, the magnitude and direction of the forces acting on dual planetary gear 356, 358 can be established in accordance with the principles previously described.

If a power separator 17 such as shown in FIG. 10 is utilized in connection with any embodiment of a power combiner 15 according to the invention, any remaining variables (parameters) within the power combiner 15 not utilized for "matching" velocities such as "b" in FIG. 9B can instead be used to "tailor" or match the nature of the output force from power separator 17 so that, within the adjustment range of the primary parameter "x" of splitter 11 (FIG. 3A), the output force undergoes a transition from minus to plus, or vice versa, to allow the output torque to change sign and thereby achieve one of the objects of the invention, namely torque delivery to the load both with, and against, the direction of the rotation of the load. Such torque reversal may also be accomplished by yet another method which will now be described with reference to a power combiner such as shown in FIGS. 7A-7G. It will be recalled that the power combiner 15 disclosed in FIGS. 7A-7G has as one of its features that it produces no output power stream, thereby making the power stream appearing on carrier 14 of power divider 13 (FIGS. 1 and 5) the output of the transmission to drive the load. Reference to FIG. 6A, which forms the first stage of the power combiner disclosed in FIGS. 7A-7G discloses that the $v_A$ input on carrier 16 (which originates from power divider 13) has a force component solely a function of "x". This means that the force appearing on carrier 14 is likewise a function of "x" only. Under the assumption that a splitter 11 according to FIG. 3A has been utilized to provide such a force component it is clear that "x" cannot change sign (it can move only between 0 and 1) and therefore the output torque from the transmission is, as so far described, unidirectional. However, bi-directionality of the force component on carrier 14 (and, consequently, bi-directionality of output torque) can be achieved by utilizing two splitters, such as shown in FIGS. 3A and 3B in tandem, as was generally suggested earlier.

Specifically, if both types of splitters shown in FIGS. 3A and 3B are utilized, the force F10+F10' (the superposed edition of the two separate forces acting on carriers 43, 43', respectively) would be given by the expression [F1]x−[F1']x' instead of, as so far described, merely "x". By suitably choosing F1, F1', and "x" at specific, fixed values, F10+F10' can be chosen to have the generalized form of ax-b so that as "x" is varied from zero to one (or vice versa) the value of ax-b varies from minus to plus (or vice versa).

As those skilled in the art well know, the overall, or "macro", mechanics of transmissions requires that a so-called "reaction torque" be provided for in any transmission design that would allow for input torque to be different from output torque. This has been provided for in each embodiment of the invention, illustrated by the several embodiments of the power combiners 15 disclosed. Any force, acting about a radius from the main shaft and at a zero absolute tangential velocity (to thereby indicate that such zero velocity point is connected to the transmission housing), forms such a "reaction torque" and it will be noted that each embodiment of the power combiner 15 disclosed has such a feature.

In the various embodiments of power combiner 15 disclosed, power transfers are shown as occurring at various absolute tangential velocities between the successive stages of a power combiner. In each case, these transfers are illustrated as occurring at the absolute tangential velocity of the preceding (generating) point. However, no such limitation is intended, as this has been shown only for purposes of clarity and to facilitate an understanding of the invention. In fact, the absolute tangential velocities shown may be altered (by suitable variation of the radius of the power transferring carriers about their axes of rotation) so that other dimensioning constraints may be given consideration.

While the preceding description of the invention has been with reference to the overall system diagram shown in FIG. 1 in which the initial mechanical power stream is first applied to a splitter 11 and then to a power divider 13, no such limitation is intended. It will be recalled that splitter 11 and power divider 13 together function to produce at least three power streams on their respective terminals 14, 16 and 12, at least two of which are both kinetically and kinematically independent.

Such a result can also be achieved by subjecting the input power stream [I]($v_I$) appearing on terminal 5 first to a power divider 13, and thereafter subjecting one of two outputs of power divider 13 to a power splitter 11; such a combination of power divider 13 and power splitter 11 produces the same functional result as the combination illustrated in FIG. 1, namely at least three mechanical power streams, at least two of which are both kinetically and kinematically independent.

Furthermore, the preceding description of the various embodiments of a power combiner 15 have proceeded on the assumption that the output power stream, if any, appearing on terminal 18, can be kinematically "tailored" or "matched" to allow blending with any power streams remaining from the power splitter 11—power divider 13 (or vice versa) combination shown in FIG. 1. Clearly, the invention is not limited to only kinematic blending, as kinetic blending is also possible. Such kinetic blending, instead of altering the velocity component of a power stream appearing on terminal 18, would allow "tailoring" of the force component of the power stream on terminal 18 to match with the force component of any remaining power streams from the power splitter 11—power divider 13 combination shown in FIG. 1.

Such kinetic blending, or matching, can best be illustrated with reference to the embodiment of a power combiner shown in FIGS. 9A-9C.

If the power splitter 11' of FIG. 9A is made to be a variable splitter (as opposed to the fixed type at which it is shown), operating to split the power stream appearing on carrier 312 in accordance with a variable parameter "c", the force components of the power streams appearing on carriers 320 and 322 will be given by the following expressions, respectively:

$$\frac{c(2P + R - 4x + 4)}{4}$$

and $$\frac{(1 - c)(2P + R - 4x + 4)}{4}$$

Thus a new variable parameter "c" has been inserted into the set of equations governing the behavior of power combiner 15 as disclosed in this particular embodiment.

The newly available variable "c" can be used to "tailor" the force "G" shown as appearing on carrier 18 of FIG. 9C to kinetically match it to be a fixed multiple of the force component of the power stream appearing on carrier 14 (FIG. 1). Under the assumption on which power combiner 15 has been described in FIGS. 9A-9C, the force on carrier 14 would be a multiple of "x" and therefore the kinetically matching equation would be:

$$G = kx \quad (4)$$

where "k" is any arbitrarily choosable, fixed constant.

Thus, this new equation would be added to the three equations already disclosed in connection with the embodiment in FIGS. 9A-9C, where C was chosen to be ½.

Solving these four equations simultaneously is a complex procedure but the solution thereof can be achieved by a computer and is provided in a graphical form so that both a and c are given as functions of the independent variable "x" for selected values of "b" and "k". These graphs are attached hereto as FIGS. 11A and 11B, while the computer printout showing the results mathematically for k=0.5, b=2, are attached hereto as Appendix A; these printouts also show the values for "P" and "R" as "x" is varied. All the values shown may be multiplied by any required numerical proportionality factor to account for computational or physical variations. It is primarily the shape of the curve that is important.

Note that the value of "c" is given as a negative amount in Column 4 of the printout; this simply means that splitter 11" of FIG. 9A should be a splitter of the type shown in FIG. 3B, rather than of the type shown in FIG. 3A, as it was originally assumed to be. Likewise, since the value for "a" is always greater than 1, the splitter 11' of FIG. 9A should likewise be a splitter of the type shown in FIG. 3B, rather than of the type shown in FIG. 3A as it was originally assumed to be.

Because such a modification of the power combiner 15 disclosed in FIGS. 9A-9C now requires two separate splitters, both of which move as a function of the variation of the primary parameter "x", a mechanism for achieving such is disclosed in FIG. 12.

With reference to FIG. 12, there is shown a basic cam-like mechanism by which the required function for "a" and "c" (in terms of "x") described above, may be generated.

A solid member 300b, into which has been machined a groove, or slot, 301b in the shape of the required mathematical function either a=f(x) or c=f(x), or both, rests movably on supports 302b and 303b. A cam follower 304b has a roller 306b inserted in groove 301b so that movement of member 300b along the "x" axis positively translates the motion of cam 300b in the "x" direction to the cam follower 304b in the "a" direction, cam follower 304b being guided by fixed supports 305b.

The "a" direction movement of cam follower 304b is thus the a=f(x) result of movement of member 300b in the "x" direction. If desirable, cam follower 304b can have attached thereto another member (not shown) exactly like member 300b so that the motion of cam follower 304b is translated in a direction parallel (rather than perpendicular) to the movement of member 300.

Thus, when the parameter "a" is a function of "x", i.e. a=f(x), as required by the variation of the embodiment shown in FIGS. 9A-9C, the groove 301b can be shaped to exactly duplicate such function and thereby assure that, as the parameter "x" is varied, the dependent parameters like "a" and "c" are also varied in the required relationship. Furthermore, since "x" is a continuously variable parameter in this modification, both "a" and "c" are also continuously variable functions of "x". FIGS. 13A and 13B disclose how a splitter 11, to achieve this continuously variable function, might be implemented.

With reference to FIG. 13A, there is disclosed the fundamental schematics of a means by which the power splitter 11 (FIG. 3A) can be made to have a member 37 rotating around the axis of shaft 5 but also slidable along the axis thereof, in accordance with a parameter "x".

With reference to FIG. 13A, a lever 707 is affixed to a gear 709 rotating about a shaft 708. Mounted in cooperative relationship with the gear 709 is a toothed surface 710 on a sliding block 711 supported by support bearings B and L. Also affixed to the block 711 is a shaft 712 housing at the end thereof a fork member 713. Extending within the confines of fork 713 is a member 714 which may be mounted freely rotatable on shaft 716. The rotating member 714 is restrained in its axial location along shaft 716 by the abutments 715 affixed to shaft 716. Shaft 716 is itself supported on bearings Y and Z. Shaft 716 also has affixed thereto the member 37 (see FIG. 3A) so that as shaft 716 revolves about its own axis, shaft 37 will likewise do so.

In operation, as lever 707 is turned it will impart a rotary movement to gear 709 which will cause rack 711, and hence fork 713 to move axially in the directions as indicated in FIG. 13A. Shaft 716 will have this axial movement applied thereto by means of the fork 713, rotating member 714 and the abutments 715.

By the means shown, it is clear that a fixed, non-rotating object, such as lever 707 can impart an axial movement to member 37 which is rigidly connected with rotating shaft 716. Lever 707 may be actuated to move in accordance with any desired parameter "x", i.e. by having it controlled manually, or having it controlled in response to a variety of engine parameters, such as engine vacuum, rpm, or the like, or even the brakes under certain conditions.

It has previously been explained that shaft 37, while rotating with shaft 5 (see the description in connection with FIG. 3A), must have the freedom to slide axially within said shaft 5. Such construction is indicated in FIG. 13B, in grossly exaggerated dimensions, to show that shaft 716 is mounted coaxially within shaft 5, rotating therewith but able to move axially along the length of shaft 5 by virtue of the keyway 717 cut into shaft 5.

SIXTH EMBODIMENT

With reference now to FIG. 14A, there is shown there a general block diagram of a sixth embodiment of the invention. A prime mover, generally designated by 3, provides a power stream on a shaft $3a$, having a force magnitude of [I] and an absolute tangential velocity of ($v_I$). By way of a suitable shaft, or carrier 5, the power stream from the prime mover is applied to a power splitter and divider 11-13, with the power splitter and the divider being as respectively shown in FIG. 3A, as will be further described hereinbelow.

In response to the input power stream on shaft 5, the power splitter and divider 11-13 produces at least three mechanical power streams on shafts, or carriers, 10, 12, and 904, having the force and velocity components as indicated in FIG. 14A. Furthermore, these respective power streams have been labeled I, II, and III. It is to be noted that of these three power streams, I, II, and III, at least two of them are both kinetically and kinematically independent of one another. That is to say, neither the ratios of the force components nor the ratio of the velocity components of two of the three power streams is in a fixed relationship with one another. As will be described hereinafter in greater detail the power splitter and divider 11-13 introduces a controllable and continuously variable parameter "x" into the force components of at least two of the power streams, and furthermore also introduces a velocity component "$v_A$" that is kinematically independent of the velocity component "$v_I$" of the input power stream to power splitter and divider 11-13 on shaft, or carrier 5.

The respective power streams I, II, and III are thereafter provided by suitable carriers 10, 12 and 904 to a mixer and combiner unit 15' where the power streams are "mixed" or "interleaved" to make them responsive to a plurality of parameters, for example "a," "b," "c," "j," "l," "q," "r," and "s." Mixer and combiner 15' further manipulates the mechanical power streams applied thereto so that all but one are eliminated, e.g., by setting either the net force component, or the velocity component, or both, of a mechanical power stream to zero. As will be further described herein, by making the mechanical power streams responsive to appropriate selections of the various parameters, suitable selection of these various parameters will achieve the above result so that only one mechanical power stream remains, or "survives," to form a mechanical output power stream appearing on shaft, or carrier 20 having a force component [I,x] and a velocity component ($v_A$, $v_I$) It is to be noted that the mechanical power stream appearing on shaft or carrier 20 has a force component which is responsive to the continuous and controllable variation of a parameter "x" and has a velocity component which includes "$v_A$" as one of its velocity components, such velocity "$v_A$" being kinematically independent of the velocity "$v_I$" of the mechanical power stream emanating from the prime mover 3.

As will be further noted below, the mixer and combiner 15' achieves its function through the use of planetary gears, the dimensions of which can be selectively chosen. Unlike the previous embodiments of a combiner, however, mixer combiner 15' also utilizes appropriate variations in the radius of carriers (from a main shaft) to add additional parameters by which either the force or the velocity components of a power stream can be adjusted or tailored to any specific or desired value. Furthermore, as will be pointed out hereinbelow, that portion of mixer-combiner 15' which functions to combine several power streams is a special case of the combiner 15 generally illustrated earlier.

Figure 14B:
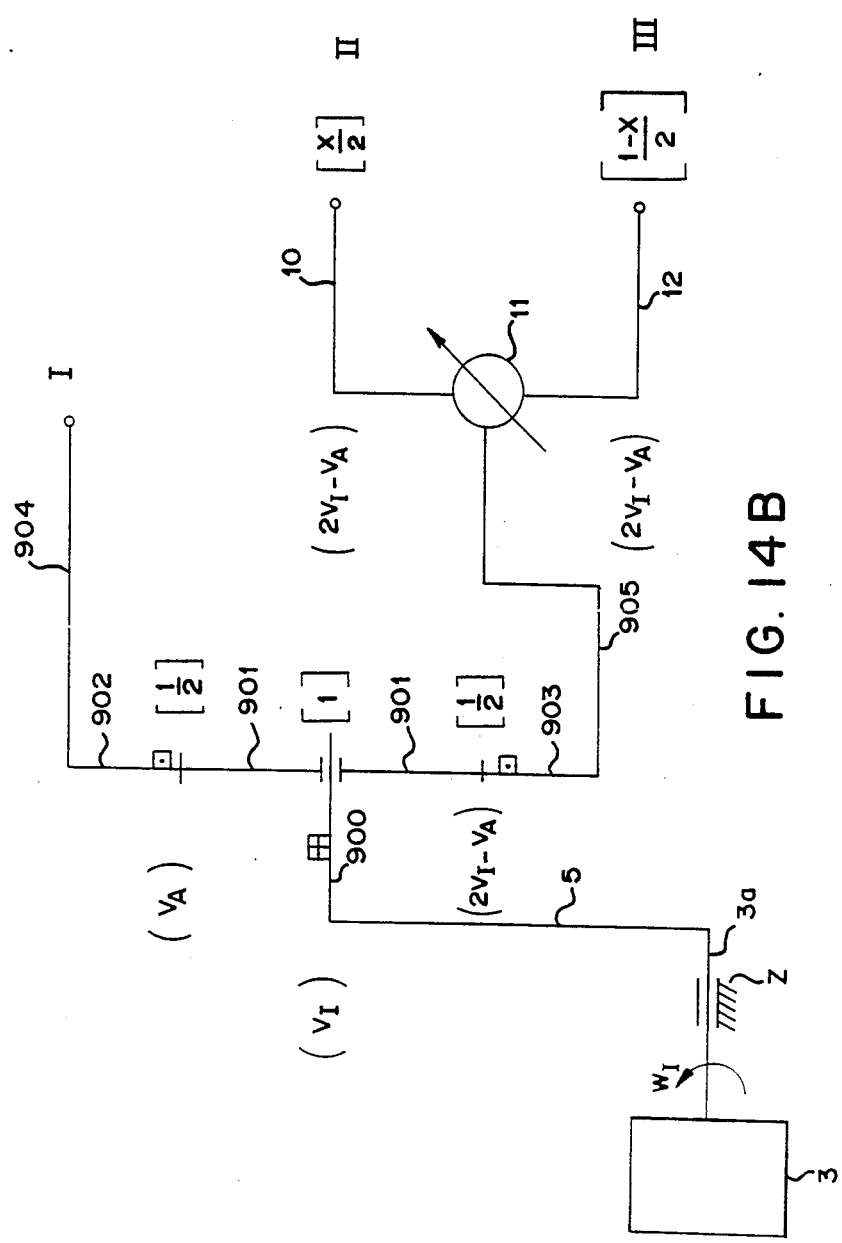
FIG. 14B is a cross-sectional schematic of a part of the structure shown in FIG. 14A.

With reference now to FIG. 14B, there is disclosed a prime mover 3 which is coupled to a shaft $3a$ that is itself supported in a suitable bearing Z. Coupled to shaft $3a$ is a rotating carrier 5, rotating about the axis of shaft $3a$ as the prime mover 3 rotates to deliver power. Formed integrally with carrier 5 is a planetary gear carrier shaft 900 which supports a planetary gear 901 which meshes both with a ring gear 902 and a sun gear 903. The planetary gear structure is illustrated in the same abbreviated notation used earlier in connection with the previous embodiments of the invention. In accordance with the notation and the teachings previously outlined above, the force directions and magnitudes at the various supporting and meshing points of planetary gear 901 are as shown in FIG. 14B. More particularly, in accordance with the previous notation, if the force acting on planetary gear carrier shaft 900 has the direction as shown in FIG. 14B and an arbitrary magnitude of, say [1], the magnitude and direction of the forces acting respectively on ring gear 902 and sun gear 903 are as shown in FIG. 14B. Furthermore, the absolute tangential velocity at the respective meshing and supporting points of planetary gear 901 are as shown, in accordance with the notation and principles previously discussed, as ($v_A$), ($v_I$), and ($2v_I - v_A$). If shaft $3a$ rotates with an angular velocity of $w_I$, the absolute tangential velocity of planetary gear carrier shaft 900 is given as $v_I$. This is assumed to be the absolute tangential velocity of the planetary gear carrier shaft 900 rotating at an arbitrary radius as shown in FIG. 14B.

The power from sun gear 903 is transferred, via a carrier 905 (also as previous explained rotating about the same axis as shaft $3a$) which is provided to a continuously variable power splitter 11 of the type previously disclosed. Power splitter 11 on the two outputs thereof, namely on lines, or carriers 10 and 12, will produce force components in the respective two power streams which are now a function of the variation of a parameter "x," all in a fashion as previously described. Further, it is noted that the absolute tangential velocity of the two power streams, II and III, appearing on carriers 10 and 12, have the same absolute tangential velocity as that appearing between the meshing point of planetary gear 901 and sun gear 903. The power stream I appearing on carrier 904 has the absolute tangential velocity of "$v_A$" and a force magnitude of [½].

It is clear that the structure shown in crosssectional schematic in FIG. 14B has taken an input power stream appearing on planetary gear carrier shaft 900 and produced three new power streams I, II, and III, at least two of which are both kinetically and kinematically independent, as has been previously described. Briefly, power streams I and power stream III are both kinetically and kinematically independent in that neither the force components nor the velocity components of these two power streams has a fixed relationship to the other. This is because the ratio of the force components is a function of the variable parameter "x" and because the ratio of the velocity components is likewise not fixed because of the presence of a "$v_A$" component in both power streams I and III.

Figure 14C:
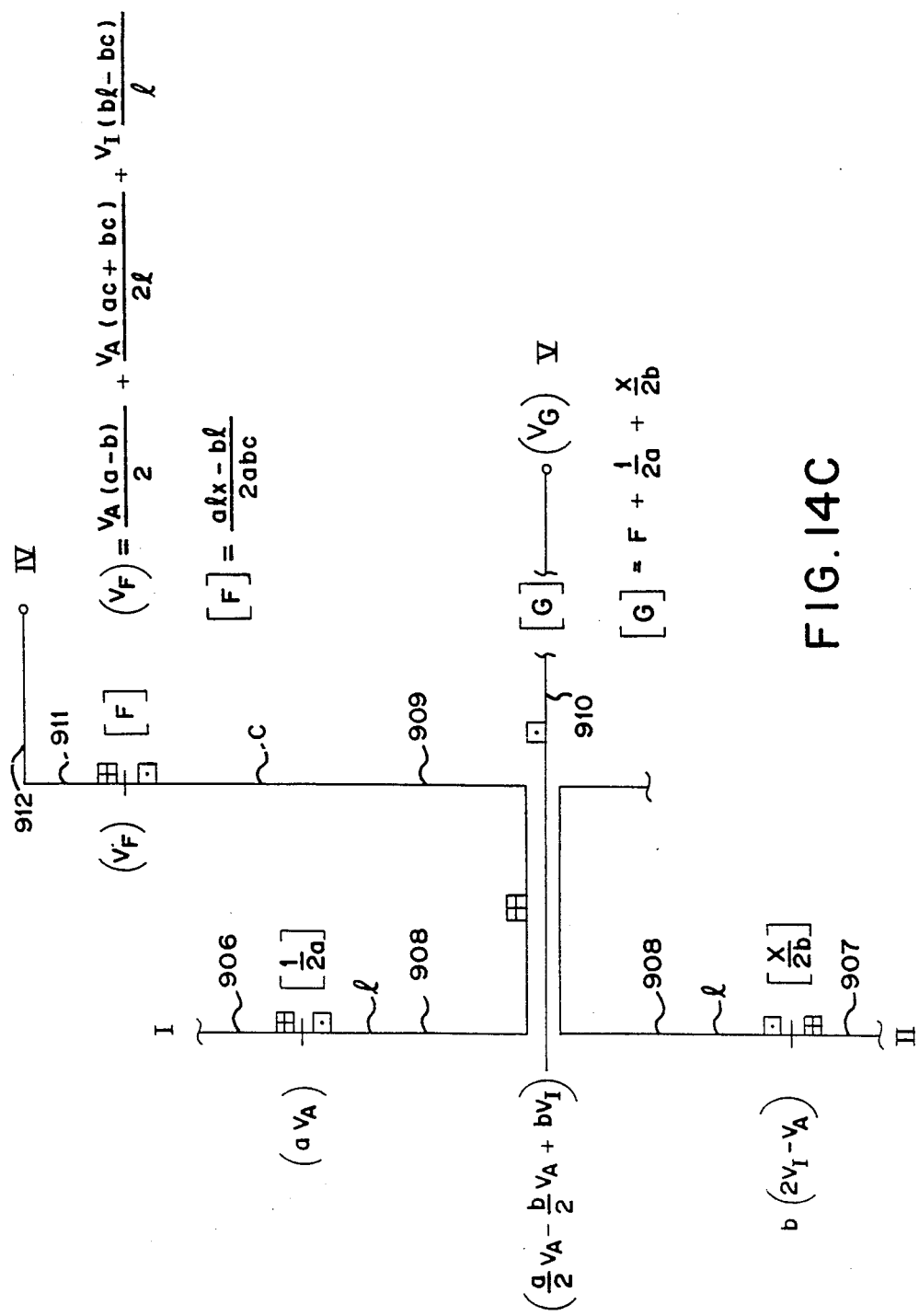
FIG. 14C is a cross-sectional schematic of a part of the structure shown in FIG. 14A.

With reference now to FIG. 14C, there is disclosed there, in accordance with the abbreviated notation previously discussed, a dual planetary gear 908 and 909 which meshes both with a ring gear 906 and a sun gear 907, and which is supported by a planetary gear carrier shaft 910. Dual planetary gear 908, 909 has the freely choosable dimensions "l" and "c" shown in FIG. 14C. The power to ring gear 906 is delivered via a carrier (not shown) from carrier 904 but, instead of being transferred at the same radius at which carrier 904 acts, is delivered at an arbitrary multiple of such radius, namely an "a" multiple thereof. This means that the absolute tangential velocity at the meshing point between ring gear 906 and dual planetary gear 908, 909, instead of being given by $v_A$, is given by $av_A$, i.e., an arbitrary "a" multiple of the absolute tangential velocity $v_A$. In a similar fashion, sun gear 907 derives its power from carrier 10 by way of another carrier (not shown) at an arbitrary multiple "b" thereof. This means that the absolute tangential velocity at the meshing point between dual planetary gear 908 and 909 is given by $b(2v_I - v_A)$ in a fashion similar to that described above, i.e., by varying the radius of the respective carrier which transmits the power from carrier 10, i.e., power stream II, to sun gear 907.

Furthermore, because each of the absolute tangential velocities applied to dual planetary gears 908 and 909 are now the function of arbitrary multiples "a" and "b" of the respective originating carrier radiuses, the forces acting on the respective ring gear, sun gear, and dual planetary gear 908-909 have the magnitudes and directions as shown in FIG. 14C. Again, the determination of these forces follows the rules previously discussed and it is seen that the magnitudes of the forces are also proportional to the proportionality factors "a" and "b" and the dimensions "c" and "l."

Dual planetary gear 908, 909 further meshes with a ring gear 911 at the supporting and meshing point of which the force is given by [F] and the absolute tangential velocity of which is given by $v_F$. This absolute tangential velocity $v_F$ is a function of the two velocities $v_A$ and $v_I$, and the parameters a, b, l, and the variable dimension "c" of planetary gear 909 of the dual planetary gear 908, 909.

Also, because as previously discussed, dual planetary gear 908 and 909 must be both in force and torque equilibrium, the magnitudes and directions of the forces [F] and [G] are determined to be as indicated in FIG. 14C. It is noted that both the forces [F] and [G] are a function of the magnitudes of the force components in power streams I and II as well as the parameters "a," "b," and "c," and "l."

A review of what the structure shown in FIG. 14C has accomplished will indicate that the two power streams I and II have been mixed to result in two new power streams IV and V, both the force and velocity components of which are now responsive to additional parameters "a," "b," and "c," and "l." It is to be noted that, of the four parameters "a," "b," "c," and "l," two of them, namely "a" and "b" reflect variations in carrier radii, as opposed to planetary gear dimensions, such as "c" and "l." In this respect, the mixer illustrated in FIG. 14C differs from previously-disclosed versions in which only planetary gear dimensions were used as parameters to influence a power stream.

Figure 14D:
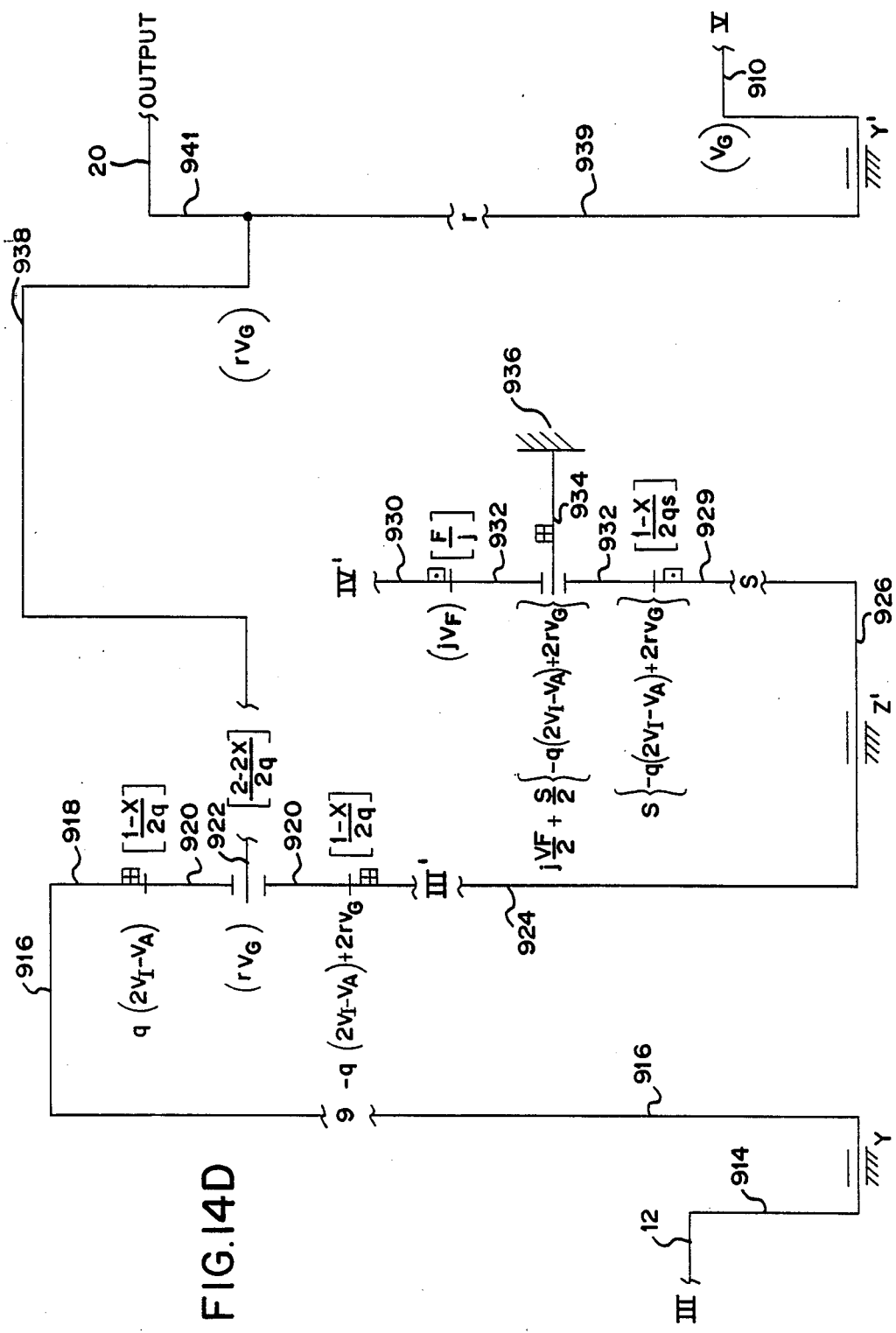
FIG. 14D is a cross-sectional schematic of a part of the structure shown in FIG. 14A.

With reference now to FIG. 14D, power stream III (see FIG. 14B) appearing on carrier 12, is connected with a carrier 914 rotating about a support Y which is coaxial with shaft $3a$ (FIG. 14B). At a carrier radius, which is an arbitrary "q" multiple of the radius of carrier 914, a carrier 916 applies the power stream III to a ring gear 918 which also meshes with a planetary gear 920. Planetary gear 920, in turn, is supported by a planetary gear carrier shaft 922 and meshes with a sun gear 924. The absolute tangential velocity and the force existing at the meshing point between ring gear 918 and planetary gear 920 is given by the expressions as shown in FIG. 14D, and it is noted that both are "q" multiples of the absolute tangential velocity and force components of the power stream III as it appeared on carrier 12 (see FIG. 14B). The absolute tangential velocity of planetary gear carrier shaft 922 is some arbitrary "r" multiple of the absolute tangential velocity of power stream V (see FIG. 14C) to thereby indicate that the planetary gear carrier shaft 922 moves at an absolute tangential velocity which is a fixed multiple of the absolute tangential velocity of power stream V. The purpose and effect of such identity will be further explained below.

Given the absolute tangential velocity components and force components, as indicated in FIG. 14D, at the meshing point between ring gear 918 and planetary gear 920, the absolute tangential velocity and force components on planetary gear carrier shaft 922 and on sun gear 924 where it meshes with planetary gear 920 are all given by the expressions as shown in FIG. 14D and they are determined by rules identical to the ones previously discussed.

The power stream III' appearing on sun gear 924 is transferred by a shaft 926 rotating about a support Z', coaxial with shaft $3a$ (FIG. 14B). A sun gear 929 is directly connected to shaft 926 but has a radius from the axis of shaft $3a$ which is some arbitrary "s" multiple of the radius of sun gear 924. This has the effect of making the force and absolute tangential velocity components at the meshing point between sun gear 929 and planetary gear 932 of being "s" multiples of the absolute tangential velocity and force components appearing at sun gear 924 where it meshes with planetary gear 920, all as shown in FIG. 14D, and all as determined by the rules previously discussed above. Planetary gear 932 also meshes with a ring gear 930 which is located at the radius which is a "j" multiple of the radius of carrier 912 carrying power stream IV (see FIG. 14C). This has the effect of making the force and absolute tangential velocity components at the meshing point where planetary gear 932 meshes with ring gear 930 a "j" multiple of the absolute tangential velocity and force components of the power stream IV' shown in FIG. 14C, all transferred to FIG. 14D by way of a carrier (not shown).

Planetary gear 932 is supported by a planetary gear carrier shaft 934 which is arbitrarily fixed to a fixed support 936 to thereby indicate that the absolute tangential velocity of planetary gear carrier shaft 934 is zero.

The effect of the structure shown in FIG. 14D is to have combined power streams III' and IV' so that they are both eliminated because, as will be discussed below, their resultant power stream, namely the power stream appearing on planetary gear shaft 934 has an absolute tangential velocity of zero. Therefore, the power stream appearing on planetary gear carrier shaft 922, which moves at an absolute tangential velocity with is a fixed multiple of the absolute tangential velocity of power stream V (see FIG. 14C) can now be combined into one power stream, by way of carriers 938, 939 and 941, all rotating about a fixed main support Y', which is coaxial with shaft 3a. This is the output 20 shown in the block diagram of FIG. 14A.

In order for this condition to obtain, it is clear that the forces appearing at the respective meshing points of planetary gear 932 with ring gear 930 and sun gear 929 must be equal, in order for planetary gear 932 to be in torque equilibrium about planetary gear carrier shaft 934. This results in the following equation:

$$\frac{F}{j} = \frac{1-x}{2qs} \qquad (1)$$

Likewise, in order for the absolute tangential velocity of planetary gear carrier shaft 934 to be zero, the following equation must also be satisfied:

$$\frac{jv_F}{2} + \frac{S}{2}[-q(2v_I - v_A) + 2rv_G] = 0 \qquad (2)$$

Substituting into equations (1) and (2), the terms for each of the velocity and force components given in terms of the parameters "a," "b," "c," "j," "l," "q," "r," and "s," results in the following four equations (3), (4), (5), and (6), the simultaneous solution of which will provide appropriate values for each of the parameters discussed above.

$$2ajl - 2bjl + 2acj + 2bcj + 4lqs + 4alrs - 4blrs = 0 \qquad (3)$$

$$4bjl - 4bcj - 8lqs + 8blrs = 0 \qquad (4)$$

$$2alqs + 2abcj = 0 \qquad (5)$$

$$-2blqs - 2abcj = 0 \qquad (6)$$

With the definition of $$l = \frac{6a - 4b}{2} \text{ and}$$

recognizing from the simultaneous solution of equations (5) and (6) that $a = b$, and further simplifying the entire system of equations (3), (4), (5), and (6) is reduced to equations (7) and (8):

$$cj + qs = 0 \qquad (7)$$

$$jl - cj - 2qs + 2lrs = 0 \qquad (8)$$

From the simultaneous solution of equations (7) and (8), $$c = \frac{lq}{2lr - q}$$

From an inspection of equation (7), it is immediately apparent that one of the quantities "c," "j," "q," or "s," must be negative in order to satisfy this equation.

Reference to FIG. 14C will indicate that the dimension "c" can be negative if planetary gear 909 of dual planetary gear 908, 909 projects below planetary gear carrier shaft 910, as opposed to above planetary gear carrier shaft 910, at which it is illustrated. Thus "c" can assume the negative value so that all the equations (3), (4), (5) and (6) are satisfied by the indicated value for c, as stated above.

As will be immediately apparent to those skilled in the art, because there are more parameters available than there are equations, the system of equations (3), (4), (5), and (6) has an infinite number of solutions in which each one of the parameters can be freely chosen once the required relationships have been satisfied. That is to say, more than one solution is possible, depending upon the particular values chosen for each of the parameters. Thus, it is possible for the transmission design described above to satisfy other sets of geometric or spatial restraints by the appropriate choice for the various parameters shown. In other words, the system described in FIGS. 14A-14D can be suitably adjusted by a suitable choice of the various parameters to satisfy any number of additional physical constraints, in addition to the primary ones which have been illustrated, namely the elimination of all but one power stream to constitute the output power stream according to this invention.

Several observations are in order about the structure shown in FIGS. 14A-14D:

1. Dual planetary gears 908, 909, and planetary gear 920, together with the proportionally varied carrier dimensions, together function to mix the power streams I, II and III so that two of the resulting power streams, namely III', IV' can be combined in a single planetary gear, namely planetary gear 932 with no output therefrom. This results from the fact that there are a sufficient number of parameters involved which allow planetary gear 932 to function as a special case of the general case of a power combiner 15 in that the two forces acting on planetary gear 932 are in fact, by suitable choice of the parameters, made to be made identical, fixed multiples of one another, and so that the absolute tangential velocity of planetary gear carrier shaft 934, which is the resultant from such power stream combination, can be chosen to have an absolute tangential velocity of zero. This latter trait in effect means that the two absolute tangential velocities of planetary gear 932 where it meshes with ring gear 930 and sun gear 929 are in fact negative multiples of one another so that planetary gear carrier shaft 934 has an absolute tangential velocity of zero.

The power stream appearing on carrier 20 (FIG. 14D) has a force component which is the proportional sum of the force component appearing on planetary gear carrier shafts 922 and 910 moving at an absolute tangential velocity of $rv_G$, namely $$\left[\frac{2-2x}{2q}\right] + \left[\frac{G}{r}\right].$$

Furthermore, the velocity component, namely the absolute tangential velocity of carrier 20 is given by the expression $rv_G$, which is a function of both $v_A$ and $v_I$, where $v_A$, as previously noted in the description with respect to FIG. 14B, is kinematically independent of $V_I$. Furthermore, the combined force on carrier 20, which represents the force component of the output power stream on carrier 20 is also a function of the various parameters a, b, c . . . s, and the continuously variable parameter "x."

The preceding discussion with respect to FIG. 14D has proceeded on the assumption that a parameter such as "c" should preferably be chosen as the parameter to have a negative value so that none of the other parameters are forced to assume that condition. This is easily fulfilled by the dimension of a planetary gear such as "c," which can be chosen to be both above and below the planetary gear carrier shaft 910, as illustrated in FIG. 14C. However, other parameters, such as "s" can also assume a negative value by use of structure such as shown in FIG. 14E.

Figure 14E:
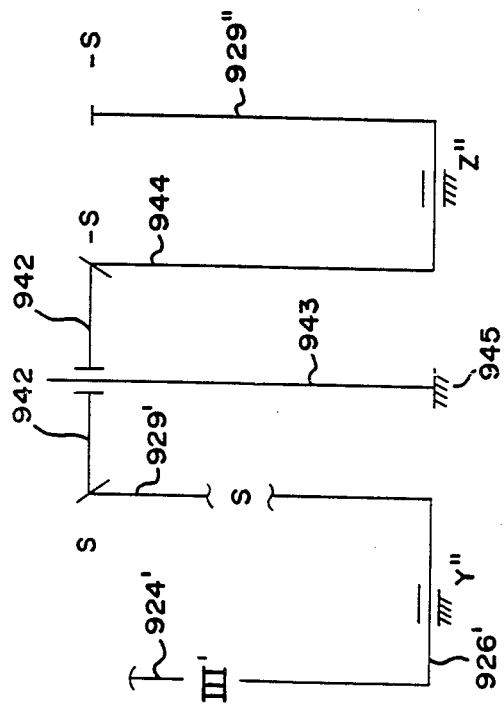
FIG. 14E shows a cross-sectional schematic of a variation of a part of the structure shown in FIG. 14A.

With reference now to FIG. 14E, parts that are analogous to the parts shown in FIG. 14D are identified in primed notations and there is shown there a sun gear 924' rotating about a main axis supported by a bearing Y'''. Shaft 926' is connected to a sun gear 929' which has a radius that is a proportional multiple, namely "s" the dimension of sun gear 924' from the support Y'''. Sun gear 929' (which may also be known as a side gear) meshes with a bevel gear 942 (the equivalent of a planetary gear, but laid on its side so that the planetary gear carrier shaft 943 functions like the center shaft of a differential). Planetary gear carrier shaft 943 is fixed, by way of a fixed support 945, to be nonrotatable, which means that it has an absolute tangential velocity of zero. This means that where sun gear 944 meshes with planetary gear 942, it has an absolute tangential velocity which is the exact negative of the absolute tangential velocity where sun gear 929 meshes with planetary gear 942. Thus, the absolute tangential velocity, as well as the forces, in accordance with the rules previously discussed, assume a value which is the "−s" multiple of the absolute tangential velocity and force existing at the meshing point between sun gear 929' and planetary gear 942. Sun gear 944, in turn, is connected to a carrier 929'', which is fixed for rotation about a main support Z'' so that where it meshes with any ensuing structure it does so with force and absolute tangential velocity components which are the "−s" values, as contrasted with the "s" values at which FIG. 14D has been illustrated.

Thus, to summarize, the structure found in FIGS. 14B–14D are able to achieve the creation of an output power stream on carrier 20 which is kinetically and kinematically independent of the input power stream on carrier 5 (see FIG. 14A) through the use of no more than five planetary gears. Such efficiency in the use of planetary gears represents a distinct improvement, not only over the prior art as previously discussed, but also with respect to the previously disclosed embodiments of the invention.

OTHER MODIFICATIONS AND OBSERVATIONS

The functions of the variable splitter 11 have been described as achievable through the use of a carrier 37 sliding within a key way of a hollow shaft 5. Clearly, it may be equally appropriate to have carrier 37 slide along splines on the outside of a solid shaft 5 so that the force load existing at the meshing point between shaft 5 and carrier 37 is distributed over several splined surfaces, as opposed to one key way.

Likewise, splitter 11 has been illustrated, in both FIGS. 3A and 3B with one member 29 rotating at a distance R1 from shaft 5. Clearly, such a structure represents a rotationally unbalanced load, but it is considered within the routine skill of the art to appropriately balance such a rotational load so that no substantial eccentric forces arise, particularly when carrier 37 rotates at a substantial angular velocity.

In a similar vein, other than as shown, no bearings have been illustrated in any of the embodiments of the invention as it is considered within the skill of the art to provide such bearing surfaces as appropriate in order to minimize rotational friction and handle axial thrust loads which may arise in the various embodiments of the invention.

Finally, so that there is no confusion about the illustrated nature of the bearings shown in FIGS. 3A and 3B, and their appropriate function, it is useful to again restate that the bearings 40 serve to provide a freedom for sleeve 38 to rotate about the axis of carrier 37, as indicated in FIG. 3C by the rotational direction there shown with the letter "C." If at first glance it might appear that the presence of bearings 40 might prevent the transfer of power from carrier 37 to member 29, it should be recalled that the bearings 40 allow a degree of rotational freedom which is not in the same plane as the rotational direction of carrier 37. Thus, bearings 40 as shown in FIG. 3C in further detail allow freedom of rotation only in a direction which is perpendicular to the direction of rotation of carrier 37 and thus the bearings 40 do not present any impediment to the transfer of power from carrier 37 to member 29. Instead, the bearings 40 merely prevent the sleeve 38 from imposing a torque, or moment, on member 29 supported in sleeve 39 attached to the rotatable sleeve 38. Of course, other friction reducing or friction eliminating bearings may be added to the structure shown in FIGS. 3A, 3B, and 3C, for example, to handle lateral shifting of sleeve 38 with respect to the axis of carrier 37, such as bearings 40a.

Throughout the descriptions of the various embodiments disclosed herein, a discussion of both frictional and dynamic forces has been deliberately omitted in order to simplify the description.

As those skilled in the art will know, these simplifying assumptions do not substantially affect the accuracy or the correctness of the description provided because the magnitude of the frictional forces is insignificant in comparison to the individual forces described as acting on each element, i.e. planetary gear, of the invention. Likewise, with the dynamic forces, which can be described as arising from acceleration or deceleration (of either the prime mover, the vehicle, or both) reflected back to the individual planetary gears. These dynamic forces acting on each individual planetary gear are proportional to the ratio of the mass (or moment of inertia) of each individual planetary gear to the mass (or equivalent moment of inertia) of the entire vehicle, including all other rotational parts such as prime mover, drive line, and wheels. As a practical matter, this ratio is so small that the magnitude of the dynamic force is insignificant compared to the magnitude of the forces arising from the power streams produced by the prime mover.

In any case, it is possible to include (by simple superposition) in all the power streams heretofore described a component or components to reflect the existence of these dynamic forces and they, along with the force components already described, will be equally subject to manipulation by the dimensional parameters described, i.e. the freely choosable dimensions of both the individual planetary gears and the various carrier radii. As a result, power streams including these dynamic forces can have their net force components set to zero (to the extent that this has not already been achieved) by techniques that are identical to the techniques described, i.e. by so choosing a combination of parameters that the coefficient (composed of a combination of parameters) of a net force magnitude is set to zero.

Further, it should be noted that while the invention has been described with respect to embodiments, all of which function to convert a single "input" power stream having both an (assumed) constant force and speed component, to a single output power stream having both variable force and speed components, the invention is not so limited. It is equally as possible to reverse the functions of the respective input and output terminals as denoted in the specification and consider the output of the disclosed embodiments as being the input, and vice versa. Such an application would, for example, be in an application of the gear train assembly disclosed in converting a totally variable power stream, i.e. one that might be created by a windmill, for example, and converted to a single output stream, having at least a constant velocity component.

While the invention has been particularly shown and described with reference to preferred embodiments thereof, it will be understood by those skilled in the art that the foregoing and other changes in form and details may be made therein without departing from the spirit and scope of the invention.

APPENDIX "A"

for b = Z
Column 5 expresses the residual error of the calculations

| k | "x" | "a" | "c" | Col. 5 | "P" | "R" |
|---|---|---|---|---|---|---|
| | | 31 $ENTRY | END | | | |
| 0.500 | 0.0 | 1.0000001 | −0.0000000 | 0.1981950D−09 | −0.000000 | 4.000000 |
| 0.500 | 0.010 | 1.0022198 | −0.0033446 | 0.3316711D−15 | −0.013289 | 3.986578 |
| 0.500 | 0.020 | 1.0044348 | −0.0067120 | 0.3397623D−15 | −0.026489 | 3.972978 |
| 0.500 | 0.030 | 1.0066452 | −0.0101031 | 0.3501042D−15 | −0.039600 | 3.959200 |
| 0.500 | 0.040 | 1.0088511 | −0.0135184 | 0.3578308D−15 | −0.052622 | 3.945244 |
| 0.500 | 0.050 | 1.0110527 | −0.0169587 | 0.3679245D−15 | −0.065555 | 3.931110 |
| 0.500 | 0.060 | 1.0132502 | −0.0204249 | 0.3730452D−15 | −0.078399 | 3.916797 |
| 0.500 | 0.070 | 1.0154437 | −0.0139175 | 0.3808314D−15 | −0.091153 | 3.902306 |
| 0.500 | 0.080 | 1.0176332 | −0.0274374 | 0.3872147D−15 | −0.103818 | 3.887636 |
| 0.500 | 0.090 | 1.0198191 | −0.0309854 | 0.3935637D−15 | −0.116393 | 3.872787 |
| 0.500 | 0.100 | 1.0220014 | −0.0345624 | 0.4043643D−15 | −0.128879 | 3.857758 |
| 0.500 | 0.110 | 1.0241803 | −0.0381691 | 0.4136306D−15 | −0.141274 | 3.842549 |
| 0.500 | 0.120 | 1.0263558 | −0.0418065 | 0.4290027D−15 | −0.153579 | 3.827159 |
| 0.500 | 0.130 | 1.0285281 | −0.0454754 | 0.2059376D−15 | −0.165794 | 3.811588 |
| 0.500 | 0.140 | 1.0306974 | −0.0491767 | 0.4015195D−15 | −0.177917 | 3.795835 |
| 0.500 | 0.150 | 1.0328638 | −0.0529115 | 0.4130551D−15 | −0.189949 | 3.779899 |
| 0.500 | 0.160 | 1.0350274 | −0.0566806 | 0.4176712D−15 | −0.201890 | 3.763780 |
| 0.500 | 0.170 | 1.0371883 | −0.0604851 | 0.4196824D−15 | −0.213739 | 3.747477 |
| 0.500 | 0.180 | 1.0393466 | −0.0643261 | 0.4211905D−15 | −0.225495 | 3.730990 |
| 0.500 | 0.190 | 1.0415024 | −0.0682046 | 0.4202780D−15 | −0.237158 | 3.714316 |
| 0.500 | 0.200 | 1.0436560 | −0.0721218 | 0.2227762D−09 | −0.248728 | 3.697456 |
| 0.500 | 0.210 | 1.0458073 | −0.0760786 | 0.1560934D−09 | −0.260204 | 3.680408 |
| 0.500 | 0.220 | 1.0479565 | −0.0800764 | 0.1127266D−09 | −0.271586 | 3.663171 |
| 0.500 | 0.230 | 1.0501037 | −0.0841164 | 0.8333680D−10 | −0.282872 | 3.645745 |
| 0.500 | 0.240 | 1.0522490 | −0.0881998 | 0.6278685D−10 | −0.294064 | 3.628127 |
| 0.500 | 0.250 | 1.0543924 | −0.0923280 | 0.4813355D−10 | −0.305159 | 3.610317 |
| 0.500 | 0.260 | 1.0565342 | −0.0965024 | 0.3746335D−10 | −0.316157 | 3.592313 |
| 0.500 | 0.270 | 1.0586743 | −0.1007243 | 0.2953483D−10 | −0.327057 | 3.574115 |
| 0.500 | 0.280 | 1.0608130 | −0.1049952 | 0.2437678D−10 | −0.337860 | 3.555719 |
| 0.500 | 0.290 | 1.0629502 | −0.1093167 | 0.2380962D−10 | −0.348563 | 3.537126 |
| 0.500 | 0.300 | 1.0650860 | −0.1136903 | 0.2321510D−10 | −0.359166 | 3.518332 |
| 0.500 | 0.310 | 1.0672206 | −0.1181176 | 0.2261058D−10 | −0.369669 | 3.499338 |
| 0.500 | 0.320 | 1.0693541 | −0.1226005 | 0.2200462D−10 | −0.380070 | 3.480140 |
| 0.500 | 0.330 | 1.0714864 | −0.1271406 | 0.2140125D−10 | −0.390368 | 3.460736 |
| 0.500 | 0.340 | 1.0736177 | −0.1317399 | 0.2077621D−10 | −0.400563 | 3.441126 |
| 0.500 | 0.350 | 1.0757481 | −0.1364002 | 0.2015072D−10 | −0.410653 | 3.421307 |
| 0.500 | 0.360 | 1.0778776 | −0.1411235 | 0.1952703D−10 | −0.420638 | 3.401276 |
| 0.500 | 0.370 | 1.0800062 | −0.1459121 | 0.1889500D−10 | −0.430516 | 3.381032 |
| 0.500 | 0.380 | 1.0821341 | −0.1507681 | 0.1825629D−10 | −0.440286 | 3.360571 |
| 0.500 | 0.390 | 1.0842613 | −0.1556937 | 0.1761131D−10 | −0.449946 | 3.339892 |
| 0.500 | 0.400 | 1.0863879 | −0.1606914 | 0.1697873D−10 | −0.459496 | 3.318992 |
| 0.500 | 0.410 | 1.0885138 | −0.1657637 | 0.1634690D−10 | −0.468934 | 3.297869 |
| 0.500 | 0.420 | 1.0906392 | −0.1709132 | 0.1571434D−10 | −0.478259 | 3.276518 |
| 0.500 | 0.430 | 1.0927640 | −0.1761427 | 0.1509060D−10 | −0.487469 | 3.254938 |
| 0.500 | 0.440 | 1.0948884 | −0.1814550 | 0.1447918D−10 | −0.496563 | 3.233126 |
| 0.500 | 0.450 | 1.0970123 | −0.1868533 | 0.1387973D−10 | −0.505538 | 3.211077 |
| 0.500 | 0.460 | 1.0991358 | −0.1923406 | 0.1330848D−10 | −0.514394 | 3.188789 |
| 0.500 | 0.470 | 1.1012588 | −0.1979203 | 0.1275577D−10 | −0.523129 | 3.166258 |
| 0.500 | 0.480 | 1.1033814 | −0.2035961 | 0.1224317D−10 | −0.531740 | 3.143479 |
| 0.500 | 0.490 | 1.1055035 | −0.2093715 | 0.1177806D−10 | −0.540226 | 3.120451 |
| 0.500 | 0.500 | 1.1076252 | −0.2152505 | 0.1138375D−10 | −0.548584 | 3.097167 |
| 0.500 | 0.510 | 1.1097465 | −0.2212372 | 0.1106300D−10 | −0.556812 | 3.073625 |
| 0.500 | 0.520 | 1.1118672 | −0.2273360 | 0.1085905D−10 | −0.564909 | 3.049818 |
| 0.500 | 0.530 | 1.1139875 | −0.2335514 | 0.1077332D−10 | −0.572872 | 3.025743 |
| 0.500 | 0.540 | 1.1161071 | −0.2398885 | 0.1085455D−10 | −0.580697 | 3.001394 |
| 0.500 | 0.550 | 1.1182261 | −0.2463523 | 0.1114677D−10 | −0.588384 | 2.976767 |
| 0.500 | 0.560 | 1.1203444 | −0.2529483 | 0.1168254D−10 | −0.595928 | 2.951885 |
| 0.500 | 0.570 | 1.1224618 | −0.2596823 | 0.1253897D−10 | −0.603327 | 2.926653 |
| 0.500 | 0.580 | 1.1245783 | −0.2665605 | 0.1379662D−10 | −0.610577 | 2.901155 |
| 0.500 | 0.590 | 1.1266938 | −0.2735896 | 0.1553022D−10 | −0.617677 | 2.875353 |
| 0.500 | 0.600 | 1.1288080 | −0.2807764 | 0.1787029D−10 | −0.624621 | 2.849242 |

APPENDIX "A"-continued for b = Z
Column 5 expresses the residual error of the calculations

| k | "x" | "a" | "c" | Col. 5 | "P" | "R" |
|---|---|---|---|---|---|---|
| 0.500 | 0.610 | 1.1309209 | −0.2881286 | 0.2096214D−10 | −0.631407 | 2.822814 |
| 0.500 | 0.620 | 1.1330322 | −0.2956540 | 0.2498408D−10 | −0.638030 | 2.796061 |
| 0.500 | 0.630 | 1.1351417 | −0.3033613 | 0.3014557D−10 | −0.644487 | 2.768975 |
| 0.500 | 0.640 | 1.1372493 | −0.3112597 | 0.3674272D−10 | −0.650774 | 2.741547 |
| 0.500 | 0.650 | 1.1393545 | −0.3193590 | 0.4509217D−10 | −0.656885 | 2.713769 |
| 0.500 | 0.660 | 1.1414571 | −0.3276697 | 0.5560934D−10 | −0.662815 | 2.685630 |
| 0.500 | 0.670 | 1.1435567 | −0.3362033 | 0.6885229D−10 | −0.668561 | 2.657121 |
| 0.500 | 0.680 | 1.1456530 | −0.3449721 | 0.8549788D−10 | −0.674116 | 2.628231 |
| 0.500 | 0.690 | 1.1477455 | −0.3539894 | 0.1063304D−09 | −0.679473 | 2.598947 |
| 0.500 | 0.700 | 1.1498337 | −0.3632696 | 0.1324499D−09 | −0.684628 | 2.569257 |
| 0.500 | 0.710 | 1.1519171 | −0.3728283 | 0.1652092D−09 | −0.689574 | 2.539147 |
| 0.500 | 0.720 | 1.1539950 | −0.3826826 | 0.2062571D−09 | −0.694302 | 2.508604 |
| 0.500 | 0.730 | 1.1560668 | −0.3928510 | 0.2577817D−09 | −0.698806 | 2.477612 |
| 0.500 | 0.740 | 1.1581316 | −0.4033542 | 0.4346942D−13 | −0.703078 | 2.446155 |
| 0.500 | 0.750 | 1.1601886 | −1.4142137 | 0.5291353D−13 | −0.707107 | 2.414213 |
| 0.500 | 0.760 | 1.1622369 | −0.4254542 | 0.6444054D−13 | −0.710885 | 2.381769 |
| 0.500 | 0.770 | 1.1642753 | −0.4371026 | 0.7852930D−13 | −0.714401 | 2.348801 |
| 0.500 | 0.780 | 1.1663026 | −0.4491887 | 0.9582314D−13 | −0.717643 | 2.315286 |
| 0.500 | 0.790 | 1.1683173 | −0.4617455 | 0.1171113D−12 | −0.720600 | 2.281199 |
| 0.500 | 0.800 | 1.1703179 | −0.4748098 | 0.1434152D−12 | −0.723257 | 2.246514 |
| 0.500 | 0.810 | 1.1723025 | −0.4884225 | 0.1760291D−12 | −0.725601 | 2.211201 |
| 0.500 | 0.820 | 1.1742692 | −0.5026298 | 0.2167015D−12 | −0.727613 | 2.175226 |
| 0.500 | 0.830 | 1.1762155 | −0.5174835 | 0.2676519D−12 | −0.729278 | 2.138555 |
| 0.500 | 0.840 | 1.1781388 | −0.5330423 | 0.3318790D−12 | −0.730574 | 2.101147 |
| 0.500 | 0.850 | 1.1800360 | −0.5493733 | 0.4133679D−12 | −0.731479 | 2.062957 |
| 0.500 | 0.860 | 1.1819035 | −0.5665530 | 0.5175674D−12 | −0.731968 | 2.023936 |
| 0.500 | 0.870 | 1.1837372 | −0.5846694 | 0.6517957D−12 | −0.732014 | 1.984027 |
| 0.500 | 0.880 | 1.1855322 | −0.6038248 | 0.8264507D−12 | −0.731585 | 1.943169 |
| 0.500 | 0.890 | 1.1872828 | −0.6241387 | 0.1056053D−11 | −0.730644 | 1.901287 |
| 0.500 | 0.900 | 1.1889823 | −0.6457515 | 0.1361295D−11 | −0.729150 | 1.858300 |
| 0.500 | 0.910 | 1.1906227 | −0.6688307 | 0.1772958D−11 | −0.727056 | 1.814112 |
| 0.500 | 0.920 | 1.1921943 | −0.6935766 | 0.2565012D−11 | −0.724306 | 1.768610 |
| 0.500 | 0.930 | 1.1936855 | −0.7202333 | 0.3380850D−11 | −0.720833 | 1.721665 |
| 0.500 | 0.940 | 1.1950819 | −0.7491010 | 0.4500067D−11 | −0.716559 | 1.673117 |
| 0.500 | 0.950 | 1.1963656 | −0.7805551 | 0.6055794D−11 | −0.711389 | 1.622777 |
| 0.500 | 0.960 | 1.1975139 | −0.8150735 | 0.8259062D−11 | −0.705206 | 1.570411 |
| 0.500 | 0.970 | 1.1984976 | −0.8532769 | 0.1146776D−10 | −0.697863 | 1.515726 |
| 0.500 | 0.980 | 1.1992783 | −0.8959929 | 0.1638173D−10 | −0.689173 | 1.458345 |
| 0.500 | 0.990 | 1.1998035 | −0.9443593 | 0.2467233D−10 | −0.678887 | 1.397774 |
| 0.500 | 1.000 | 1.2000000 | −1.0000003 | 0.4158225D−10 | −0.666667 | 1.333333 |

The embodiments of the invention in which an exclusive property or privilege is claimed are defined as follows:

1. A method for converting a first mechanical power stream having a first force and velocity component into one final mechanical power stream, said final mechanical power stream also having a force and velocity component, said final mechanical power stream being both kinetically and kinematically independent of said first mechanical power stream, comprising the steps of:
   (a) mechanically creating from said first mechanical power stream a plurality of at least three mechanical power streams, at least two of which are both kinetically and kinematically independent of one another; and
   (b) permanently eliminating no less than all but one of said plurality of at least three mechanical power streams by:
      (i) first mixing said plurality of mechanical power streams to produce mixed power streams responsive to the variations of a plurality of parameters and then
      (ii) suitably selecting said parameters so that all but one of said mixed power streams are eliminated, thereby leaving only one surviving mechanical power stream to constitute the final power stream, said final power stream being both kinetically and kinematically independent of said first mechanical power stream.

2. Method according to claim 1 wherein step (b)(ii) further includes the step of setting the velocity component of a power stream to zero.

3. Method according to claim 1 wherein step (b)(ii) further includes the step of setting the force components of at least two mechanical power streams to be fixed multiples of one another.

4. Method according to claim 3, further including the step of setting the velocity components of at least two mechanical power streams to be fixed multiples of one another.

5. Method according to claim 4, further including the step of setting the force and velocity components of at least two power streams to be fixed multiples of one another.

6. Apparatus for converting a first mechanical power stream having a first force and velocity component into one final mechanical power stream, said final mechanical power stream also having a force and velocity component, said final power stream being both kinetically and kinematically independent of said first mechanical power stream, comprising:
   (a) first means responsive to said first mechanical power stream for mechanically creating a plurality of at least three mechanical power streams, at least two of which are both kinetically and kinematically independent of one another;
   (b) second means responsive to said plurality of at least three mechanical power streams for mixing said plurality of power streams to be responsive to the variation of a plurality of parameters and to thereby produce a plurality of mixed mechanical power streams; and, (c) third means, said third means including having appropriately selected parameters for permanently eliminating all but one of said plurality of mixed mechanical power streams, to thereby leave as the sole surviving mechanical power stream a final mechanical power stream being both kinetically and kinematically independent of said first mechanical power stream.

7. Apparatus according to claim 6 wherein said third means includes the variable dimensions of a rotating carrier.

8. Apparatus according to claim 6 wherein said third means includes the variable dimensions of a planetary gear.

9. Apparatus according to claim 6 wherein said third means includes both the variable dimensions of a rotating carrier and the variable dimensions of a planetary gear.

10. Apparatus according to claim 6 wherein said third means includes means for setting the net force component of a power stream to zero.

11. Apparatus according to claim 6 wherein said third means includes means for setting the absolute tangential velocity component of a power stream to zero.

12. Apparatus according to claim 6 wherein said third means further includes means for both setting the force components of at least two mechanical power streams to be fixed multiples of one another.

13. Apparatus according to claim 6 wherein said third means includes means for setting the velocity components of at least two mechanical power streams to be fixed multiples of one another.

14. Apparatus according to claim 13 wherein the velocity components of two mechanical power streams are selected to be negative multiples of one another.

15. A method for creating from a single mechanical power stream no less than three mechanical power streams, at least two of which are both kinetically and kinematically independent of one another, comprising:

(a) mechanically creating from said first mechanical power stream no less than two mechanical power streams, each of said no less than two mechanical power streams having two components, namely a kinematic component and a kinetic component, so that there is independence between one of said two components of said no less than two mechanical power streams, and (b) then mechanically creating from one of said no less than two mechanical power streams in step (a) no less than two further mechanical power streams also having two components, namely a kinematic component and a kinetic component, so that there is independence between the other of said two components of said no less than two further mechanical power streams, whereby there have been created no less than three mechanical power streams, at least two of which are both kinetically and kinematically independent of one another.

16. Apparatus for creating from a mechanical power stream no less than three mechanical power streams, at least two of which are both kinetically and kinematically independent of one another, comprising:

(a) first means for mechanically creating from said first mechanical power stream no less than two mechanical power streams, each of said no less than two mechanical power streams having two components, namely a kinematic component and a kinetic component, so that there is independence between one of said two components of said no less than two mechanical power streams, and (b) second means for mechanically creating from one of said no less than two mechanical power streams created by said first means no less than two further mechanical power streams, each of said no less than two further mechanical power streams also having two components, namely a kinematic component and a kinetic component, so that there is independence between the other of said two components of said no less than two further mechanical power streams, whereby that have been created no less than three mechanical power streams, at least two of which are both kinetically and kinematically independent of one another.

* * * * *